(12) United States Patent
Thornton et al.

(10) Patent No.: US 10,949,749 B2
(45) Date of Patent: *Mar. 16, 2021

(54) METHODS, SYSTEMS AND APPARATUS FOR USING SESSION, DEVICE AND/OR USER SIGNATURES

(71) Applicant: Ribbon Communications Operating Company, Inc., Westford, MA (US)

(72) Inventors: Timothy R. Thornton, Brick, NJ (US); Shaun Jaikarran Bharrat, Manalapan, NJ (US); Justin Hart, Purton (GB); Kevin Riley, Amesbury, MA (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,546

(22) Filed: Mar. 12, 2020

(65) Prior Publication Data
US 2020/0218983 A1 Jul. 9, 2020

Related U.S. Application Data

(63) Continuation-in-part of application No. 16/283,600, filed on Feb. 22, 2019, now Pat. No. 10,931,696, and
(Continued)

(51) Int. Cl.
*G06N 3/08* (2006.01)
*H04L 29/06* (2006.01)
(Continued)

(52) U.S. Cl.
CPC .......... *G06N 3/088* (2013.01); *G06N 3/0454* (2013.01); *H04L 9/3247* (2013.01); *H04L 65/1069* (2013.01)

(58) Field of Classification Search
None
See application file for complete search history.

(56) References Cited

U.S. PATENT DOCUMENTS 8,230,505 B1 * 7/2012 Ahrens ................ G06Q 10/02
726/23
2007/0121596 A1 * 5/2007 Kurapati ............. H04M 7/0078
370/356
(Continued)

OTHER PUBLICATIONS

Christopher Olah, "Understanding LSTM Networks", Aug. 27, 2015, 13 pages, posted on the Internet at http://colah.github.io/posts/2015-08-Understanding-LSTMs/.

*Primary Examiner* — Harry S Hong
(74) *Attorney, Agent, or Firm* — Straub & Straub; Stephen T. Straub; Michael P. Straub

(57) ABSTRACT

The present invention relates to systems, apparatus and methods for the computation and use of session, device and/or user signatures for determining communications session types, device types, and/or user signatures. An exemplary method in accordance with an embodiment of the invention includes: receiving a first set of session control messages belonging to a first communications session, the first set of session control messages including at least one session control message; extracting a first set of features
(Continued)

from the first set of session control messages; operating one or more neural networks to identify a group session signature to which the first set of session control messages corresponds based on the first set of features, the identified group session signature being one of a plurality of group session signatures.

20 Claims, 35 Drawing Sheets

Related U.S. Application Data a continuation-in-part of application No. 16/057,114, filed on Aug. 7, 2018, now Pat. No. 10,659,485.

(60) Provisional application No. 62/817,548, filed on Mar. 12, 2019, provisional application No. 62/817,511, filed on Mar. 12, 2019, provisional application No. 62/703,848, filed on Jul. 26, 2018, provisional application No. 62/697,901, filed on Jul. 13, 2018.

(51) Int. Cl.
*H04L 9/32* (2006.01)
*G06N 3/04* (2006.01)

(56) References Cited

U.S. PATENT DOCUMENTS

| | | | |
|---|---|---|---|
| 2007/0165821 A1* | 7/2007 | Altberg | H04L 29/06027 379/210.02 |
| 2009/0067410 A1* | 3/2009 | Sterman | H04L 63/14 370/352 |
| 2009/0103524 A1* | 4/2009 | Mantripragada | H04L 65/1079 370/352 |
| 2009/0265778 A1* | 10/2009 | Wahl | H04L 63/1416 726/13 |
| 2011/0149745 A1 | 6/2011 | Filho et al. | |
| 2012/0311659 A1* | 12/2012 | Narain | H04W 12/0023 726/1 |
| 2014/0215621 A1* | 7/2014 | Xaypanya | H04L 63/145 726/23 |
| 2017/0289261 A1* | 10/2017 | Asveren | H04L 65/1006 |
| 2018/0007578 A1 | 1/2018 | Drabeck et al. | |
| 2018/0198812 A1 | 7/2018 | Christodorescu et al. | |
| 2020/0067831 A1* | 2/2020 | Spraggins | H04L 45/306 |
| 2020/0213343 A1 | 7/2020 | Bharrat et al. | |
| 2020/0218984 A1* | 7/2020 | Thornton | H04L 9/3247 |

* cited by examiner

```
1202  INVITE sip:+84379533256 3@10.2.0.1:5060 SIP/2.0
1204  Via: SIP/2.0/UDP 99.23.8.8:0;branch=z9hG4bK-14243-27817-0
1206  Via: SIP/2.0/UDP 17.2.8.1:0;branch=z9hG4bK-0087
1208  From: +6898375038687 <sip:+6898375038687@99.23.8.8:0>;tag=14243SIPpTag0027817
1210  To: +84379533256 3 <sip:+84379533256 3@10.2.0.1:5060;tg-context="egresstg">
1212  Call-ID: 387A9EFB@99.23.8.8
1214  CSeq: 1 INVITE
1216  Contact: sip:+6898375038687@99.23.8.8
1218  Max-Forwards: 70
1220  Subject: Performance Test
1224  Content-Type: application/sdp
1226  Content-Length: 137
1228  v=0
1230  o=user1 53655765 2353687637 IN IP4 99.23.8.8
1232  s=-
1234  c=IN IP4 99.23.8.8
1236  t=0 0
1238  m=audio 6001 RTP/AVP 0
1240  a=rtpmap:0 PCMU/8000
```

EXEMPLARY SIP INVITE MESSAGE

FIGURE 12

```
SIP/2.0 200 OK
Allow: INVITE, ACK, CANCEL, BYE, UPDATE, NOTIFY, OPTIONS, REFER, REGISTER
Call-ID: 1d077346843aba30
Contact: <sip:10.1.1.74:5060;transport=UDP>
Cotent-Length: 192
Content-Type: application/sdp
CSeq: 1 INVITE
From: <sip:140834811120.1.1.74>;tag=b87f9f19
Server: NET UX 2.2.1v187 UX
Supported: replaces, update, 100rel
To: <sip:3539;usrparam:pass@10.1.1.74>;tag=a01014a-1856
Via: SIP/2.0/UDP 10.1.1.90:6162;branch=z9hG4bK-d87443-840323593-1--d87443-;rport
```

```
userdevice.bool.to.url.port.5060
userdevice.bool.to.url.port.present
userdevice.int.contact.url.0.username
userdevice.str.call-id.call-id.profile.summary
userdevice.str.contact.0.parameter.+sip.instance
userdevice.str.from.parameter.epid
userdevice.str.from.parameter.tag.mask
userdevice.str.from.parameter.tag.summary
userdevice.str.header.accept.syntax
userdevice.str.header.allow.syntax
userdevice.str.header.supported.syntax
userdevice.str.header.user-agent.syntax
userdevice.str.to.parameter.epid
userdevice.str.via.parameter.ft
userdevice.str.via.parameter.ibmsid
userdevice.str.via.parameter.origin
userdevice.str.via.parameter.received
userdevice.str.via.parameter.rport
```

FIGURE 26F

| FIGURE 26A |
| FIGURE 26B |
| FIGURE 26C |
| FIGURE 26D |
| FIGURE 26E |
| FIGURE 26F |

FIGURE 26

```
******* General format:
featureType.format.[featureInfo ....]
Where:
featureType - call, dest, device, userdevice, user
format. Str, bool, int
featureInfo – specific feature information call.str.call-id.call-id.user  (example of callId header user part)
call.str.contact.0.url.parmameter.nt_server_host
call.str.contact.0.url.parmameter.reg-info
call.str.contact.0.url.parmameter.rinstance
call.str.contact.0.url.parmameter.tgrp
call.str.contact.0.url.parmameter.transport
call.str.from.parameter.tag
call.str.from.url.parmameter.cause
call.str.from.url.parmameter.dtg
call.str.from.url.parmameter.gruu;opaque
call.str.from.url.parmameter.phone-context
call.str.from.url.parmameter.tag
call.str.from.url.parmameter.transport
call.str.from.url.parmameter.user
call.str.request.url.parmameter.cause
call.str.request.url.parmameter.dtg
call.str.request.url.parmameter.maddr
call.str.request.url.parmameter.nt_server_host
call.str.request.url.parmameter.phone-context
call.str.request.url.parmameter.reg-info
call.str.request.url.parmameter.tgrp
call.str.request.url.parmameter.transport
call.str.request.url.parmameter.user
call.str.to.parameter.tag
call.str.to.url.parmameter.dtg
call.str.to.url.parmameter.phone-context
call.str.to.url.parmameter.tag
call.str.to.url.parmameter.transport
call.str.to.url.parmameter.user
call.str.via.parameter.branch
dest.bool.request.url.username.plus
dest.bool.request.url.username.present
dest.bool.to.url.username.plus
dest.bool.to.url.username.present
dest.int.request.url.port
dest.int.to.url.port
dest.int.to.url.username
dest.str.request.url.host
```

```
dest.str.request.url.username
dest.str.to.url.host
dest.str.to.url.name
dest.str.to.url.username
device.int.header.call-id.sequence (Example of the sequence in message of the call-id header)
device.int.header.contact.sequence
device.int.header.cseq.sequence
device.int.header.from.sequence
device.int.header.to.sequence
device.int.header.via.sequence
device.str.contact.0.url.protocol
device.str.cseq.method
device.str.from.url.protocol
device.str.header.call-id.syntax
device.str.header.contact.syntax
device.str.header.cseq.syntax
device.str.header.from.syntax (Example of from header syntax ie from, From. fRom, etc)
device.str.header.to.syntax
device.str.header.via.syntax
device.str.request
device.str.request.format
device.str.request.url.protocol
device.str.to.url.protocol
device.str.user-agent.value
device.str.via.protocolversion
meta.filename
user.bool.contact.0.parameter.+multiple-codecs-in-ans
user.bool.contact.0.parameter.+sip.ice
user.bool.contact.0.parameter.audio
user.bool.contact.0.parameter.automata
user.bool.contact.0.parameter.image
user.bool.contact.0.parameter.isFocus
user.bool.contact.0.parameter.isfocus
user.bool.contact.0.parameter.text
user.bool.contact.0.parameter.video
user.bool.contact.0.url.username.plus
user.bool.contact.0.url.username.present
user.bool.from.url.username.plus
user.bool.from.url.username.present
user.bool.via.parameter.alias
user.bool.via.parameter.rport
user.int.contact.0.url.port
user.int.from.url.port
```

FIGURE 26B

```
user.int.from.url.username
user.int.header.accept.count
user.int.header.allow.count
user.int.header.call-id.count (Example of number of call-id headers in message)
user.int.header.contact.count
user.int.header.cseq.count
user.int.header.from.count
user.int.header.supported.count
user.int.header.to.count
user.int.header.user-agent.count
user.int.header.via.count
user.str.contact.0.url.host
user.str.contact.0.url.name
user.str.contact.0.url.username
user.str.from.url.host
user.str.from.url.name
user.str.from.url.username
user.str.via.protocolname
user.str.via.transport
userdevice.bool.accept.application/btbc-session-info
userdevice.bool.accept.application/dtmf
userdevice.bool.accept.application/dtmf-relay
userdevice.bool.accept.application/isup
userdevice.bool.accept.application/media_control+xml
userdevice.bool.accept.application/sdp
userdevice.bool.accept.application/vnd.etsi.aco+xml
userdevice.bool.accept.application/vnd.etsi.aoc+xml
userdevice.bool.accept.application/vnd.etsi.sci+xml
userdevice.bool.accept.application/x-broadworks-call-center+xml
userdevice.bool.accept.application/xml
userdevice.bool.accept.multipart/mixed
userdevice.bool.allow.ACK
userdevice.bool.allow.BENOTIFY
userdevice.bool.allow.BYE
userdevice.bool.allow.CANCEL
userdevice.bool.allow.INFO
userdevice.bool.allow.INVITE
userdevice.bool.allow.MESSAGE
userdevice.bool.allow.NOTIFY
userdevice.bool.allow.OPTIONS
userdevice.bool.allow.PRACK
userdevice.bool.allow.PUBLISH
userdevice.bool.allow.REFER
userdevice.bool.allow.REGISTER
userdevice.bool.allow.SERVICE
userdevice.bool.allow.SUBSCRIBE
userdevice.bool.allow.UPDATE
```
2603

FIGURE 26C

```
userdevice.bool.contact.0.url.name.quoted
userdevice.bool.contact.0.url.port.5060
userdevice.bool.contact.0.url.port.present
userdevice.bool.from.parameter.tag
userdevice.bool.from.url.name.quoted
userdevice.bool.from.url.port.5060
userdevice.bool.from.url.port.present
userdevice.bool.header.Accept-Contact
userdevice.bool.header.Accept-Language
userdevice.bool.header.Alert-Info
userdevice.bool.header.Allow-Events
userdevice.bool.header.Authorization
userdevice.bool.header.Av-Global-Session-ID
userdevice.bool.header.CONTENT-LENGTH
userdevice.bool.header.CONTENT-TYPE
userdevice.bool.header.Call-Info
userdevice.bool.header.Cisco-Guid
userdevice.bool.header.Content-Disposition
userdevice.bool.header.Content-ID
userdevice.bool.header.Content-Length
userdevice.bool.header.Content-Type
userdevice.bool.header.Content-disposition
userdevice.bool.header.Date
userdevice.bool.header.Diversion
userdevice.bool.header.EXPIRES
userdevice.bool.header.Expires
userdevice.bool.header.HISTORY-INFO
userdevice.bool.header.History-Info
userdevice.bool.header.MAX-FORWARDS
userdevice.bool.header.Max-Forwards
userdevice.bool.header.Max-breadth
userdevice.bool.header.Max-forwards
userdevice.bool.header.Min-SE
userdevice.bool.header.P-ASSERTED-IDENTITY
userdevice.bool.header.P-AV-Message-Id
userdevice.bool.header.P-Asserted-Identity
userdevice.bool.header.P-Called-Party-ID
userdevice.bool.header.P-Charging-Vector
userdevice.bool.header.P-Location
userdevice.bool.header.P-Preferred-Identity
userdevice.bool.header.PRIORITY
userdevice.bool.header.Privacy
userdevice.bool.header.Proxy-Authorization
userdevice.bool.header.REFERRED-BY
userdevice.bool.header.Record-Route
userdevice.bool.header.Recv-Info
userdevice.bool.header.Referred-By
```
— 2604

FIGURE 26D

```
userdevice.bool.header.Remote-Party-ID
userdevice.bool.header.Replaces
userdevice.bool.header.Require
userdevice.bool.header.Required
userdevice.bool.header.Route
userdevice.bool.header.Session-Expires
userdevice.bool.header.Session-ID
userdevice.bool.header.Subject
userdevice.bool.header.X-BroadWorks-Correlation-Info
userdevice.bool.header.X-BroadWorks-Remote-Party-Info
userdevice.bool.header.accept-contact
userdevice.bool.header.allow-events
userdevice.bool.header.authorization
userdevice.bool.header.ms-call-source
userdevice.bool.header.p-preferred-identity
userdevice.bool.header.recv-info
userdevice.bool.request.url.port.5060
userdevice.bool.request.url.port.present
userdevice.bool.supported.
userdevice.bool.supported.100rel
userdevice.bool.supported.Geolocation
userdevice.bool.supported.Replaces
userdevice.bool.supported.X-cisco-original-called
userdevice.bool.supported.X-cisco-srtp-fallback
userdevice.bool.supported.altc
userdevice.bool.supported.com.nortelnetworks.firewall
userdevice.bool.supported.com.nortelnetworks.im.encryption
userdevice.bool.supported.early-session
userdevice.bool.supported.em
userdevice.bool.supported.gin
userdevice.bool.supported.gruu
userdevice.bool.supported.histinfo
userdevice.bool.supported.info
userdevice.bool.supported.join
userdevice.bool.supported.nosec
userdevice.bool.supported.p-3rdpartycontrol
userdevice.bool.supported.path
userdevice.bool.supported.precondition
userdevice.bool.supported.record-aware
userdevice.bool.supported.replaces
userdevice.bool.supported.resource-priority
userdevice.bool.supported.sdp-anat
userdevice.bool.supported.timer
userdevice.bool.supported.x-nortel-sipvc
userdevice.bool.supported.x-sipura
userdevice.bool.to.url.name.quoted
```
2605

FIGURE 26E ial Patent Application Ser. No. 62/817,511 which was
METHODS, SYSTEMS AND APPARATUS FOR USING SESSION, DEVICE AND/OR USER SIGNATURES

RELATED APPLICATIONS

The present application claims the benefit of U.S. Provisional Patent Application Ser. No. 62/817,511 which was filed on Mar. 12, 2019 and which is hereby expressly incorporated by reference in its entirety. The present application claims the benefit of U.S. Provisional Patent Application Ser. No. 62/817,548 which was filed on Mar. 12, 2019 and which is hereby expressly incorporated by reference in its entirety. The present application is also a continuation in part of U.S. patent application Ser. No. 16/057,114 filed on Aug. 7, 2018 published as U.S. Patent Application Publication No. US 2019-0173898 A1 on Jun. 6, 2019 which is a continuation in part of U.S. patent application Ser. No. 15/834,960 filed on Dec. 7, 2017 published as U.S. Patent Application Publication No. US 2019-0174000 A1 on Jun. 6, 2019, which claims the benefit of the filing date of U.S. Provisional Patent Application Ser. No. 62/595,311 filed on Dec. 6, 2017. U.S. patent application Ser. No. 16/057,114 also claims the benefit of the filing date of U.S. Provisional Patent Application Ser. No. 62/697,901 filed on Jul. 13, 2018 and U.S. Provisional Patent Application Ser. No. 62/703,848 filed on Jul. 26, 2018. The present application is also a continuation in part of U.S. patent application Ser. No. 16/283,600 filed on Feb. 22, 2019 published as U.S. Patent Application Publication No.: US 2020-0021609 A1 on Jan. 16, 2020 which is a continuation in part of U.S. patent application Ser. No. 16/057,114 which as previously noted also claims the benefit of the filing data of U.S. Provisional Patent Application Ser. No. 62/697,901 filed on Jul. 13, 2018 and U.S. Provisional Patent Application Ser. No. 62/703,848 filed on Jul. 26, 2018. The present application hereby expressly incorporates by reference in its entirety, U.S. Patent Application, assigned U.S. patent application Ser. No. 16/817,601, entitled, "Methods, Systems And Apparatus For Using Session, Device and/or User Signatures", inventors: Timothy R. Thornton, Shaun Jaikarran Bharrat, Justin Hart, and Kevin Riley, Applicant: Ribbon Communications Operating Company, Inc., filed the same day as the present application, i.e., Mar. 12, 2020. Each of the proceeding patent applications and publications are hereby expressly incorporated by reference in their entirety.

FIELD OF INVENTION

The present invention relates to systems, apparatus and methods for the computation and use of session, device and/or user signatures for determining communications session types, device types, and/or user signatures. The application describes, among other things, the determination and use of communications session signatures, e.g. call session signatures, device signatures, and user signatures. In many instances the signatures are group signatures such as for example group session signatures.

The invention uses these signatures to match new communications session types, device types, and user signatures against previously known communications session types, device types and/or user signatures and upon a match to then associate the new communications session type, device type, and/or user signature to information and/or data corresponding to the known matching communications session type, device type, and/or user signature. The invention can also implement modifications to the signaling of future communications sessions to overcome problems encountered by past communications sessions. The invention can also provide identity verification/security services, user & traffic profiling services, and threat detection and prevention services.

BACKGROUND

Unified Communications or UC (in some cases the acronym UCC is used to emphasize the addition of Collaboration) refers to the integration of multiple forms of real-time communications including voice, video, collaboration and text messaging. Businesses are augmenting or replacing traditional voice-centric PBX systems with Unified Communications solutions to improve employee productivity and collaboration as well as to support mobility and Bring Your Own Device (BYOD) initiatives.

New devices and increased connectivity have offered users more ways to communicate but have also driven a dizzying array of disparate contacts, alerts and conversations. Unified Communications and Unified Communications systems allow for the use, integration, and management of various technologies and forms of communication by customers, e.g., enterprise system customers and network operator customers.

However, to accomplish this Unified Communications (UC) signaling has become extremely complex, supporting many different call flows and devices. This is true of all Unified Communications call signaling protocols but is particularly applicable to Session Initiation Protocol (SIP), whereby the number of Request For Comment (RFC) specifications (e.g., Internet Engineering Task Force (IETF) RFC specifications) run into the 100s, with many more added each year. Add on top of that the 1000s of different devices, device types, Session Initiation Protocol (SIP) agents, Back to Back User Agent's (B2BUA's), servers, registrars and other devices that may be involved in a call, and the problem of ensuring any particular device and call flow works successful becomes an extremely non-trivial complex task.

One of the many roles or functions that a Session Border Controller (SBC) is expected to provide in a network is to help facilitate this interworking, whilst simultaneously securing one or more networks from accidental or malicious bad traffic. This sets up an inherent conflict whereby the SBC is both attempting to be liberal (allow flexibility in signaling permutations) and strict (block unwanted permutations).

For example, when a device is added to a system, the installation and configuration of the device and other devices, e.g., Session Border Controllers, which have to interact with the new device can be extremely complex so as to ensure that the interoperability of the signaling from the new device works correctly in the system, for example that calls can be placed and completed as intended and that calls/sessions and the features and/or services related to the calls operate without error. During initial installation an attempted call may fail to complete due to signaling interoperability or an attempted call may be completed but features may not operate properly such as no video or audio content being provided or features (e.g., conferencing, call detail records) may not properly function.

The aforementioned interoperability problem is traditionally solved by providing a very large range of controls at the SBC. This allows the operator to "tune" the signaling to the desired level of openness or flexibility. However, this in itself increasingly becomes onerous, as the exponentially increasing number of permutations and controls becomes unwieldy for any one individual to truly understand and apply correctly. This leads to the two extremes of problems—"good" devices/calls fail, and/or "bad" devices/calls are permitted.

Further to this, it is common for an SBC to be expected to "fix" issues or problems with the signaling, such that peering elements do not need to be exposed to every vulgarity of the signaling. This normalization of the signaling may occur via the activation of inbuilt functionality designed to solve a specific situation, or it may invoke the execution of one or more user defined programs. Such programs are known by a range of terms in the industry (Session Initiation Protocol Message Manipulation (SMM) being one such example) and are common for simple to moderate modifications of the signaling, (e.g. remove an unwanted header, add a missing important header, modify the encoding format of a parameter.). These typically take the form of domain-specific scripting languages used to provide instructions on how to modify the signaling.

These in turn extend the problem, in that the operator is now expected to understand which rules (programs) need to be applied to make any particular combination work or in some cases to define new rules to make the signaling work.

From the foregoing, it can be understood that generally speaking what is needed is new and/or improved methods, system and apparatus that provide a more efficient and effective automated way to identify and categorize signaling, such that correct configuration (including defining and/or applying modification programs or device configurations) can be easily—and in some cases automatically—selected and implemented.

More particularly, there is a need for new and/or improved methods, systems and apparatus for overcoming the technical problem of how to effectively and efficiently detect, identify, classify and/or categorize signals and/or communications sessions, e.g., communications sessions corresponding to signals as "good" signals or communications sessions (i.e., signals or communications sessions which will be permitted to proceed) and "bad" signals or communications sessions (i.e., signals or communications sessions which will not be permitted to proceed).

Furthermore, there is a need for new and/or improved methods, systems and apparatus for automating the detection, identification, classification and/or categorization of signals and/or communications sessions corresponding to signals such that correct signal configurations for interoperability can be efficiently and effectively implemented.

There is a further need for new and/or improved methods, apparatus and systems for automating the selection and application of signaling modification programs to correctly modify and configure signals to achieve needed interworking or interoperability among the various diverse user and network communications devices. There is still a further need for new and/or improved methods, apparatus and systems for generating or defining new rules by which to modify signals to make signals, e.g., SIP signals corresponding to a communications session, e.g., a call, work in the communications network. There is still a further need for identifying "bad" signals or communications sessions corresponding to the signals (e.g., signals or communications sessions with unwanted signaling permutations) and a set of one or more signal modification rules that when implemented modify portions of future "bad" signals, e.g., from the same device, transforming the signal from a "bad" signal into a "good" signal (e.g., signals or communications sessions with acceptable signaling permutations) that will be permitted to proceed and will not be blocked or discarded.

There is also a need for new and/or improved methods, systems and apparatus for sharing of information learned by an equipment or service provider in one or more customer environments across all of the deployed customers of the equipment or service provider. For example, there is a need for matching communications session flows to similar communications session flows so that learnings about signaling controls such as the IP Signaling Profile, the SIP trunk group, SMM rules (SIP Message Manipulation (SMM) of a "flexible programming/scripting" environment used to provide domain specific signaling modification), etc. can be replicated in a new environment in an efficient manner that reduces the amount of time required to determine which communications session flows are similar by automating the process and even suggesting and/or implementing prior learnings to new communications sessions or device configurations.

It is to be understood that a communications session can be for example a call session, a Voice Over Internet Protocol session, a multi-media session, an unified communications session, a WebRTC session, an audio session, a video session, a Rich Communications Services session, an instant messaging session, a text messaging session, a real-time communications session, a presence information sharing session, a user registration session, a device registration session, a conferencing session, an interactive collaborative multi-party session, an electronic whiteboard session, a desktop share session, and a Session Initiation Protocol session.

Furthermore, among the technical problems for which a solution is needed is how to define a representative "group signature" for a communications session flow such that two communications session flows that are functionally similar will have the same signature and two flows that are not will have different signatures.

Computing such a signature is a particularly difficult problem in the case of SIP signaling where the protocol: (a) is textual; (b) allows a wide variety of headers and bodies; (c) headers and parameters can be repeated (d) headers and parameters can be placed in any order; (e) many headers (and parameters) are not independent, (f) certain related information (such as SDP contents, or even RTP/RTCP media attributes) may also need to be included and are not necessarily considered part of the core protocol.

On this type of corpus, simple signature schemes based on textual comparisons or hashing produce unusably pessimistic results (i.e., they rarely produce matches). Other approaches based on clustering, such as K-means clustering, rely on a proper distance metric, but such a metric in this case pre-supposes an understanding of the underlying relationship among headers and parameters in a message, e.g., session control message such as a SIP message, something which is unknown in this environment.

From the foregoing it should also be understood that there is a need for new and/or improved methods, systems and/or apparatus for use in computing signatures, e.g., group, session, device and user signatures, that not only meets the requirements of signatures presented, but also does not require a-priori knowledge of the essential content in loosely structured textual protocols. Furthermore, there is a need for new and/or improved methods, system and apparatus that are customizable to allow for the tuning of the level of specificity of the signature (i.e. the number of distinct groups generated for a particular corpus) so there is flexibility in identifying information (e.g., message manipulation rules or device configuration rules) of known good communications session with the same group session signature that can be evaluated when trying to determine "fixes" to problems identified with communications session e.g., from new devices or make determinations as to whether new devices will be able to operate (e.g., place or initiate communications sessions) without causing problems with the network.

Furthermore, with the ever more complex and diverse methods of communicating such as described in connection with the Unified Communications Systems and Services described above, there have been rapid increases in both the number of nodes within a communications session flow, and the variety of interacting protocols. This complexity and diversity of interacting technology has pushed the management of Unified Communications systems beyond the cognitive capacity of the operator-monitored and controlled paradigm. This problem has previously arisen at lower layers of the networking stack (Internet Protocol (IP) level) and various Security Information and Event Management (SIEM) frameworks were developed to address the shortcomings. However, these SIEM frameworks lose their value when applied at higher levels of the stacks because the salient information necessary for usable Unified Communications monitoring and control is at the application specific protocol level. This is certainly the case for unified communications applications where anomalies can only be tracked or are most effectively tracked with detailed understanding of the UC level interactions such as, for example, who is initiating a session with whom and when, what type of media do they typically exchange, etc. Among what is missing in the state of the art for Unified Communications is a holistic system that monitors the Unified Communications network, detects anomalies, and applies Unified Communications policies to the network all in a closed loop with incremental additions or reductions to achieve a desirable operating point. With the complexity and diversity of the technologies involved, there is also a rise in the need for better and more efficient ways to provide security protection services taking into account the diversity and complexity of technology and the increase of communications sessions as well as diversity of session types and session control signals being used to manage the communications sessions.

From the foregoing it is apparent that there is a need for a technological solution to how to effectively, efficiently and in a cost-efficient manner monitor, detect and/or mitigate threats and/or anomalies in networks that solves one, some, or all of the aforementioned problems.

Moreover, with the ever more complex and diverse methods of communicating such as described in connection with the Unified Communications Systems and Services described above, it is readily evident that there is also a need to provide identity verification/security services, user & traffic profiling services, and threat detection and prevention services to protect the customers and networks of such systems and services.

SUMMARY

The present invention relates to, among other things, systems, apparatus and methods for the computation and use of signatures, e.g., group signatures, for determining one or more of the following session types, device types and user types. The system uses these signatures to match new session types, device types, and/or user types against previously known session types, device types, and/or user types to produce learned data and information associated with the known session types, device types, and/or user types. The learned data and information is then used to determine modification(s) to device configurations, user configurations and/or modifications of signaling, e.g., SIP signaling messages, for future communications sessions, e.g., to "fix" problems.

In various embodiments, the learned data and information is used to make determinations on device identity, user identity and session type of a communications session which in turn may be, and in some embodiments is, used to provide one or more of the following services: (i) identity verification/security services, (ii) user & traffic profiling services, (iii) fraud detection and prevention services, and (iv) anomaly detection and/or mitigation services.

Various embodiments utilize one or more neural networks, e.g., autoencoder neural networks, to detect anomalies based on one or more feature sets extracted from one or more communications sessions. Once an anomalous condition has been detected in some embodiments notifications are distributed to other system(s), device(s) and/or individual(s) and/or mitigation operations are automatically undertaken to alleviate or mitigate issues or problems created by or related to the anomalous condition.

Various embodiments of the present invention solve one or more of the aforementioned technological problems previously discussed or discussed herein.

A method of operating a system in accordance with an embodiment of the present invention includes the steps of: receiving a first set of session control messages belonging to a first communications session, said first set of session control messages including at least one session control message; extracting a set of device features from said first set of session control messages, said set of device features including features corresponding to how the device is being used; and operating a first neural network to determine a device signature for the first set of session control messages based on said set of device features.

Another exemplary method embodiment of operating a system in accordance with the present invention includes the steps of: receiving a first set of session control messages, e.g., Session Initiation Protocol (SIP) packet messages, belonging to a first call, said first set of session control messages, e.g., SIP packet messages, including at least one session control message, e.g., at least one SIP packet message; extracting a first set of features from said first set of session control messages, e.g., first set of SIP packet messages; and operating one or more neural networks to identify a group session signature, e.g., a group call signature, to which said first set of session control messages, e.g., first set of SIP packet messages, corresponds based on said first set of features, said identified group session signature, e.g., group call signature, being one of a plurality of group session signatures, e.g., group call signatures.

In some embodiments, the method further includes the step of identifying one or more session control message manipulation rules such as for example, SIP message manipulation rules, corresponding to said identified group session signature, e.g., group call signature.

In some embodiments, the method also includes the step of modifying one or more session control messages, e.g., SIP packet messages, belonging to a second communications session, e.g., a second call, using at least one of said identified one or more session control message manipulation rules, e.g., SIP message manipulation rules, corresponding to said identified group session, e.g., call, signature.

In some embodiments, the one or more neural networks is an autoencoder neural network and the group session signature, e.g., group call signature, is determined from the latent layer of the autoencoder neural network.

Another exemplary method of operating a system in accordance with the present invention includes the steps of: receiving a first set of session control messages belonging to a first communications session, said first set of session control messages including at least one session control message; extracting a first set of features from said set of session control messages; operating one or more neural networks to identify a group session signature to which said first set of session control messages corresponds based on said first set of features, said identified group session signature (e.g., group communications session signature such as a group call session signature) being one of a plurality of group session signatures (e.g., group communications session signatures such as a group call session signatures).

In some embodiments, the first set of features includes signaling attributes that are native to a device or user behavior (e.g., signaling attributes not modified by network elements). In some embodiments, the identified group session signature is used for determining one or more of the following: a communications session type corresponding to the first communications session, a device type corresponding to an endpoint device which originated or initiated the first communications session, or a user identity corresponding to the first communications session.

In some, but not all embodiments, the identified group session signature is used to retrieve information corresponding to communications sessions having a matching group session signature.

In some embodiments, the method further includes the steps of: determining a device identity, user identity or communications session type for the first communications session based on said retrieved information corresponding to communications sessions having the same group session signature as the identified group session signature of the first communications session.

In some additional embodiments, the method further includes the steps of: operating a profiling system or a profiling component of a communications session processing device (e.g., a Session Border Controller, Registrar, Application Server, Threat Detection and Security System) to perform one or more of the following: an identity verification/security check, user & traffic profiling check, or fraud detection and prevention operation (e.g., limiting or blocking service) based on one or more of said determined device identity, user identity, or communications session type.

In some embodiments, when the identity verification/security check fails, performing one or more of the following operations: (i) providing a notification to a user (e.g., owner) and/or operator (e.g., service provider for user) corresponding to the identity which failed the verification/security check, (ii) taking an action to limit or prevent use of one or more network services (e.g., making international calls) corresponding to a user identity or device identity corresponding to the first communications session, (iii) adding the determined device identity, determined user identity, or the determined communications session type to a suspected entity list.

In some embodiments of the invention, the method further includes upon receiving a subsequent second communications session with a signature matching the first communications signature performing one or more of the following actions on the second communications session: (i) taking an action to block the second communications session; (ii) taking an action to limit the services provided for the second communications session (e.g., blocking of features provided for the second communications session); or (iii) subjecting the second communications session to additional or more stringent validation checks.

In some embodiments of the invention, when the user & traffic profiling check fails, performing one or more of the following operations: (i) providing a notification to a user (e.g., owner) and/or operator (e.g., service provider for user) corresponding to the identity of the user which failed the user & traffic profiling check, (ii) taking an action to limit or prevent use of one or more network services (e.g., making international calls) corresponding to a user identity or device identity corresponding to the first communications session.

In some embodiments of the invention, the identity verification/security check includes a determination that an unauthorized use of a device has been made in connection with the first communications session, said determination being based at least in part on a determined device signature (or device identifier) and a user signature and a geolocation corresponding to the first communications session. In some, but not all embodiments, the identity verification/security check includes a determination that an unauthorized use of a device has been made in connection with the first communications session, said determination being based at least in part on a determined device signature and a user signature.

In another exemplary method of operating a system in accordance with an embodiment of the invention, the method includes the steps of: receiving a first set of session control messages belonging to a first communications session, said first set of session control messages including at least one session control message; extracting a set of user features from said first set of session control messages; operating a first neural network to determine a user signature from the first set of session control messages based on said set of user features. In some embodiments, the method further includes the step of: comparing the determined user signature to a set of user signatures of a cluster of user signatures having the same user identifier (e.g., URI) as the originator of the first communications session to which the first set of session control messages belong.

In some additional embodiments, the method further includes based on the results of said comparison of the user signature to the user signatures of the cluster determining a score for the similarity of the user signature to the other user signatures in the set of user signatures of the cluster; and when said score is above a first threshold determine that the determined user signature falls within the cluster of user signatures; and when the score is not above the first threshold determine that the determined user signature does not fall within the cluster of user signatures.

In another exemplary method of operating a system in accordance with an embodiment of the present invention, the method includes the steps of: receiving a first set of session control messages belonging to a first communications session, said first set of session control messages including at least one session control message; extracting a set of device features from said first set of session control messages, said set of device features including features corresponding to how the device is being used; and operating a first neural network to determine a device signature for the first set of session control messages based on said set of device features.

In some embodiments the method further includes the step of: comparing the determined device signature to a set of device signatures of a cluster of device signatures having the same device identifier (e.g., Media Access Control (MAC) address, Internet Protocol (IP)address, Serial Number (SN), International Mobile Equipment Identifier (IMEI), Integrated Circuit Card ID (ICCID), Mobile Equipment Identifier (MEID), etc.) as the originator of the first communications session to which the first set of session control messages belong.

In some embodiments of the method, the method further includes based on the results of said comparison of the device signature to the device signatures of the cluster determining a score for the similarity of the device signature to the other device signatures in the set of device signatures of the cluster; and when said score is above a first threshold determine that the determined device signature falls within the cluster of device signatures; and when the score is not above the first threshold determine that the determined device signature does not fall within the cluster of device signatures.

The invention is also directed to systems and apparatus that are used to implement the various method embodiments of the invention. In some apparatus embodiments the group call signature determination system, the call processing node or device, e.g., SBC, the system configuration manager, the database system and each of the other apparatus/nodes/devices of the system include a processor and a memory, the memory including instructions that when executed by the processor control the apparatus/node/device of the system to operate to perform one or more steps or functions of the various method embodiments of the invention.

In an exemplary system embodiment in accordance with an embodiment of the invention, the system includes: a group session signature determination device including: one or more neural networks, and a first processor that controls the operation of the group session signature determination device to perform the following operations: receive a first set of session control messages (e.g., Session Initiation Protocol (SIP) packet messages, belonging to a first communications session, said first set of session control messages (e.g., SIP packet messages) including at least one session control message (e.g., SIP packet message); extract a first set of features from said set of session control messages (e.g., SIP packet messages); operate one or more neural networks to identify a group session signature to which said first set of session control messages (e.g., SIP packet messages) corresponds based on said first set of features, said identified group session signature (e.g., group communications session signature such as a group call session signature) being one of a plurality of group session signatures (e.g., group communications session signatures such as group call session signatures).

In another exemplary system in accordance with another embodiment of the present invention, the system includes: a first device, said first device including: a receiver that receives a first set of session control messages (e.g., Session Initiation Protocol (SIP) packet messages) belonging to a first communications session, said first set of session control messages (e.g., SIP packet messages) including at least one session control message (e.g., SIP packet message); a feature extractor that extracts a first set of features from said set of session control messages (e.g., SIP packet messages); and one or more neural networks that identify a group session signature to which said first set of session control messages (e.g., SIP packet messages) corresponds based on said first set of features, said identified group session signature being one of a plurality of group session signatures.

In another exemplary system in accordance with another embodiment of the present invention, the system includes: a first device, said first device including: a receiver that receives a first set of session control messages (e.g., Session Initiation Protocol (SIP) packet messages) belonging to a first communications session, said first set of session control messages, e.g., the first set of SIP packet messages, including at least one session control message (e.g., SIP packet message); a feature extractor that extracts a first set of user features from said first set of session control messages (e.g., SIP packet messages); and a first neural network that determines a user signature from the first set of session control messages (e.g., SIP packet messages) based on said first set of user features.

In another exemplary system in accordance with another embodiment of the present invention, the system includes: a first device, said first device including: a receiver that receives a first set of session control messages (e.g., Session Initiation Protocol (SIP) packet messages) belonging to a first communications session, said first set of session control messages, e.g., the first set of SIP packet messages, including at least one session control message (e.g., SIP packet message); a feature extractor that extracts a first set of device features from said set of session control messages (e.g., SIP packet messages); and a first neural network that determines a device signature from the first set of session control messages (e.g., SIP packet messages) based on said set of device features.

In various embodiments, the communications session(s), e.g., first communications session, is one of the following: a call session, a Voice Over Internet Protocol session, a multi-media session, an unified communications session, a WebRTC session, an audio session, a video session, a Rich Communications Services session, an instant messaging session, a text messaging session, a real-time communications session, a presence information sharing session, a user registration session, a device registration session, a conferencing session, an interactive collaborative multi-party session, an electronic whiteboard session, a desktop share session, and a Session Initiation Protocol session.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 3 comprises FIG. 3A and FIG. 3B.

FIG. 12 illustrates an exemplary SIP INVITE message.

FIG. 18 illustrates exemplary SIP packet parameters.

FIG. 19 comprises FIG. 19A, FIG. 19B, and FIG. 19C.

FIG. 26 comprises FIGS. 26A, 26B, 26C, 26D, 26E and 26F.

FIG. 26A illustrates a first part of a list 2600 of exemplary SIP features that can be used for feature extraction.

FIG. 26B illustrates a second part of a list 2600 of exemplary SIP features that can be used for feature extraction.

FIG. 26C illustrates a third part of a list 2600 of exemplary SIP features that can be used for feature extraction.

FIG. 26D illustrates a fourth part of a list 2600 of exemplary SIP features that can be used for feature extraction.

FIG. 26E illustrates a fifth part of a list 2600 of exemplary SIP features that can be used for feature extraction.

FIG. 26F illustrates a sixth part of a list 2600 of exemplary SIP features that can be used for feature extraction.

DETAILED DESCRIPTION

Figure 1:
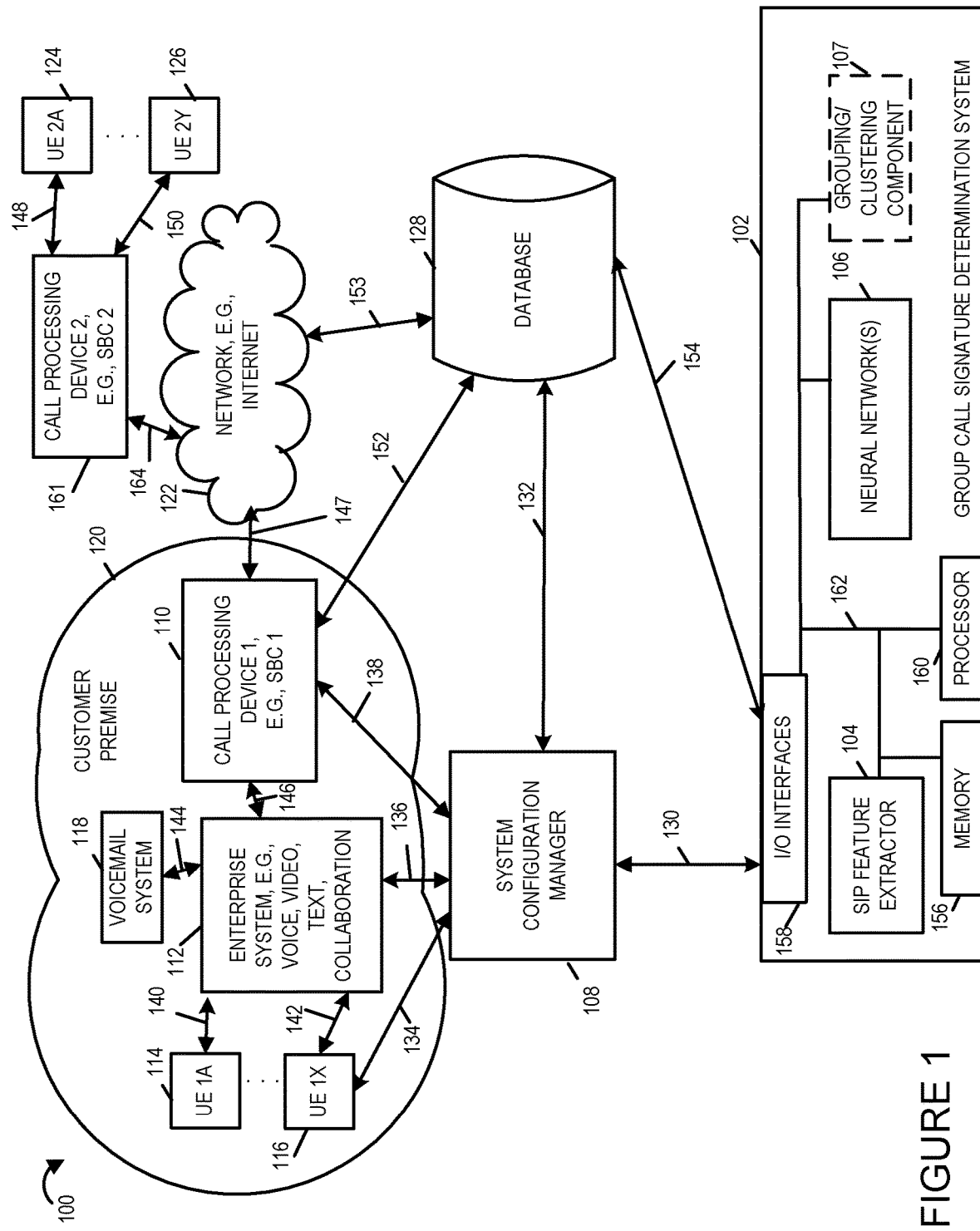
FIG. 1 illustrates an exemplary system in accordance with an embodiment of the present invention.

An important aspect of a provider of equipment or services is the ability to use the information learned or knowledge obtained from one or more customer environments across all deployed customers. The specific use cases are varied but an example is matching communications session flows, e.g., call flows, to similar communications session flows, e.g., call flows, so that knowledge or learnings about signaling controls such the IP Signaling Profile, the SIP trunk group, SIP Message Manipulation (SMM) rules, etc. can be replicated in a new environment. SIP Message Manipulation (SMM) is a specific example of a "flexible programming/scripting" environment used to provide domain specific signaling modification. While the invention is particularly useful when used for SIP messaging, it is also applicable to other signaling protocols, e.g., different session control messaging technologies such as for example the WebRTC signaling protocol.

The present invention discloses one or more methods, systems and/or apparatus for use in computing group signatures that not only meets the requirements of group signatures presented and discussed above, but also does not require a-priori knowledge of the essential content in loosely structured textual protocols. Furthermore, various methods, systems and apparatus of the invention are customizable allowing tuning of the level of specificity of the signature (i.e. the number of distinct groups generated for a particular corpus).

The present invention relates to, among other things, systems, apparatus and methods for the computation and use of group signatures for determining one or more of the following: communications session types (e.g., call types), device types and user identifiers or signatures. The system uses these group signatures to match new communications types, device types, and/or user signatures against previously known communications session types, device types, and/or user identifiers or signatures to produce at least some of, if not all of, learned data and information associated with the known communications session types, device types, and/or user identifiers or signatures. The learned data and information is then used to determine modification(s) to device configurations, user configurations and/or modifications of signaling, e.g., SIP signaling messages, for future calls, e.g., to "fix" problems. In some embodiments, the learned data and information is used to make determinations on device identity, user identity and communications session type. In some embodiments, these determinations when taken together support identity verification/security, user & traffic profiling, and fraud detection and prevention services. That is, one or more identity verification/security determinations and actions may be made based on the combinations of the determined device identity, user identity and communications session type.

Similarly, one or more user & traffic profiling determinations and actions may be made based on the combinations of the determined device identity, user identity and communications session type, and one or more fraud detection and prevention determinations and actions may be made based on the combinations of the determined device identity, user identity and communications session type.

In various embodiments, the communications session(s), e.g., first communications session, is one of the following: a call session, a Voice Over Internet Protocol session, a multi-media session, an unified communications session, a WebRTC session, an audio session, a video session, a Rich Communications Services session, an instant messaging session, a text messaging session, a real-time communications session, a presence information sharing session, a user registration session, a device registration session, a conferencing session, an interactive collaborative multi-party session, an electronic whiteboard session, a desktop share session, and a Session Initiation Protocol session.

Also, in various embodiments the signaling control messages are session control messages that are used for establishing, controlling, and/or managing communications sessions.

In explaining the various features of the invention, they will be discussed in the context of examples where the signaling or session control messages are Session Initiation Protocol (SIP) messages and the communications session(s) are calls, e.g., multi-media sessions or VOIP calls. However, such examples are to facilitate understanding of the invention and it should be appreciated that the methods and apparatus are not limited to SIP protocol embodiments and the communications session(s) are not limited to calls. For example, the session could be video sessions as opposed to call sessions. Similarly, many of the systems, devices and apparatus are referred to as performing operations on SIP message(s) such as SIP message feature extraction and/or are referred to as a SIP device, e.g., a SIP feature extractor. It is to be understood that such systems, devices, and apparatus are also able to perform the described operations and/or features with respect to other signaling protocols using session control messaging other than the Session Initiation Protocol.

In the following example of how one embodiment of the system works, a single "INVITE" packet message is considered. However, this is done for the sake of clarity in the explanation of the core elements of the signature generation. It should be understood the invention is not limited to a single SIP packet message or even SIP signaling as the invention can also be employed to extract features from the RTP media stream, RTCP stream and/or WebRTC stream corresponding to a call/session.

In an exemplary embodiment, the system comprises the following components:

A SIP feature-extractor function (SFE) which extracts the relevant features from a SIP INVITE into an input feature set (pre-image). The SIP feature-extractor function typically includes a SIP packet parser which parses received SIP packets as part of the SIP feature extraction process.

A neural-network autoencoder model (AEM) trained with feature sets of SIP INVITEs corresponding to known good calls. The model provides both the latent feature encoding (group) and the reproduction (post-image) of the input.

A database (DB) which can store/retrieve 1:N mappings of a group to all associated data.

A function (FFF) which given a SIP Packet Data Unit (PDU) extracts its pre-image and determines its group call signature ID and post-image (using AEM).

An HTTPS endpoint which accepts a SIP Packet Data Unit (PDU) and returns the group call signature ID and related group data using the above mentioned components and functions.

The input featurization implemented by the SIP feature-extractor function, and the trained autoencoder model (AEM) are discussed first. The operation of the overall system follows the discussion of the input featurization and training of the autoencoder.

In the training phase, the corpus (body of known good SIP INVITE messages) is used to train an autoencoder neural network. The input to this training is a set of "features" for each training sample. This section describes how this feature set is determined.

The semantic content of SIP messaging is defined by the SIP standards to be encoded only by the presence or absence of values and the specific content of those values. In practice, however, most implementations encode semantic content within the syntactic structure itself. According to the standards (e.g., IETF RFCs), the ordering of headers, for example, is immaterial but from a perspective of interoperability, it is often the case that this results in meaningful differences in behavior. Input featurization involves extracting from the SIP packet the list of headers, parameters, and values present in the SIP header, along with the ordering and count relationships.

While input featurization conceptually extracts all possible information from the messaging, it is deceivingly difficult using certain types of information encoded in the messaging. Therefore, in one embodiment of the system a subset of the SIP INVITE message packet information is extracted into input features for the model. Diagram 2600 of FIG. 26 includes a list of SIP features which have been used for extraction. It is to be understood that the list is not a list of all SIP features but an exemplary list of features which may be extracted from a SIP message packet. In this example, with respect to headers, the absence or presence of all known headers will be determined and encoded. Furthermore, the presence of a header will be further separated into cases of a single instance present, or more than one instance. Similarly, the absence, the presence of a single instance, or the presence of two or more instances of each known parameter will be determined and encoded.

Figure 17:
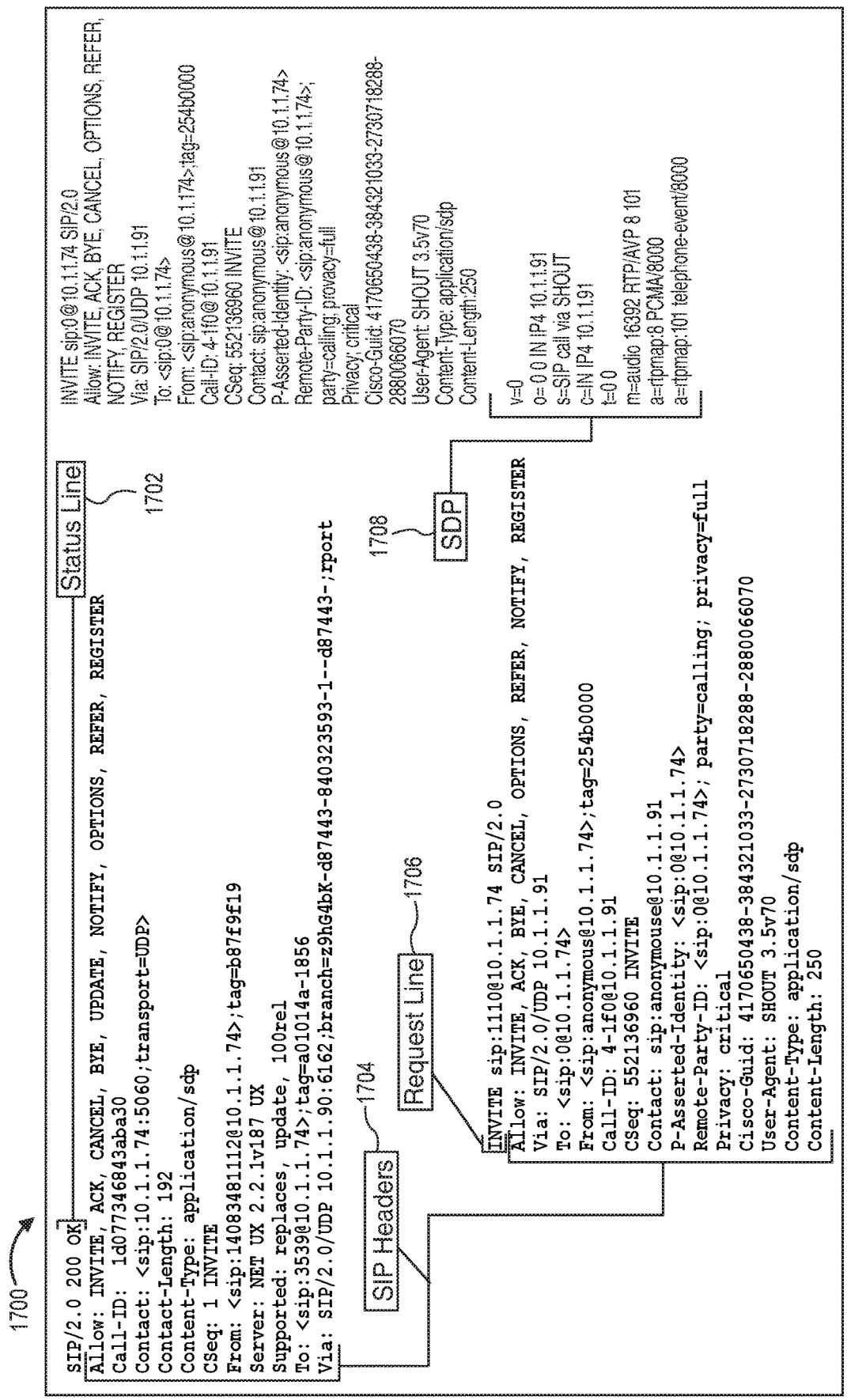
FIG. 17 illustrates the anatomy of an exemplary SIP message packet.

Diagram 1700 of FIG. 17 shows the anatomy of an exemplary SIP response message packet and an exemplary SIP INVITE request message packet including the location of the SIP headers 1704 in the exemplary SIP response and request messages, the location of the status line 1702 in the exemplary SIP response message and the location of the request line 1706 in the exemplary SIP request. The exemplary SIP response message is a SIP 200 OK response message and includes a Status line 1702, SIP Headers 1704. The exemplary SIP request message is a SIP INVITE request including a Request line 1706, SIP headers 1704, and an Session Description Protocol message 1708.

Diagram 1800 of FIG. 18 illustrates and identifies exemplary SIP packet parameters and their locations in an exemplary SIP response message including the SIP URI parameter 1802, Header parameter 1804, User URI parameter 1806. The location of the SIP packet parameters is similar for request messages, such as for example the SIP INVITE request packet data unit 1200 discussed below and illustrated in FIG. 12.

It is important to reiterate that the simplifications in input featurization described is exemplary in nature. Extraction of any or even all information from the SIP messaging into input features for model construction may be implemented.

Under the aforementioned limited SIP feature extraction rules discussed above, the transformation of any SIP packet into a feature vector is straightforward.

Consider the SIP Packet Data Unit 1200 shown below and also in FIG. 12. In FIG. 12 each line of the SIP Packet Data Unit 1200 has been numbered starting with the first line number 1202 and then the following lines numbered 1204, 1206, 1208, 1210, 1212, 1214, 1216, 1218, 1220, 1222, 1224, 1226, 1228, 1230 with 1240 being the last line of the SIP message packet under consideration.

Exemplary SIP INVITE MESSAGE PDU
INVITE sip:+843795332563@10.2.0.1:5060 SIP/2.0
Via: SIP/2.0/UDP 99.23.8.8:0;branch=z9hG4bK-14243-27817-0
Via: SIP/2.0/UDP 17.2.8.1:0;branch=z9hG4bK-0087
From: +6898375038687<sip:+6898375038687@99.23.8.8:0>;tag=14243SIPpTag0027817
To: +843795332563<sip:+843795332563@10.2.0.1:5060;tg-context="egresstg">
Call-ID: 387A9EFB@99.23.8.8
CSeq: 1 INVITE
Contact: sip:+6898375038687@99.23.8.8:0
Max-Forwards: 70
Subject: Performance Test
Content-Type: application/sdp
Content-Length: 137
v=0
o=user1 53655765 2353687637 IN IP4 99.23.8.8
s=-
c=IN IP4 99.23.8.8
t=0 0
m=audio 6001 RTP/AVP 0
a=rtpmap:0 PCMU/8000

Figure 13:
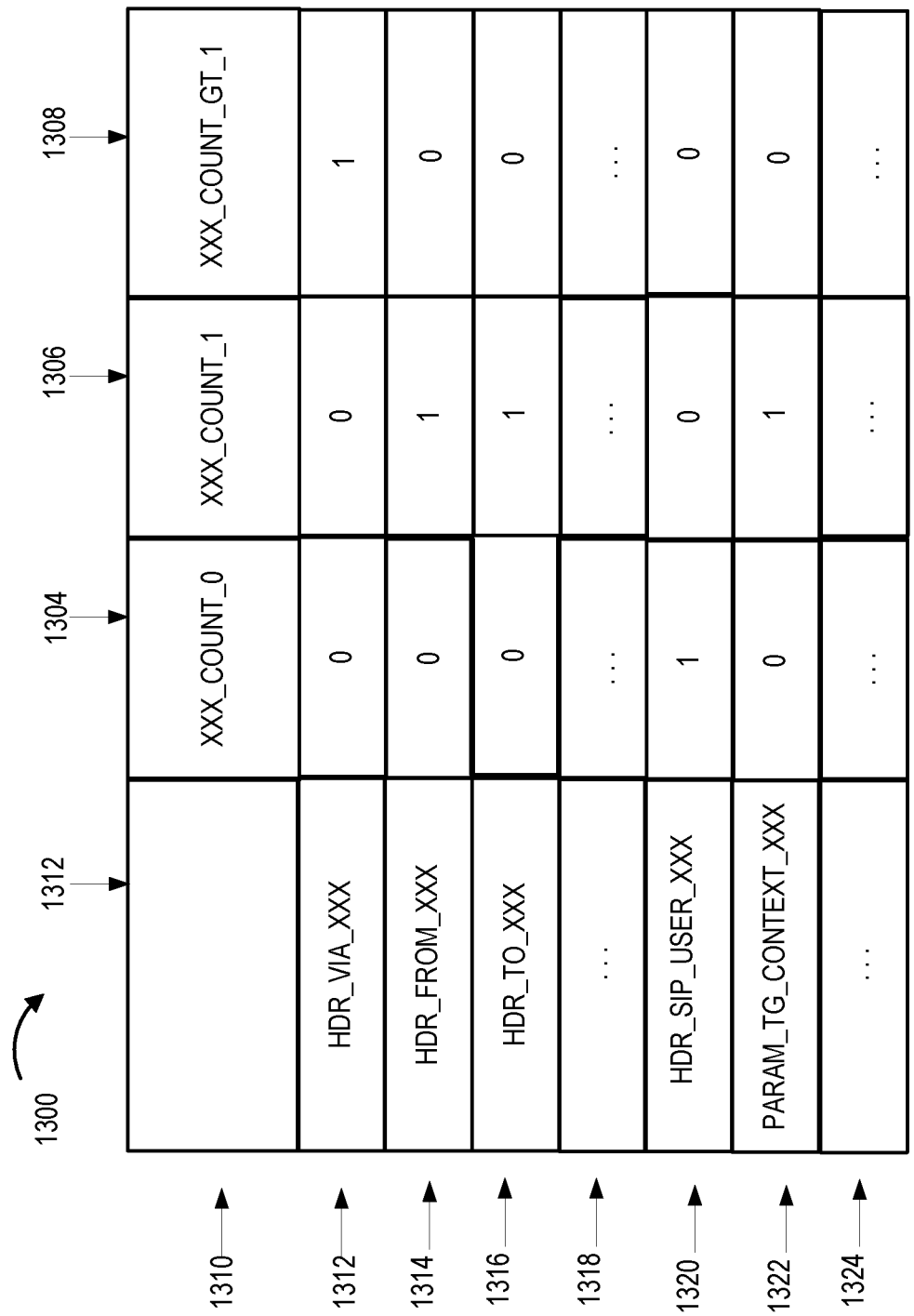
FIG. 13 illustrates an exemplary feature set extracted from the SIP INVITE message shown in FIG. 12.

The features extracted from the above exemplary SIP message PDU is shown in the table 1 below and in table 1300 illustrated in FIG. 13.

TABLE 1

Exemplary Extracted SIP Feature Set

|  | XXX_COUNT_0 | XXX_COUNT_1 | XXX_COUNT_GT_1 |
| --- | --- | --- | --- |
| HDR_VIA_XXX | 0 | 0 | 1 |
| HDR_FROM_XXX | 0 | 1 | 0 |
| HDR_TO_XXX | 0 | 1 | 0 |
| ... | ... | ... | ... |
| HDR_SIP_USER_AGENT_XXX | 1 | 0 | 0 |
| PARAM_TG_CONTEXT_XXX | 0 | 1 | 0 |
| ... | ... | ... | ... |

Figure 7:
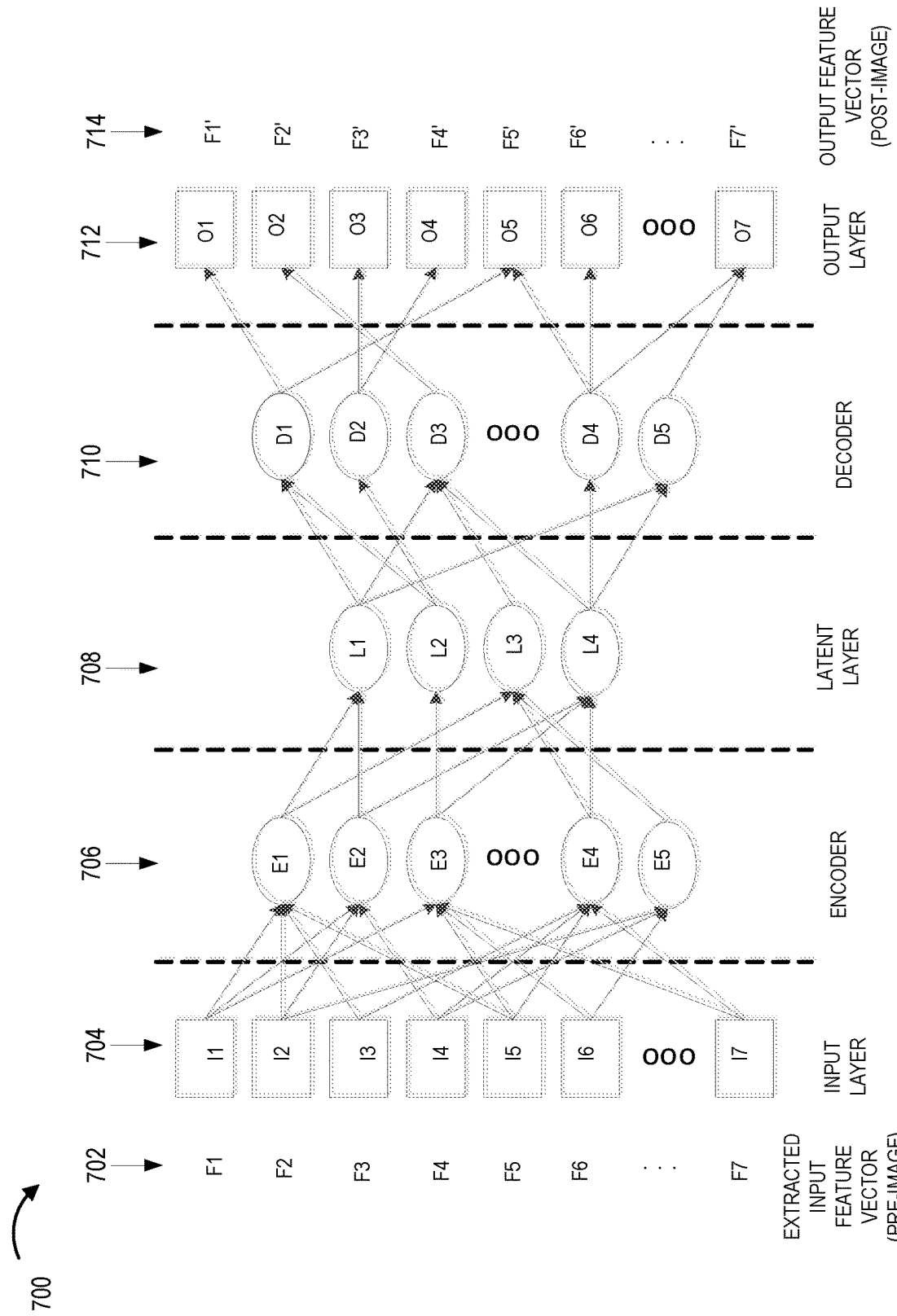
FIG. 7 illustrates an exemplary autoencoder neural network in accordance with an embodiment of the present invention.

An example architecture of an autoencoder neural network 700 is shown in FIG. 7. From table 1, it can be seen that there is more than 1 (GT standing for greater than) HDR_VIA_XXX, 1 HDR_FROM_XXX, 1 HDR_TO_XXX, no HDR_SIP_USER_AGENT_XXX, and 1 PARAM_TG_CONTEXT_XXX in the exemplary SIP INVITE message PDU shown above, XXX standing for any value.

The left half of the neural network comprises the input layer 704 and encoder 706. The extracted input feature vector 702 includes F1, F2, F3, F4, F5, F6, . . . , F7. The input feature vector is also sometimes referred to as a pre-image. F1, F2, F3, F4, F5, F6, . . . , F7 are numerical values. The extracted input feature vector is inputted into the input layer 704 with F1, F2, F3, F4, F5, F6, . . . , F7 being inputted into I1, I2, I3, I4, I5, I6, . . . , I7 respectively. The pre-image, also referred to as the input feature vector, is fed through some number of hidden layers which constitute the encoder 706, that is the encoder may include one or more encoding layers. The output of the encoder 706 of autoencoder neural network 700 is captured by the latent layer 708. The right half of the autoencoder neural network 700 is the decoder 710. The decoder 710 reconstructs a "post-image" also referred to as an output vector which can be compared to the "pre-image" or input vector. The decoder outputs the post-image to the output layer 712. The decoder 710, similar to the encoder 706, may include one or more decoding layers. The output layer 712 outputs the output feature vector which is sometimes referred to as a post-image. The O1, O2, O3, O4, O5, O6, . . . , O7 outputs respectively F1', F2', F3', F4', F5', F6', . . . , F7' of the output feature vector. The output feature vector are primes of the input feature vector because the post-image is not identical to the pre-image, that is there is some error or loss of information during the encoding and decoding process. E1, E2, E3, . . . , E4, E5 of the encoder 706 are encoder neural network nodes. L1, L2, L3, L4 are latent layer neural network nodes of the latent layer 708. D1, D2, D3, . . . , D4, D5 are decoder neural network nodes of the decoder 710. O1, O2, O3, O4, O5, O6, . . . , O7 are output nodes of the output layer 712. Each of the arrows from the Input Layer nodes I1, I2, I3, I4, I5, I6, . . . , I7 704 to the Encoder nodes E1, E2, E3, . . . , E4, E5 are neural network links having weightings. Each of the arrows from the Encoder 706 neural network nodes E1, E2, E3, . . . , E4, E5 to the neural network latent layer 708 nodes L1, L2, L3, L4 are neural network links having weightings. Each of the arrows from the latent layer neural network nodes L1, L2, L3, L4 to the decoder 710 neural network nodes D1, D2, D3, . . . , D4, D5 are neural network links having weightings. Each of the arrows from the decoder 710 neural network nodes D1, D2, D3, . . . , D4, D5 to the output layer 712 neural network nodes O1, O2, O3, O5, O5, O6, . . . , O7 are neural network links having weightings. The value or weightings of the links are determined during the training of the encoder neural network. Autoencorder neural networks are often used on images and, hence, the input and output are often referred to using image terminology. The goal is to minimize some error between the original image (pre-image or input vector) and the reconstructed image (post-image or output vector).

Figure 15:
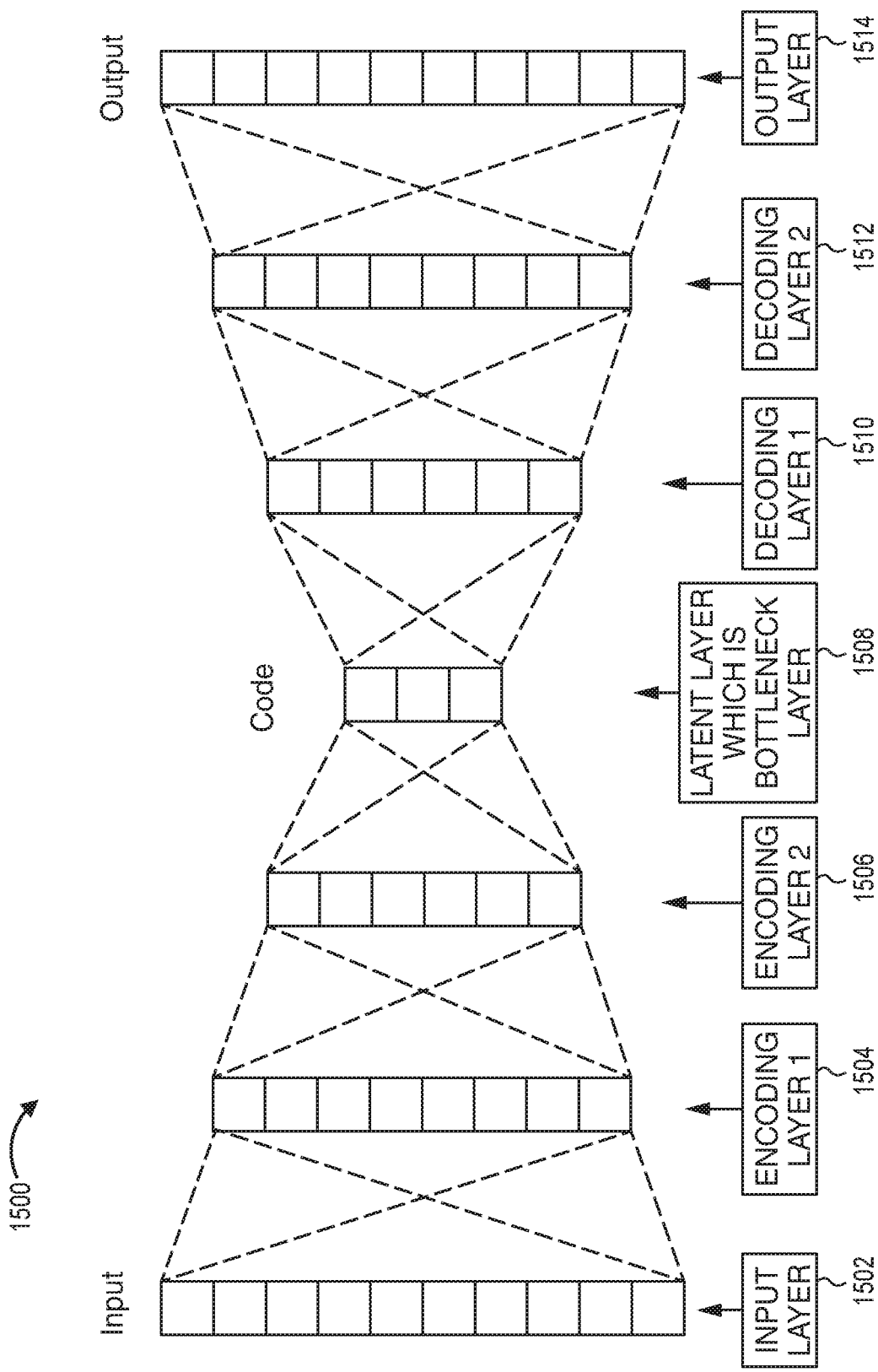
FIG. 15 illustrates an exemplary stacked autoencoder neural network in accordance with an exemplary embodiment of the present invention showing, among other things, that the latent layer of the autoencoder neural network is the bottleneck layer of the autoencoder neural network having the fewest neural nodes of any layer of the neural network.

FIG. 15 illustrates a stacked autoencoder 1500 with an input layer 1502, two encoding layers (encoding layer 1 1504 and encoding layer 2 1506), a latent layer 1508 which is the bottleneck layer having the fewest neural network nodes, two decoding layers (decoding layer 1 1510 and decoding layer 2 1512) and an output layer 1514. Neural network links connect the nodes of the different layers. The values of the nodes of the input layer 1502 include the input vector. The values of the nodes of the output layer include the output vector. The value of the nodes of the latent layer 1508 include the encoded input which is sometimes referred to as the code.

The training process in a neural network (NN) model is the optimization of the weights of the links between nodes of the adjacent layers. Since in some methods the weights can go to zero, this also indirectly determines which links should be removed entirely. For this example, once the architecture of the NN is defined, it is a generic NN and any existing packages and framework can be used for training. Common frameworks include TensorFlow, MxNet, Keras, and Torch. All provide methods for defining the network in terms of nodes, layers, linkage, and activation functions, and for then training the network on training data to minimize some objective function.

Described above and shown in FIG. 7 is the architecture of an autoencoder. Within an architecture, there are a multitude of potential implementations in terms of number of hidden layers, size of the hidden layers, mesh connectivity, etc. Such parameters are hyperparameters of the model and, following standard machine learning techniques, the appropriate choices for a particular implementation are made by using validation sets to determine hyperparameter values that globally minimize the reproduction error.

Figure 8:
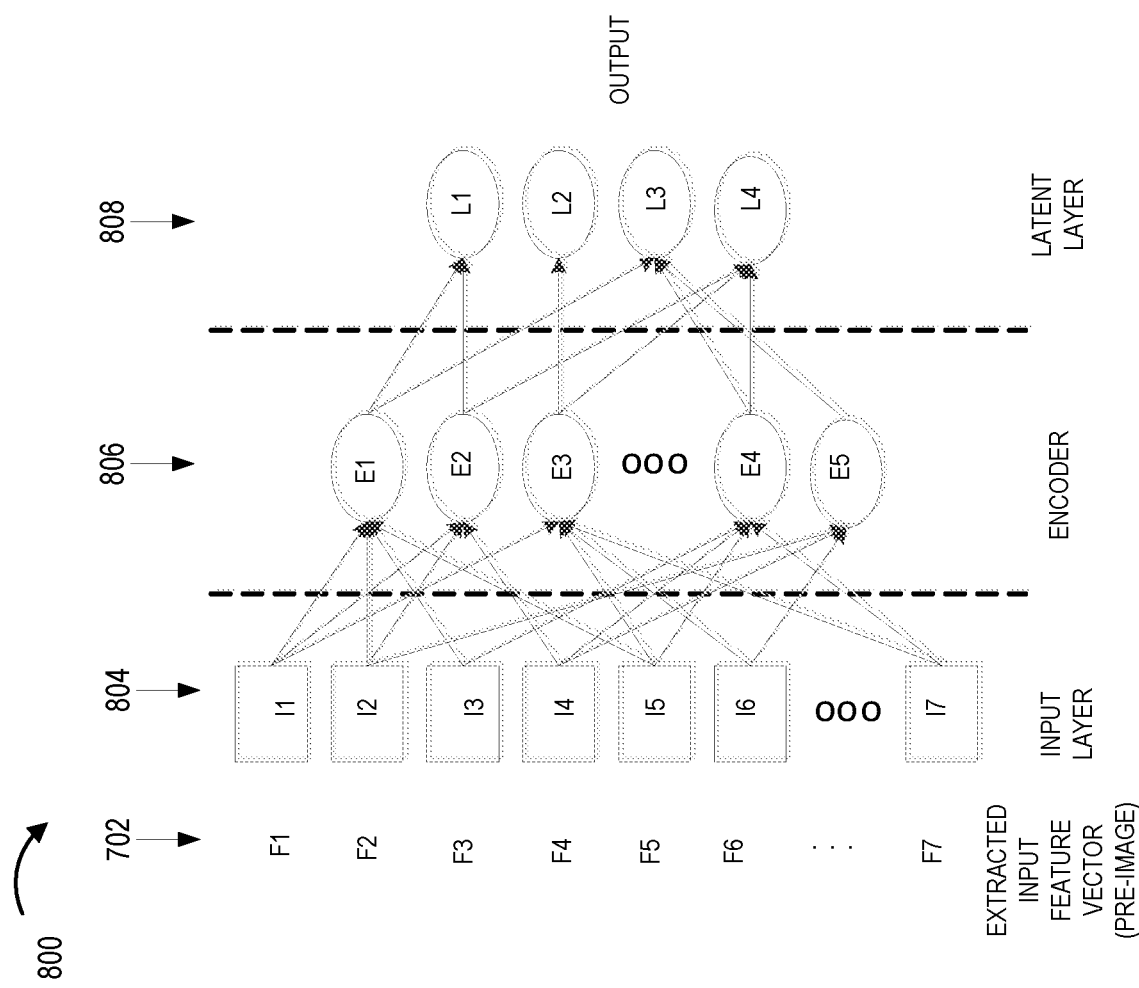
FIG. 8 illustrates an exemplary trained autoencoder neural network in accordance with one embodiment of the present invention.

After the network is trained, consider the subset network 800 illustrated in FIG. 8 taken from the left hand side of the neural network 700 illustrated in FIG. 7. Now, the latent layer becomes the output layer. The output taken from this layer has the desired characteristics of a group signature.

Several characteristics together create this effect. First, the latent layer is significantly smaller than the input layer. This necessarily means that the content of the latent layer is smaller than the input and, hence, the group signature is a compression of the original data. This necessarily performs a grouping function as multiple distinct pre-images or input vectors will result in the same signature. Second, the network is trained by minimizing the error between the reconstructed image and the original. This implies that the final settings of the network have captured the important relationships among the features of the input. In other words, the network "knows" the expected behavior because it has learned how the absence or presence of header Y in the pre-image should be affected when another header X changes. Third, the latent layer is a "bottleneck" layer relative to the input and output layers, the latent layer having the fewest neural nodes of any layer in the neural network. This implies that the latent layer cannot fully transfer the input layer information to the output layer, and so the latent layer must effectively "choose" the most important input layer information. Another way of describing this is the latent layer produces the equivalent of the high variance components of a principal component analysis (PCA) of the input data. Principal component analysis (PCA) is a statistical procedure that converts a data set of original variables using an orthogonal transformation into uncorrelated variables called principal components. The principal component variables can then be ranked in order of decreasing variability of the values of each variable. The top K variables in terms of variability which together represent more than some threshold percentage of total variability (such as for example 90% of variability) are denoted the high variance principal components.

With the NN defined and trained as described above, we now have the ability given a SIP INVITE S1 (or the entire message flow for the extended case) to compute a group signature GS1 which meets the following characteristics:

If the SIP INVITE is significantly similar to the SIP INVITE S2 of some other call, then GS1=GS2 where GS2 is the group signature of S2; otherwise, GS1!=GS2.

In some embodiments the autoencoder neural network is a variational autoencoder neural network.

The implementation of the overall system will now be discussed. In terms of process, there is a preparation phase, an operational phase, and an optional update phase. The bootstrap of the system starts with a corpus of SIP INVITEs from known "good" calls along with any relevant data associated with each call. This relevant data might include information such as associated SMM rules, Internet Protocol Signaling Profiles and Packet Service Profile settings, software release and peer information, etc. While in the exemplary embodiment, known "good" calls are used for training and grouping calls, it should be understood that the invention is applicable to calls which are both "good" and "bad" or a mixture of "good" and "bad" calls. For example, a training set of "bad" calls, e.g., calls that have experienced one or more problems and have associated therewith information on the changes made to fix the one or more problems may be used for determining a group call signature of a call with a similar problem(s) and the associated data can then be used to "fix" the call.

Figure 14:
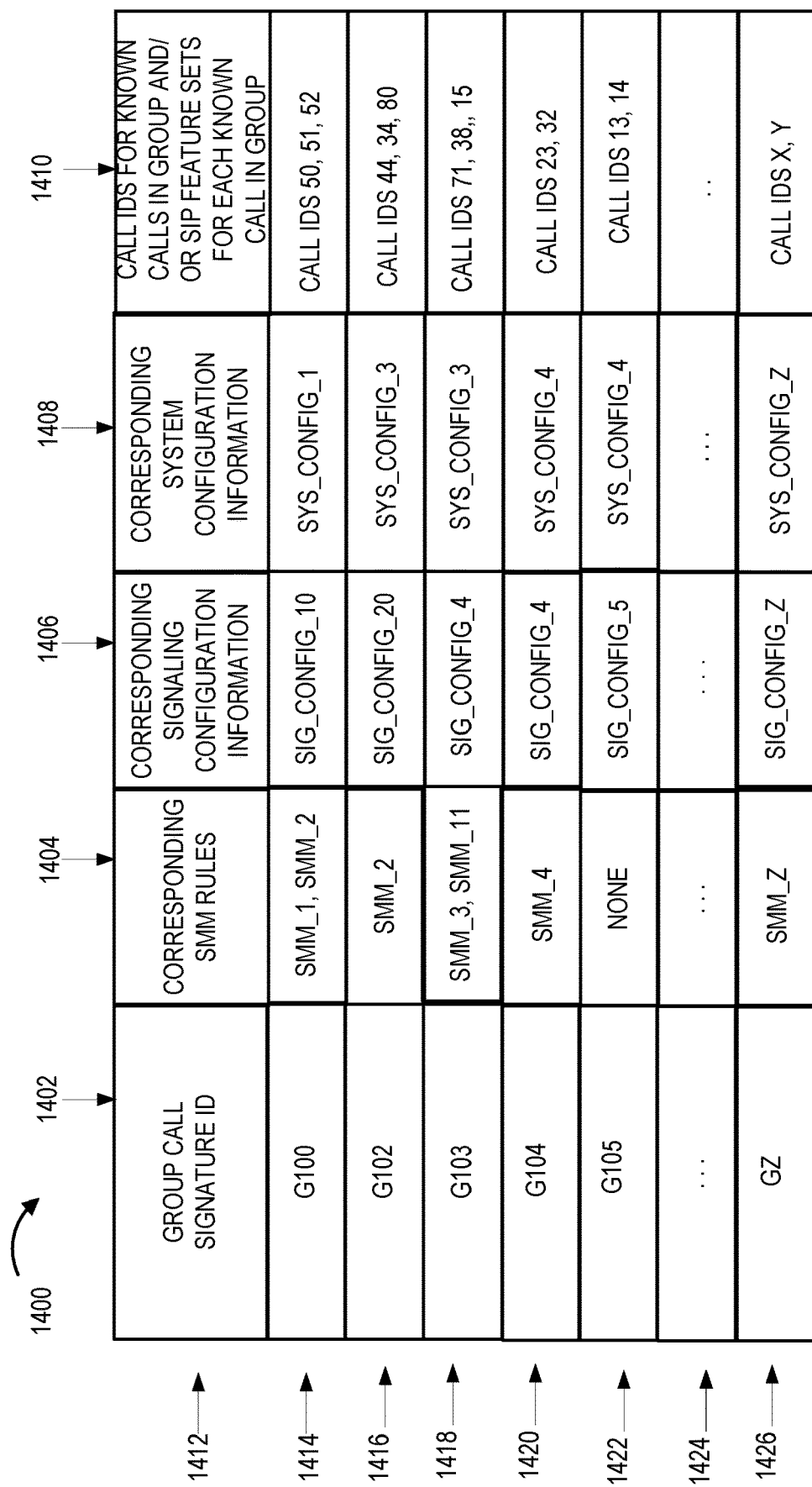
FIG. 14 illustrates exemplary group call signature records in accordance with an embodiment of the present invention.

In the preparation phase, a corpus of SIP INVITEs from known "good" calls is batch processed with the SIP Feature Extractor (SFE) to produce a starting data set of pre-images or input feature vectors. A training subset of the pre-images or input features vectors is then used to train the Autoencoder Model (AEM), and to generate the set of groups for the pre-images or input feature vectors. The final part of the preparation phase is the storage of the associated data. For every call with associated data, the group is determined, and the associated data is added to the data for that group in the DB. FIG. 14 illustrates a table 1400 including records for a plurality of group call signatures wherein each of rows 1412, 1414, 1416, 1418, 1420, 1422, 1426 associates a different group call signature with information corresponding to the group call signature. Row 1412 is presented for explanatory purposes with each of the entries indicating the information included in the column. Entry row 1412 column 1402 is the group call signature ID with each of the entries in column 1402 being a group call signature identifier. Entry row 1412 column 1404 is the corresponding SMM rules with each entry in the column 1404 being SMM rule information corresponding to the group signature identifier in the corresponding row as each of the SMM rules entries. Entry row 1412 column 1406 is the corresponding signaling configuration information with each entry in the column 1406 being Signaling Configuration information corresponding to the group signature identifier in the corresponding row as each of the Signature Configuration information entries. Entry row 1412 column 1408 is the corresponding system configuration information with each entry in the column 1408 being System or Device Configuration information corresponding to the group signature identifier in the corresponding row as each of the System Configuration information entries. Entry row 1412 column 1410 is the corresponding call identifiers for calls determined to have the group call signature with entries in the column 1410 being call identifiers corresponding to calls determined to have the group signature identifier in the corresponding row as each of the caller identifier entries. For example, group 100 (G100) (row 1414, column 1402) has the following information associated with the group 100: corresponding SMM rules SMM_1, SMM_2 (row 1414, column 1404), corresponding signaling configuration information SIG_CONFIG_10 (row 1414, column 1406)(e.g., IP Signaling Parameter settings), corresponding System Configuration Information SYS_CONFIG_1 (row 1414, column 1408), call IDs 50, 51, 52 (row 1414, column 1410).

In the operational phase, requests are made to the externally advertised HTTPS endpoint. Posting a SIP PDU to this endpoint results in a backend operation to map the PDU to a group call signature. The data (or some subset thereof) associated with that group is also obtained from the DB e.g., from a record in table 1400 including the determined call group signature identifier for the posted SIP PDU.

The updating phase allows for modifications to either the autoencoder neural network model or the associated data. The associated data is easier to handle, as this is just a DB write of additional data for an existing group. For model updates, in one embodiment the updates will be in an online manner. In another example, the preparation phase just needs to be re-executed with an expanded corpus, e.g., expanded set of good calls.

In the above example we simplify the processing to one SIP message being used to identify a signature for the call for the sake of brevity. If only individual SIP messages are going to be grouped, the group signature could instead be referred to as a group message signature instead of a group call signature.

In other embodiments, signatures for a call are generated using more than just a single SIP message but can include a portion or all of the SIP signaling, e.g., SIP message packets belonging to the call. There are several ways this can be achieved and these are outlined below, but in each case they are a natural extension of the initial case described above in connection with the single SIP INVITE message.

In some embodiments a group call signature is generated by means of applying an autoencoder neural network (AEC) across the totality of the SIP signalling associated with the call. Another enhancement of this which is discussed in further detail below is to generate a series of signatures where the size of the latent layer varies in size, allowing a user to search at different levels of granularity.

In other embodiments an overall group call signature is generated by means of a hierarchy of component pieces (such as individual SIP messages) each mapping to a component signature.

In another embodiment, two neural networks are used. The first neural network is trained with a latent layer that has more nodes than the latent layer of the second neural network. For example, train the first neural network with a latent layer of say 100 nodes (i.e. put all the calls into one of 100 groups). Train the second neural network with a latent layer of 10 nodes (i.e. put all the calls into one of 10 groups). The first neural network is more "granular" than the second neural network as it has more nodes in its latent layer than the second neural network. After the training has been completed a new call is applied to the first neural network to find the matching group. Use the data from the matching group call signature generated by the first neural network, e.g., the configuration, SMM rules, etc., for that matching call group signature in an attempt to determine a "fix" for a problem with the new call. If the data corresponding to the matching group call signature determined by the first neural network is not sufficient to determine a fix for the problem with the new call, then the call is applied to the second neural network. A matching group call signature is determined by the second neural network and the data associated with the group call signature, which includes additional configuration, SMM rules, etc. as it includes additional calls in the group, are used to determine a fix for the new call. In some embodiments, the features of the call are first compared to the features of the good calls in the group determined by the first neural network and when a good match is not found then the features of the new call are compared to the features of the good calls in the group identified by the second neural network in an attempt to find the "best" or most specific match to the new call.

Given the above explanation of the main components and processes of an exemplary system, some exemplary applications will now be discussed. Although not exhaustive or limited to these cases, they are useful by way of illustration of the invention's utility and the power of the invention to solve various problems.

In one exemplary application of the present invention, the invention is used to determine if a device, e.g., a new device deployed in a system or network, e.g., enterprise system or network, behaves similar to one or more devices previously deployed in the system or network or a similar system or network. This is particularly useful for the introduction of new devices into a network. The introduction of new devices into a network can cause failures (either the device or call fails to operate, or in an extreme case it may even cause a server to crash). In order to reduce such faults and to reduce the time to solving any issues, it is useful to know whether the call signaling scenario is one that has been experienced previously.

Given the above invention, it is clear that a corpus of existing call flows could be reduced to group call signatures and stored. When an operator needs to add a new device, they can test that in isolation (e.g. in a lab, or in a controlled introduction). By capturing the call signaling seen, that can also be reduced to a signature and compared against the existing database of stored signatures and associated data. Generating a similarity score of how similar that signature is to samples in the existing corpus, it gives the operator a sense of if this is very similar or identical to signaling already seen in production, thus giving the operator a high confidence that introduction of the device is likely low risk. Conversely if it varies significantly from anything seen previously, the operator can perform further testing and do due diligence on the introduction. In this example application the similarity score is determined from the latent layer output of the autoencoder neural network and/or the group call signature and/or clustering/grouping method or algorithm used to determine the calls within the group call signature.

There is clearly nothing limiting the corpus of signaling to one carrier, and in fact there is significant value in pooling data from multiple carriers. One may have already seen a device in action, that is new to another customer or carrier. Therefore, there is a simple extension of the previous case whereby the new device is tested against the total set of signaling that this SBC (or whatever entity is using this mechanism) has seen globally. As the database can store additional data for a flow, this can include configuration or SMM rules necessary to make this call work or calls from the new device work. This can be a great advantage in initially configuring a customer wherein a new customer or an existing customer with new equipment can utilize information from other previously configured systems reducing the complexity and length of time needed to configure the system for the customer. This is of great help to a customer, as boot-strapping such initial configurations can be long and complicated.

A subset of the previous case is when a new feature is introduced to a network, and although the devices are known, the new signaling caused by that feature may not be. Similar to the previous case, its possible that said flow is already known to the device from other customers, and therefore by means of mapping the call signature to an existing group call signature, appropriate initial configuration to make that feature work can be obtained.

The previous examples are focused on trying to ascertain if a call flow is (ideally) identical to something already seen. However there are use cases where value is obtained by knowing the set of signaling our sample is a closest match to. Even if there is an imprecise match, knowing the set of flows which correspond to the group call signature for the call flow being analyzed and are therefore the most similar to the call flow being analyzed still has merit. By means of parsing the signaling it is possible to show which components are the same and which differ (effectively providing a diffmark between the sample and nearest matching signaling). Such a diffmark can then provide a baseline for determining SMM rules that would remove such differences and provide an exact match. The process for determining such rules may be either via a human operator reviewing the output, or by an automated generation of baseline rules that could be adopted as is or adjusted by the human operator.

In some embodiments, multi-level signatures are implemented such as for example the case where multiple neural networks with different levels of group call signature granularity are used. As previously explained, this can provide multiple levels of group call signatures wherein each level further expands the number of good calls or associated information to be compared for a match or near match to the call being analyzed. In many instances the call being analyzed is one which completed, failed or in which a feature of the call did not operate properly. The SIP signaling information, e.g., SIP message packets belonging to a call, are captured and stored by the call processing device such as an SBC through which the messages are passing. This can be achieved through SIP call messaging logging or SIP call tracing wherein each SIP message packet of a call is stored along with associated information such as for example the sequence/ordering in which the messages where received and/or transmitted, SMM rules applied at the ingress or egress of the SIP messages, etc.

Various additional embodiments of the invention will now be discussed.

FIG. 1 illustrates an exemplary system 100 in accordance with an embodiment of the present invention.

The system 100 includes group call signature determination system 102, a system configuration manager 108, a database system 128, a first call processing device 1 (e.g., a Session Border Controller (SBC) 1) 110, a second call processing device 2 161 (e.g., a SBC 2), an Enterprise System 112 e.g., communications system providing Unified Communications services such as for example voice (VOIP), video, text and collaboration services, a plurality of communications devices (e.g., user equipment devices) UE 1A 114, . . . , UE 1X 116, a voicemail system 118, a network, e.g., Internet, PSTN, IMS network 122, additional communications devices (e.g., user equipment devices) UE 2A 124, . . . , UE 2Y 126, and a plurality of communications links 130, 132, 134, 136, 138, 140, 142, 144, 146, 147, 148, 150, 152, 153, 154, 162, 164 coupling the various elements of the system 100 so that the various elements can exchange data and communications. As shown in FIG. 1, the Enterprise System 112, voicemail system 118, Call Processing Device 1 110, and UE 1A 114, . . . , UE 1X 116 are located at customer premises 120.

The group call signature determination system 102 includes a feature extractor 104, e.g., a Session Initiation Protocol feature extractor, one or more neural network(s) 106 and optionally a grouping/clustering component 107, a plurality of Input/Output (I/O) interfaces 158 including transmitters and receivers, a processor 160 (e.g., CPU), memory 156 and communications bus 162 for interexchange of data, information and commands between the I/O interfaces 158, SIP feature extractor 104, memory 156, processor 160, neural network(s) 106 and grouping/clustering component 107. The group call signature determination system 102 receives a request for a group call signature determination including a set of text based protocol messages (e.g., a set of Session Initiation Protocol (SIP) packet messages) and data corresponding to a call. The group call signature determination system in response identifies a group call signature (e.g., a group call signature identifier) from a plurality of group call signatures for the call and returns it to the device that sent the request. The feature extractor 104, neural network(s) 106 and optional grouping cluster 107 may be, and in some embodiments are, implemented as separate devices each with a processor, memory and I/O interfaces, the memory including instructions which when executed by the processor control the operation of the device.

The feature extractor 104 (e.g., SIP feature extractor) extracts feature sets from a set of message(s) (e.g., SIP packet messages) and/or data, e.g., metadata belonging to a call, to generate an input vector (i.e., an extracted feature set) to be used as inputs into the neural network(s) 106.

The neural network(s) 106 typically includes at least one neural network for example a trained autoencoder neural network which is used to determine a group call signature for an inputted vector or extracted feature set, the output of the trained autoencoder being taken from the latent layer of the autoencoder. The latent layer, also sometimes called the code layer, of the autoencoder neural network has the fewest neural nodes of any of the layers in the autoencoder neural network and is sometimes also referred to as the bottleneck layer of the autoencoder neural network. In some embodiments, the one or more neural networks 106 is a single trained neural network which consists of or only includes the input layer, one or more encoder layers and the latent layer of the trained autoencoder, the latent layer of the trained neural network being used as the output layer.

In some embodiments, the neural network(s) 106 is configured to generate the group call signature for the call while in some other embodiments a grouping/clustering component or device 107 receives the output of the neural network 106 and identifies the group call signature identity (or identifier) by performing a grouping/clustering operation on the outputted neural network data (e.g., K-means clustering operation). The identity of the group call signature, e.g., group call signature identifier, is then outputted or returned to the system/device, e.g., system configuration manager, that requested the identification of the group call signature for the call. In some embodiments, the neural network(s) 106 include two neural networks, the first neural network being the trained autoencoder neural network which receives the input vector or extracted feature set and the second neural network being a neural network that receives the latent layer output of the autoencoder neural network as its input tensor/vector, performs a second clustering operation on its input tensor/vector and outputs a group call signature identifier for the call. In some embodiments, the neural network(s) 106 includes a trained autoencoder neural network which receives the input vector or extracted feature set and provides an output from the latent layer of the autoencoder neural network 106 to a grouping/clustering component 107 which outputs a group call signature identifier for the call. In some such embodiments, the grouping/clustering component 107 performs a K-means clustering operation on the autoencoder neural network 106 neural network latent layer output. The grouping/clustering component 107 may, and in some embodiments does, include a neural network. For example, in some embodiments a neural network in the grouping/clustering component 107 is used to determine coordinates of the centroid of a cluster as part of the K-Means clustering process.

The memory 156 includes control routines and software instructions which when executed by the processor 160 control the operation of the group call determination system 102 to perform one or more operations, steps, and/or functions of the methods described herein.

The communications links 140, . . . , 142 couple the UE 1A device, . . . , UE 1X device to the enterprise system 112 respectively. The communications link 146 couple the enterprise system 112 to the call processing device 1 110. The communications link 144 couples the enterprise system 112 to the voicemail system 118. The communications links 130, 132, 134, 136, 138 couple the system configuration manager 108 to the group call signature determination system 102, the database 128, the UE 1X device 116, the enterprise system 112 and the call processing device 1 110 respectively. The communications links 154 couples the group call signature determination system 102 to the database 128. The communications links 152 and 153 couple the database 128 to the call processing device 1 110 and the network 122. The communications links are wired, fiber optic or wireless communications links. The communications links are exemplary and various types of networks may be used to couple the various elements of the system 100 together allowing for the exchange of data, information and instructions between the various elements of the system. In the exemplary system 100 the call process device 1 110, enterprise system 112, voice mail system 118 and communications device UE 1A 114, . . . , UE 1X 116 are located at a customer premise 120. In at least some embodiments, the call processing device 1, e.g., SBC 1, 110 is located outside of the customer premises and is an edge device of an operator's communications network which provides services to the enterprise network, the call processing device 1 110 being a boundary device through which traffic into and out of the enterprise system passes.

The system configuration manager 108 is able to control the configuration of one or more devices in the system. In some embodiments, the system configuration manager 108 is able to control the configuration of one or more of the following devices: call processing device 1 110, the enterprise system 112 and the communications devices UE 1A 114, . . . , UE 1X 116, voicemail system 118. The system configuration manager 108 can control devices for example by sending devices configuration instructions or rules to be implemented. Some of such configuration rules can determine how protocol communications processing is implemented such as for example the implementation of protocol message manipulation rules, e.g., Session Initiation Protocol Message Manipulation (SMM rules). While the system configuration manager 108 is shown as a separate device, the system configuration manager may be, and in some embodiments is, a component of one of the devices of the system such as for example the call processing device 1 110, e.g., SBC 1, or a thin client application component executing on one of the UE 1A 114, . . . , UE 1X 116, UE 2A 124, . . . , UE 2Y 126 communications devices which can interface with other devices, e.g., call processing device 1 110, configuration programs.

Exemplary communications devices UE 1A 114, . . . , UE 1A 116 include devices such as for example mobile devices, telephones, smartphones, cell phones, IP phones, computers, laptops, tablets, audio/video conferencing systems.

One or more of the communications devices UE 1A 114, . . . , UE 1X 116, UE 2A 124, . . . , UE 2Y 126 use and/or are enabled to support the use of Session Initiation Protocol to communicate with other devices (e.g., contain SIP communications applications). The Enterprise System 112, call processing device 1 110 and call processing device 2 161 also use and/or are enabled to support the use of Session Initiation Protocol (SIP) for communications.

The call processing device 1 110 and call processing device 2 161 are call control aware devices. While Session Border Controllers (SBCs) are only one example of such devices, the call processing devices 1 110 and 2 161 will be discussed in the context of being SBCs. However, the invention does not require SBCs be the processing node and may be, and in some embodiments is, offered as a service. This allows any Call Control aware (interested party) not simply SBCs to query or request group call signature information.

In the exemplary embodiments discussed herein extensive use is made of SIP by way of an example signaling system/protocols. However, the principals of this invention are broader than SIP and are applicable to other signaling systems/protocols that exhibit similar diversity. The invention is particularly useful where the ordering and semantics of the signaling are highly flexible, leading to great number of permutations that are essentially equivalent.

Figure 6:
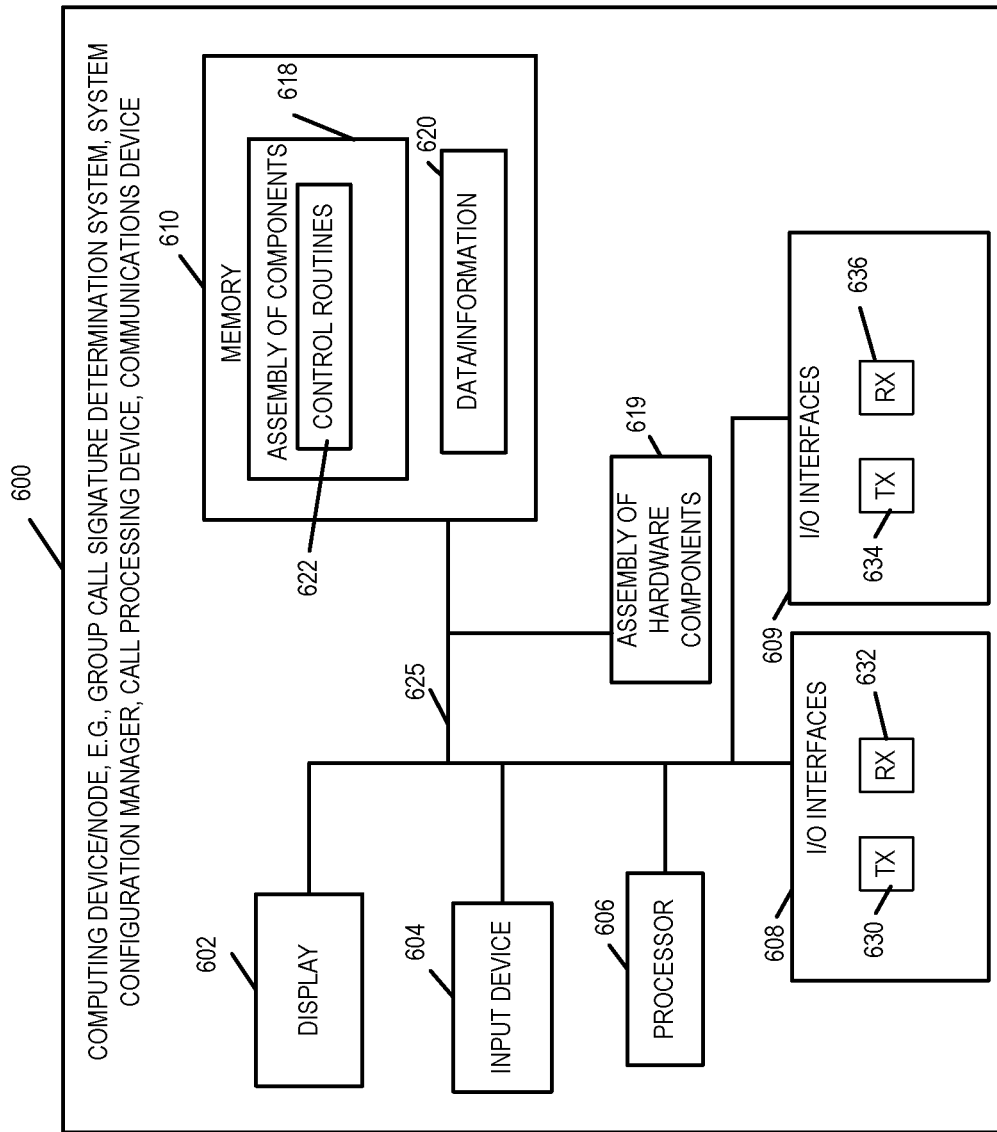
FIG. 6 illustrates an exemplary computing device in accordance with an embodiment of the present invention.

In some embodiments, one or more of the elements, nodes or components of the above mentioned systems are implemented in accordance with the exemplary computing device/node 600 illustrated in FIG. 6.

Figure 20:
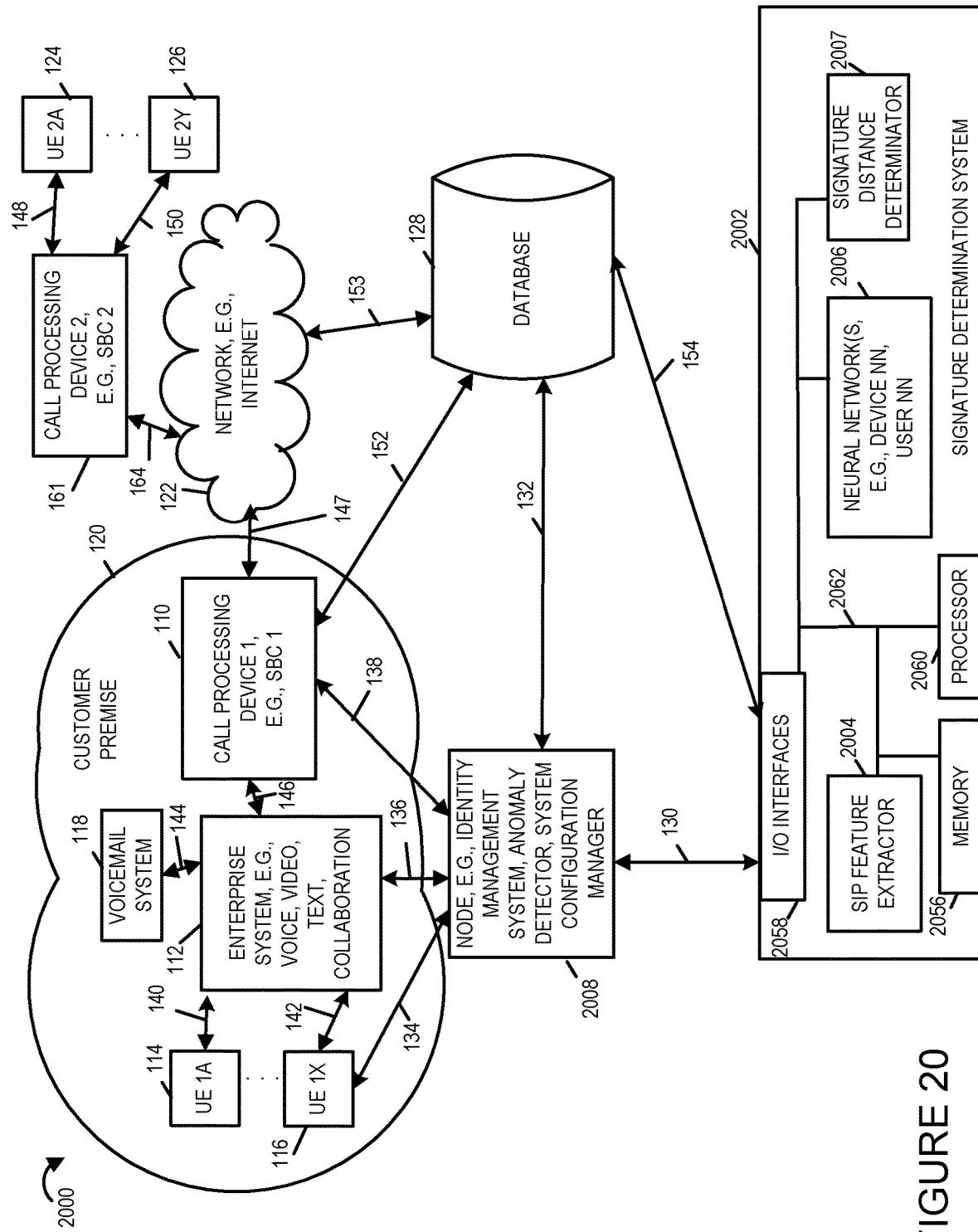
FIG. 20 illustrates another exemplary system in accordance with an embodiment of the present invention.

Exemplary computing device/node 600 includes an optional display 602, an input device 604, a processor 606, e.g., a CPU, I/O interfaces 608 and 609, which couple the computing device/node 600 to networks or communications links and/or various other nodes/devices, memory 610, and an assembly of hardware components 619, e.g., circuits corresponding to different components and/or modules, coupled together via a bus 625 over which the various elements may interchange data and information. Memory 610 includes an assembly of components 618, e.g., an assembly of software components, and data/information 620. The assembly of software components 618 includes a control routines component 622 which includes software instructions which when processed and executed by processor 606 control the operation of the computing device/node 600 to perform various functions and/or one or more steps of the various method embodiments of the invention. The I/O interface 608 includes transmitters 630 and receivers 632. The I/O interface 609 includes transmitters 634 and receivers 636. The I/O interfaces are hardware interfaces including hardware circuitry. The computing device/node 600 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Session Initiation Protocol (SIP), Session Description Protocol (SDP), Internet Protocol (IP), Transport Control Protocol (TCP), User Datagram Protocol (UDP), WebRTC protocols, Representative State Transfer (REST) protocol, SQL (Structured Query Language) Protocol, and HDFS Hadoop Distributed File System Protocol, SQL and/or HDFS being used to interface and access information from the various databases and/or storage devices to which it may be coupled. In some embodiments, the computing device/node 600 includes a communication component configured to operate using SIP, SDP, IP, TCP, UDP, REST protocol, SQL (Structured Query Language), HDFS Hadoop Distributed File System. In some embodiments, the communications component is a hardware component, a software component or a component including hardware and software components. While only a single hardware processor is illustrated in some embodiments, it is to be understood that the computing device/node 600 can include more than one processor with the processing being distributed among the plurality of processors. In some embodiments, one or more of the following are implemented in accordance with the computing device/node 600 illustrated in FIG. 6: node 2008, signature determination system 2002, Group Call Signature Determination System 102, System Configuration Manager 108, call processing device 1 (SBC 1) 110, call processing device 2 (SBC 2) 161, Enterprise System 112, voicemail system 118, and communications devices UE 1A 114, . . . , UE 1X 116, UE 2A 124, . . . , UE 2Y 126. In embodiments in which the group call signature determination system 102 is implemented in accordance with the node 600 the processor 160 is implemented as processor 606, the I/O interfaces 158 are implemented as I/O Interfaces 608 and 609, the memory 156 is implemented as memory 610, the bus/communications link 162 is implemented as bus 625, SIP feature extractor 104 is implemented in one or more of the components assembly of hardware components 619 or one or more of the assembly of software components 618 or a combination of hardware and software components 619 and 618, neural network(s) 106 are implemented in one or more of the components assembly of hardware components 619 or one or more of the assembly of software components 618 or a combination of hardware and software components 619 and 618, optional grouping/clustering component is implemented in one or more of the components assembly of hardware components 619 or one or more of the assembly of software components 618 or a combination of hardware and software components 619 and 618. In some embodiments, the SIP feature extractor 104, neural network(s) 106 and grouping/clustering component 107 are implemented as separate nodes or devices in accordance with computing node/device 600. One or more of the devices, nodes, and or systems disclosed in FIG. 20 may be, and in some embodiments are, implemented in accordance with computing node/device 600.

Figures 9, 9A:
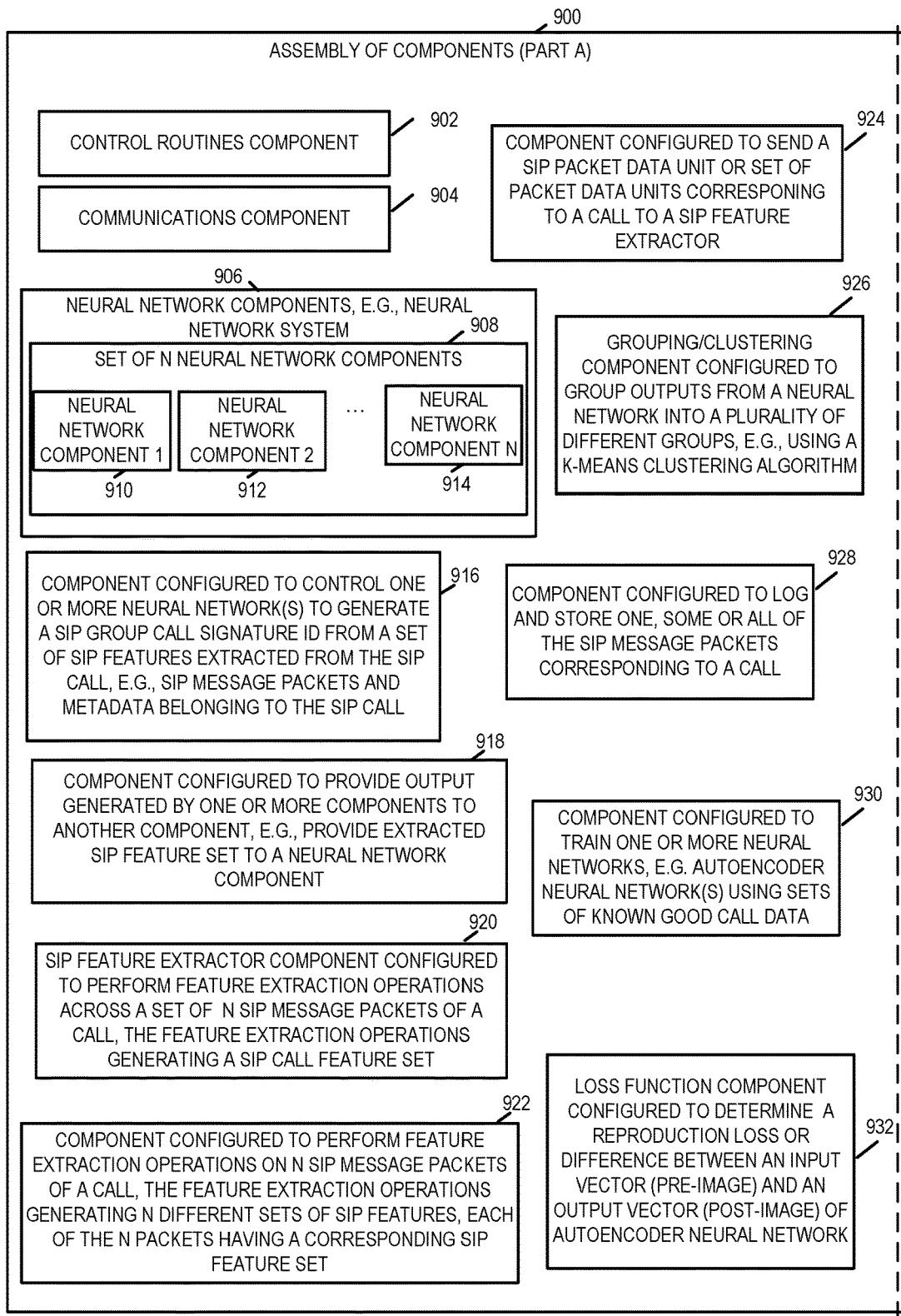
FIG. 9 comprises FIGS. 9A and 9B.
FIG. 9A is a first part of an assembly of components.
Figure 9B:
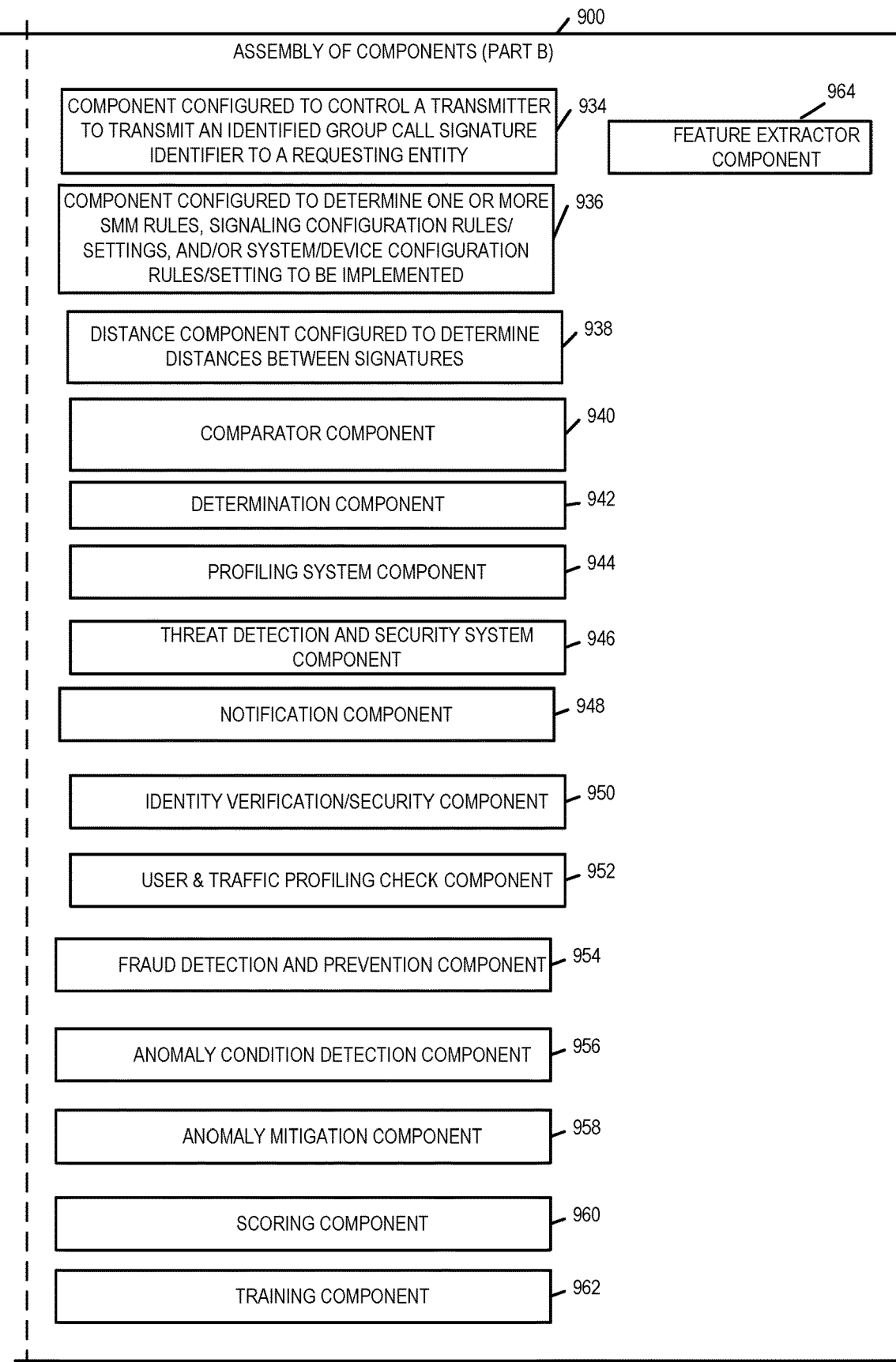
FIG. 9B is a second part of an assembly of components.

An exemplary assembly of components 900 for a computing node 600 in accordance with an embodiment of the present invention is illustrated in FIG. 9. FIG. 9 comprises FIGS. 9A and 9B. FIG. 9A is part A or a first part of an assembly of components. FIG. 9B is part B or a second part of an assembly of components. One or more of the components of the assembly of components 900 may be implemented as hardware components in the assembly of hardware components 619 or as software components in the assembly of software components 618 stored in memory 610 of the exemplary computing node/device 600. One or more of the components of the assembly of components 900 may be used in the assembly of components depending on the features desired for use in the particular device, e.g., different components will be used for a group call signature determination system than for the system configuration manager, the call processing device, enterprise system or communications device. The assembly of components 900 will be discussed in further detail below.

Figure 2:
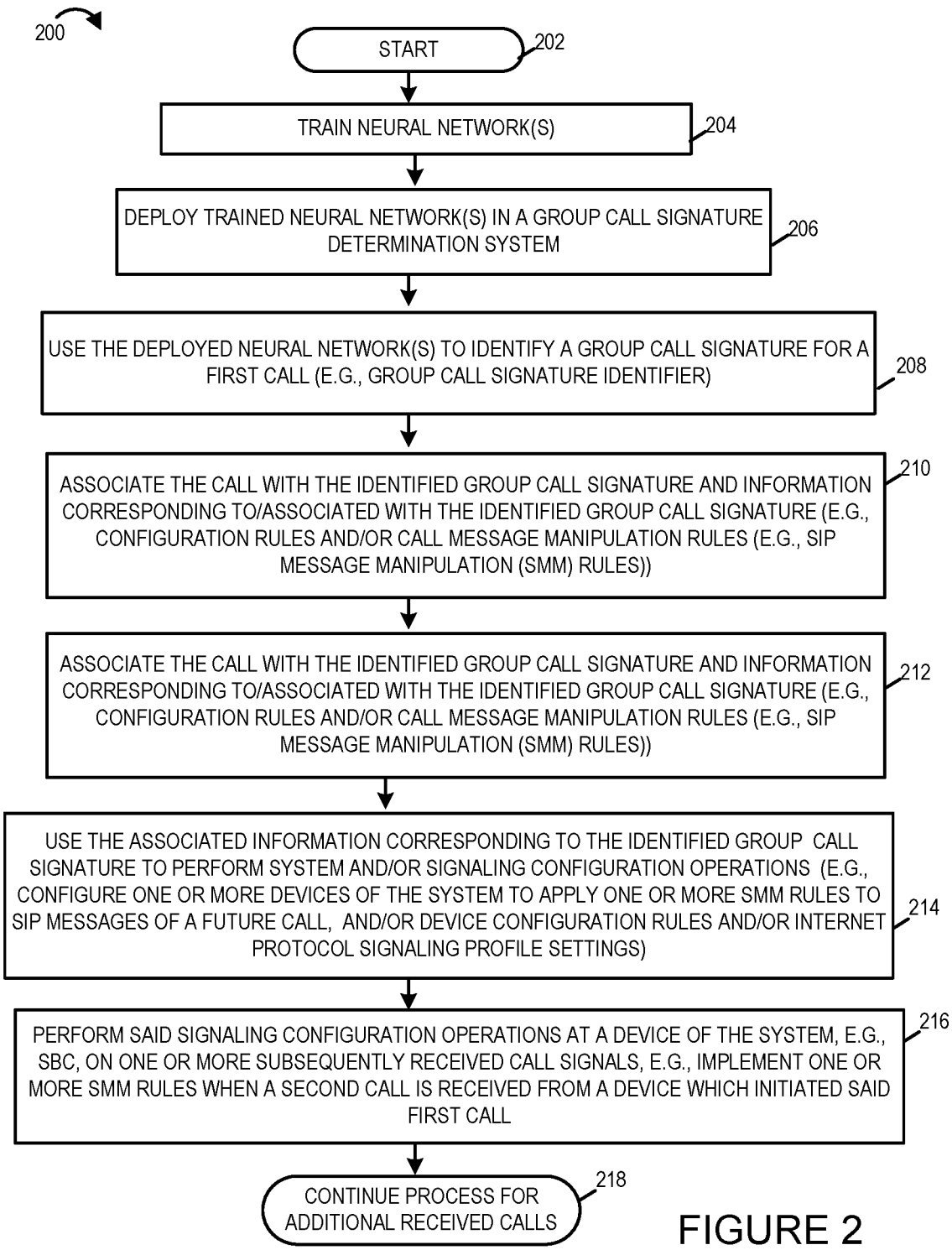
FIG. 2 illustrates an exemplary method in accordance with an embodiment of the present invention.

FIG. 2 illustrates a flowchart 200 of an exemplary method of the present invention. The method 200 of FIG. 2 may be implemented with various systems including those described in connection with FIGS. 1, 5, 6, and 20. The method begins in start step 202. Operation proceeds from start step 202 to step 204.

In step 204, the neural network(s), e.g., autoencoder neural network, is trained. In some embodiments, step 204 invokes or calls a neural network(s) training routine or subroutine method such as for example, the neural network(s) training subroutine method 300 illustrated in FIG. 3 which is discussed in further detail below. Operation proceeds from step 204 to step 206.

In step 206, deploy the trained neural network(s) in a group call signature determination system, e.g., group call determination system 102 of system 100 illustrated in FIG. 1. An exemplary trained autoencoder neural network 800 is shown in FIG. 8 and includes an input layer 804, an encoder 806 and a latent layer 808. The output of the latent layer being the output of the trained autoencoder neural network 800. Operation proceeds from step 206 to step 208

In step 208, use the deployed neural network(s) to identify a group call signature for a first call (e.g., group call signature identifier from a plurality of group call signatures defined during the training step 204). In some embodiments, step 208 invokes or calls a routine method such as for example, the routine method of identifying a call's group call signature using SIP message packets from the call 400 illustrated in FIG. 4 which is discussed in further detail below. Operation proceeds from step 208 to step 210.

Figure 11:
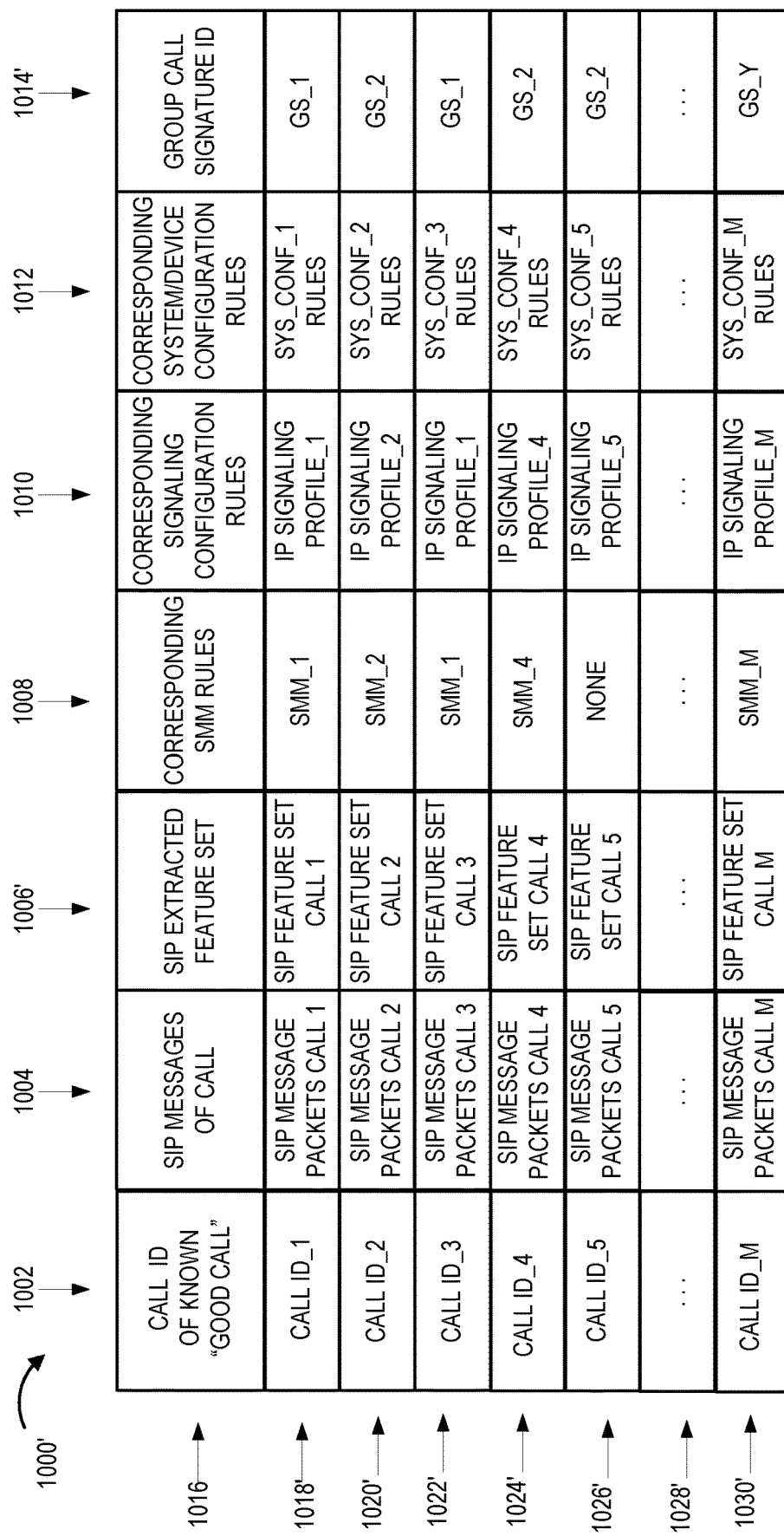
FIG. 11 illustrates details of the exemplary record shown in FIG. 10 including additional information, i.e., SIP Extracted Feature Set and Group Call Signature Id determined for each of the calls.

In step 210 the call is associated with the identified group call signature and information corresponding to/associated with the identified group call signature (e.g., signaling configuration settings/rules (e.g., IP signaling configuration settings/rules, Packet Service profile settings/rules), system/device settings/rules, and/or call message manipulation rules (e.g., SIP Message Manipulation (SMM) rules)). FIGS. 11 and 14 illustrate records showing information associated with group call signatures (e.g., SMM rules, signaling configuration rules, system/device configuration information, SIP messages of known good calls with the same group call signature, call identifiers of known good calls with a matching group signature, SIP extracted feature set of known good calls with a matching group signature). In FIG. 11, the records are organized by a call identifier with a field including the call's group call signature identifier (see column 1014' of table 1000'. In FIG. 14, the records are organized by group call signature identifier (see column 1402 of table 1400). The records and their format are exemplary as other formats and information may be used. The records are typically stored in a database, e.g., database 128 of system 100. In some embodiments, a system configuration manager associates the call with the identified group call signature and corresponding information based on the group call signature identifier provided by the group call signature determination system in response to a request sent by the system configuration manager, e.g., system configuration manager 108. In some other embodiments, the group call signature determination system 102 upon identifying a group call signature identifier for the call for example in response to a request retrieves the information associated with the identified group call signature from a database (e.g., database 128) and associates it with the call and sends the retrieved associated information to the requesting entity. Operation proceeds from step 212 to step 214.

In step 214, the associated information corresponding to the identified group call signature is used to perform system/device and/or signaling configuration operations (e.g., configure one or more devices of the system to apply one or more SMM rules to SIP messages of a future call and/or device configuration rules and/or Internet Protocol Signaling Profile settings). For example, in connection with system 100 the system configuration manager 108 may, and in some embodiments does, send one or more SMM rules from the associated information to the call processing device 1 110, e.g., SBC 1 to be applied on future calls and/or device configuration settings or rules to one or more of the communications devices (UE 1A 114, . . . , UE 1X 116) and/or device configuration settings or rules to the enterprise system 112. The system configuration manager 108 may, and sometimes does, also send system/device configuration settings to the call processing device 1, e.g., SBC 1, 110. In some embodiments, the system configuration manager 108 also sends SMM rule(s) and/or device configuration setting/rules to the call processing device 2, e.g., SBC 2, 161 which is a peer for call processing device 1, SBC 1, 110. The implementation of the one or more SMM rules or configuration rules/setting may be, and in some embodiments is, used to fix a problem, e.g., an improperly functioning feature of the first call or the inability of the first call to be completed, identified with first call. Operation proceeds from step 214 to step 216.

In step 216, the signaling configuration operations at the device of the system are performed on one or more subsequently received call signals. For example, call processing device 1 (SBC 1) 110 implements one or more SMM rules when a second call is received for example from a device which initiated the first call or from a source identified as the originator of the first call. Operation proceeds from step 216 to step 218.

In step 218, the processing continues for additional received calls by implementing steps 208, 210, 212, 214 and 216 with respect to each additional call received.

In some embodiments additional training is also performed on the neural network to update the information associated with each of the group call signatures and/or to redefine the group call signatures using additional training of the neural network(s) with additional calls and call information.

Figure 3A:
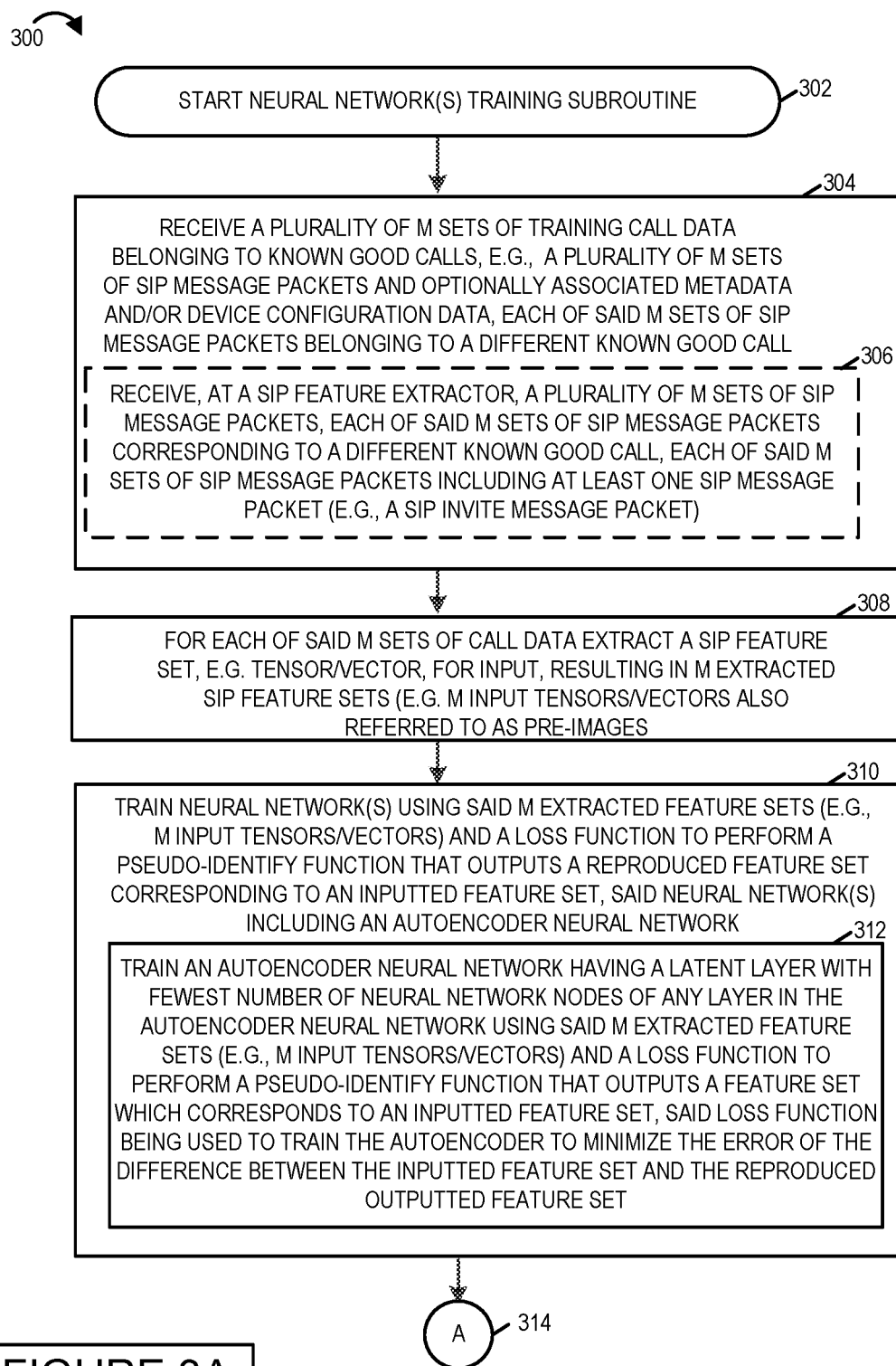
FIG. 3A illustrates a first part of a flowchart illustrating an exemplary neural network training routine or subroutine method in accordance with one embodiment of the present invention.
Figure 3B:
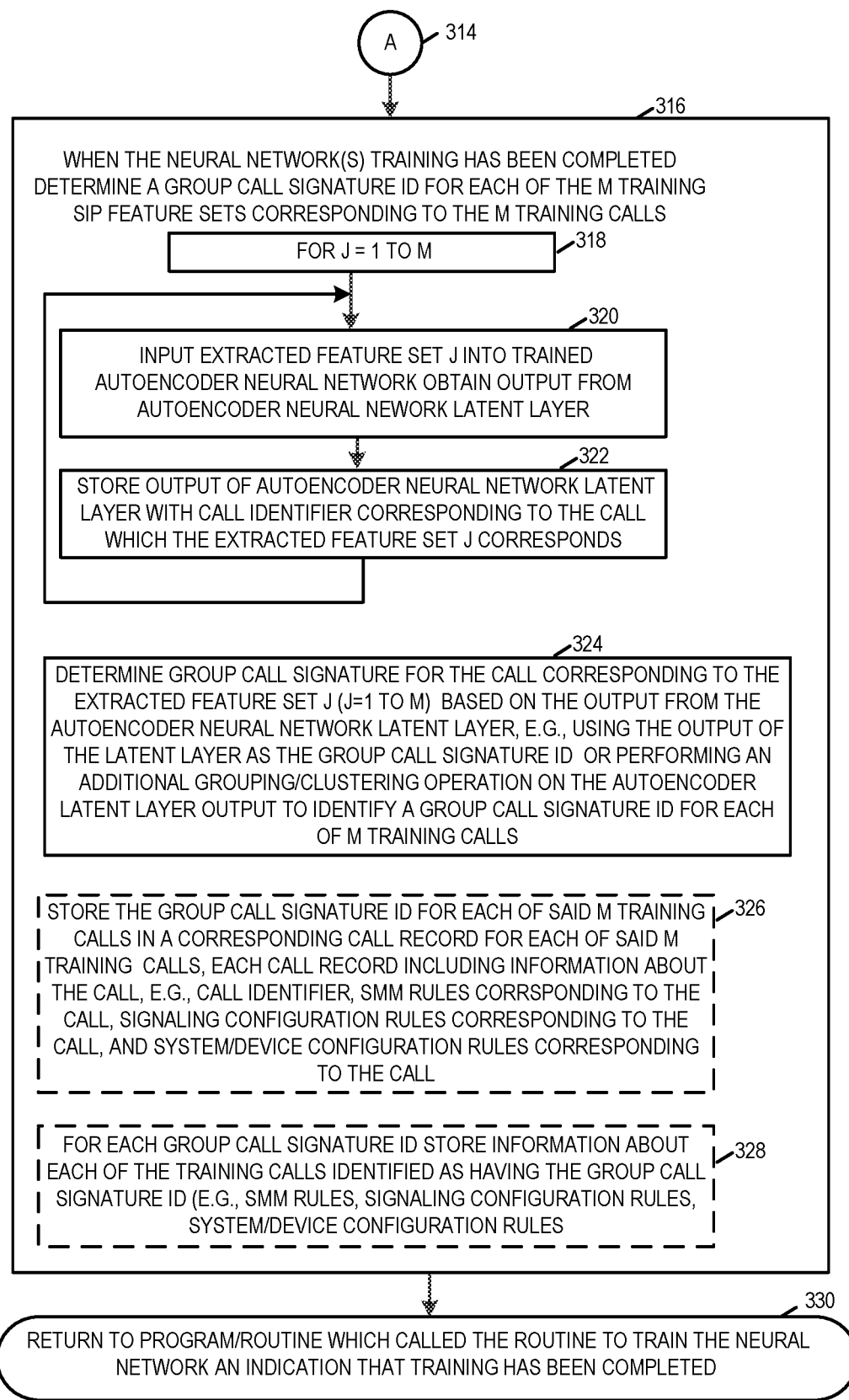
FIG. 3B illustrates a second part of a flowchart illustrating an exemplary neural network training routine or subroutine method in accordance with one embodiment of the present invention.

FIG. 3 illustrates a flowchart of an exemplary method/routine/subroutine 300 of training a neural network(s) in accordance with an embodiment of the present invention. FIG. 3 comprises the combination of FIGS. 3A and 3B. FIG. 3A illustrates the first part of the flowchart of method 300. FIG. 3B illustrates the second part of the flowchart of the method 300. The training method 300 may be, and in some embodiments is, implemented on the system 100 of FIG. 1. While the method 300 will be discussed in connection with system 100 for explanatory purposes it should be understood that the method is not limited to system 100 but can be implemented on other systems and other system configurations.

The method 300 starts in start neural network(s) training step 302 shown on FIG. 3A. Operation proceeds from step 302 to step 304.

In step 304, a plurality of M sets of training call data belonging to known good calls is received, e.g., by a group call signature determination system 102 or a SIP feature extractor 104, for example, a plurality of M sets of SIP message packets and optionally associated metadata and/or device configuration data, each of the M sets of SIP message packets belonging to a different known good call. In some embodiments, step 304 includes sub-step 306. In sub-step 306, a plurality of M sets of SIP message packets is received at a SIP feature extractor, each of the M sets of SIP message packets corresponding or belonging to a different known good call, each of the M sets of SIP message packets including at least one SIP message packet (e.g., a SIP Invite message packet). Operation proceeds from step 304 to step 308.

In step 308, for each of the M sets of call data extract a SIP feature set, e.g., a tensor/vector, for input to an autoencoder neural network as part of training the autoencoder neural network. This results in M extracted SIP feature sets. This step may be, and in some embodiments is, performed by group call determination system 102 and is typically performed by a SIP feature extractor, e.g., SIP feature extractor 104. Operation proceeds from step 308 to step 310.

In step 310, train the neural network(s) (e.g., neural network(s) 106) using the M extracted feature sets (M input feature tensors/vectors) and a loss function to perform a pseudo-identity function that outputs a reproduced feature set corresponding to the inputted feature set, the neural network(s) including an autoencoder neural network (e.g., autoencoder neural network 700 illustrated in FIG. 7). Step 310 in some embodiments includes sub-step 312. In sub-step 312, an autoencoder neural network having a latent layer with fewest number of neural network nodes of any layer in the autoencoder neural network is trained using the M extracted feature sets (e.g., M input feature tensors/vectors) and a loss function to perform a pseudo-identity function that outputs a feature set which corresponds to an inputted feature set, the loss function being used to train the autoencoder neural network to minimize the error of the difference between the inputted feature set and the reproduced outputted feature set. In some embodiments, the loss function in a mean square error based loss function. In some embodiments, the loss function is a cross entropy loss function. Operation proceeds from step 310 to step 316 shown on FIG. 3B via connection node A 314.

In step 316 when the neural network(s) training has been completed determine a group call signature ID for each of the M training SIP feature sets corresponding to the M training calls. Step 316 includes in some embodiments sub-steps 318, 320, 322 and one or more of sub-steps 324, 326, and 328.

In sub-step 318 a for loop J=1 to M is initiated. Operation proceeds from sub-step 318 to sub-step 320. In sub-step 320, extracted feature set J is input into trained autoencoder neural network an output is obtained from the autoencoder neural network latent layer. Operation proceeds from sub-step 320 to sub-step 322. In sub-step 322, the output of the autoencoder neural network latent layer is stored with a call identifier corresponding to the call which the extracted feature set J corresponds. Operations proceeds to step 318 where J is incremented and the sub-steps of the for loop are repeated. The processing of sub-steps 320 and 322 are repeated until all M extracted feature sets have been processed and outputs from the autoencoder latent layer obtained for each of the M extracted feature sets. Once the for loop J=1 to M has been completed operation proceeds from sub-step 322 to sub-step 324.

In sub-step 324, the group call signature ID is determined for the call corresponding to the extracted feature set J (J=1 to M) based on the output from the autoencoder neural network latent layer. For example, the output of the latent layer for each of the M calls may be used as the group call signature ID or an additional grouping/clustering operation may be performed on the autoencoder latent layer output to identity a group call signature ID for each of the M training calls, e.g., by using a K-means clustering machine learning algorithm to group the calls. Operation proceeds from sub-step 324 to sub-step 326.

Figure 10:
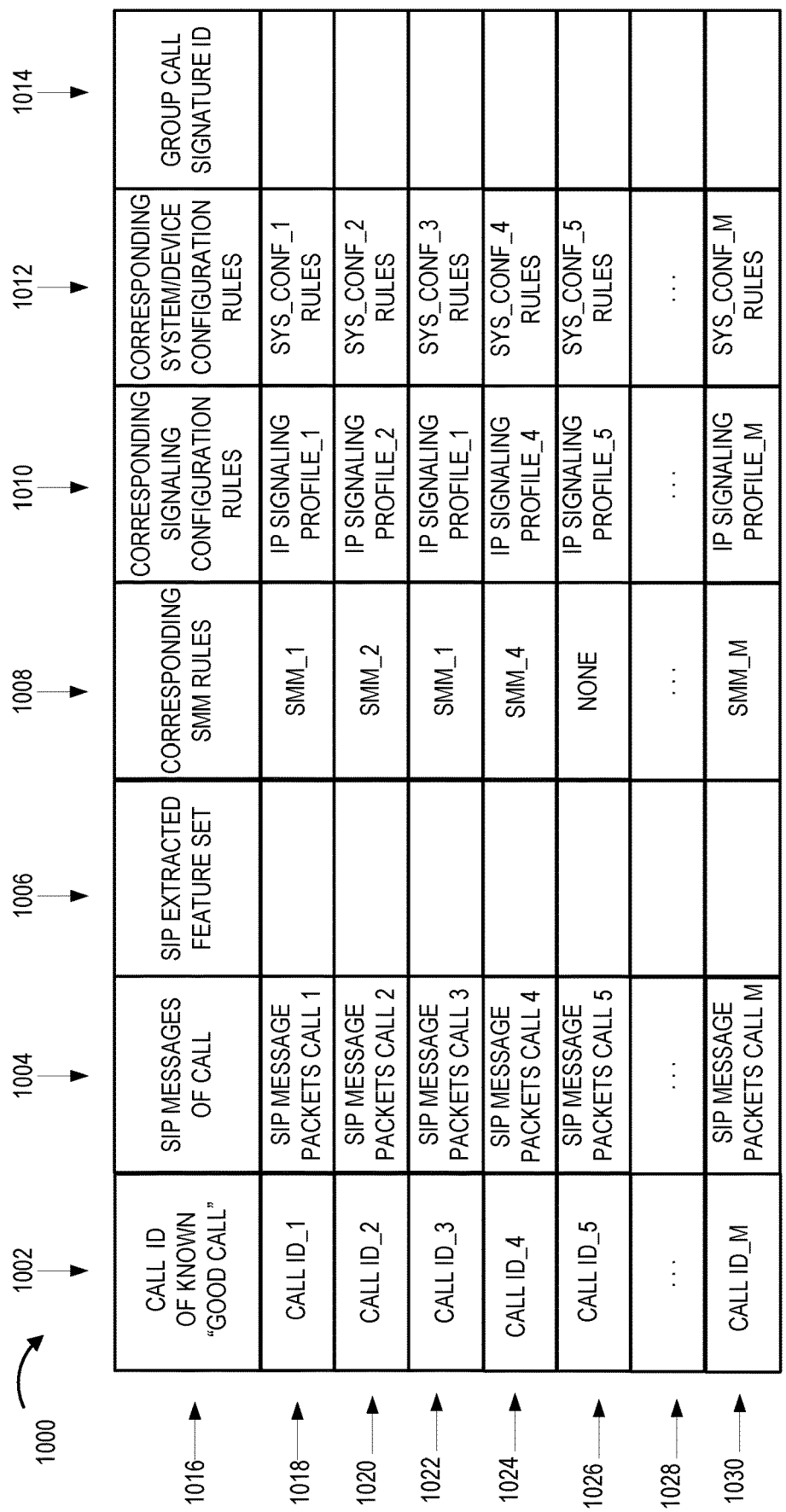
FIG. 10 illustrates details of exemplary call data records of known good calls used for training one or more neural networks, e.g., an autoencoder neural network, in accordance with an embodiment of the present invention.

In sub-step 326, the group call signature ID for each of the M training calls is stored in a corresponding call record for each of the M training calls. Each call record including information about the call, e.g., a call identifier, SMM rules corresponding to the call, signaling configuration rules/settings corresponding to the call, and system/device configuration rules/settings corresponding to the call. Table 1000 of FIG. 10 illustrates an exemplary set of training call records and corresponding information prior to training and FIG. 11 illustrates a table 1000' of the same set of call records updated with the SIP extracted feature sets and determined group call signature IDs after training has been completed. Operation proceeds from sub-step 326 to sub-step 328.

In sub-step 328 for each group call signature ID store information about each of the training calls identified as having the group call signature ID (e.g., SMM rules, signaling configuration rules, system/device configuration rules. Table 1400 of FIG. 14 illustrates an exemplary set of group call signature ID records with information corresponding to each of the group call signature IDs.

Operation proceeds from step 316 to step 330. In step 330, the routine/method 300 returns to the program/routine which called or invoked the routine to train the neural network 300 with an indication that it has completed. In some embodiments, the routine/method 300 returns the determined group call signatures for the training M set of training calls.

Figure 4:
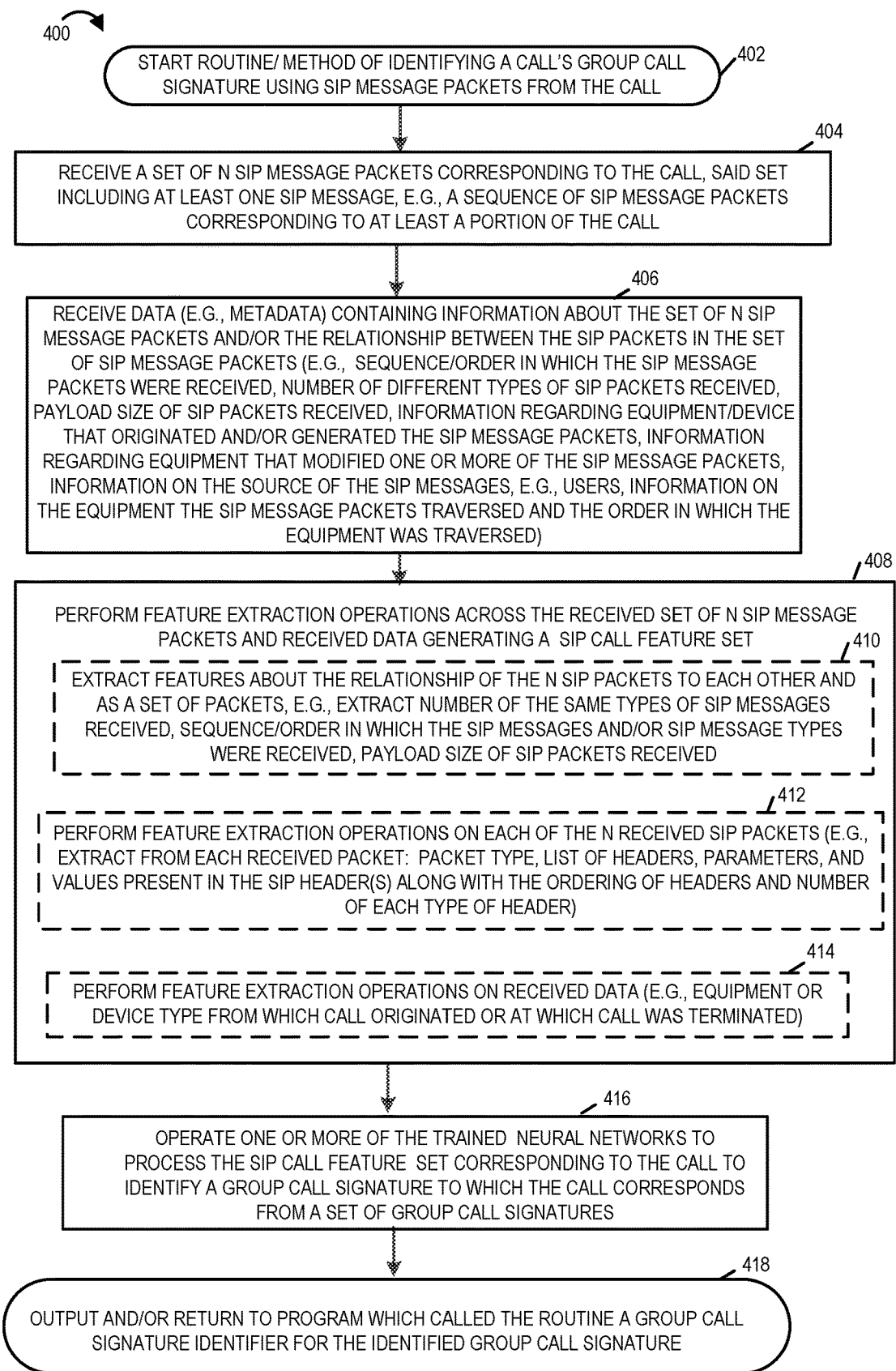
FIG. 4 illustrates an exemplary routine or method for identifying a call's group call signature using SIP message packets from the call in accordance with an embodiment of the present invention.

FIG. 4 illustrates a flowchart of an exemplary method/routine/subroutine 400 of identifying a call's group call signature using SIP message packets from the call in accordance with an embodiment of the present invention. The method 400 may be, and in some embodiments is, implemented on the system 100 of FIG. 1. While the method 400 will be discussed in connection with system 100 for explanatory purposes it should be understood that the method is not limited to system 100 but can be implemented on other systems and other system configurations. The steps of the method 400 are in some embodiments performed by the group call signature determination system 102 of system 100 illustrated in FIG. 1.

The method 400 starts in start 402. Operation proceeds from start step 402 to step 404.

In step 404, a set of N SIP message packets corresponding or belonging to a call are received, N being an integer number equal to or greater than 1, the set of N SIP message packets including at least one SIP message packet, e.g., a sequence of SIP message packets corresponding or belonging to at least a portion of the call. The set of N SIP message packets may be, and in some embodiments are, received from the system configuration manager 108 which in turn had received them from another device, e.g., call processing device 1 110 or retrieved them from the database 128. For example, the call processing device 1 110 may obtain the set of N SIP message packets from a SIP message call log wherein all SIP messages for a call controlled by the call processing device 1 processed by the call processing device 1 110 are logged and then sent to the system configuration manager 108 or stored in the database 128 for example with a call identifier. The SIP feature extractor 104 of the group call signature determination system 102 typically receives the set of N SIP message packets via the I/O Interfaces 158. Operation proceeds from step 404 to step 406.

In step 406 data, e.g., metadata, containing information about the set of N SIP message packets and/or the relationship between the SIP message packets in the set of N SIP message packets (e.g., sequence/order in which the SIP message packets were received, number of different types of SIP packets received, payload size of SIP packets received, information regarding equipment/device that originated and/or generated the SIP message packets, information regarding equipment that modified one or more of the SIP message packets, information on the source of the SIP message packets, e.g., users, information on the equipment the SIP message packets traversed and the order in which the equipment was traversed). The data is typically received by the SIP feature extractor 104 via the I/O interfaces 158. The data similar to SIP message packets may be, and in some embodiments are, received from the System Configuration Manager 108 and/or the database 128. Operation proceeds from step 406 to step 408.

In step 408, feature extraction operation across the received set of N SIP message packets and optionally the received data is performed generating a SIP call feature set also referred to as SIP input feature vector/tensor or pre-image. The SIP feature extractor 104 of the group call signature determination system is the component which typically performs this step. Step 408 in some embodiments includes sub-steps 410, 412, and 414. In sub-step 410, features about the relationship of the N SIP packets to each other and as a set of packets, e.g., extract number of the same types of SIP messages received, sequence/order in which the SIP messages and/or SIP messages were received, payload size of SIP packets received, are extracted. In sub-step 412, feature extraction operations are performed on each of the N received SIP packets (e.g., extract from each received packet: packet type, list of headers, parameters, and values present in the SIP header(s) along with the ordering of headers and number of each type of header). In sub-step 414, feature extraction operations on the received data is performed, e.g., equipment device type from which call originated or at which call was terminated. The extraction process results in a SIP call feature set or input vector that is a set of numerical values to be inputted into the one or more trained neural network(s) (e.g., neural networks 106 of the group call signature determination system). Operation proceeds from step 408 to step 416.

In step 416, one of more of the trained neural network(s), e.g., neural network(s) 106, is operated to process the extracted SIP call feature set also referred to as the extracted input feature vector corresponding to the call to identify/determine a group call signature to which the call corresponds from a set of group call signatures, the set of group call signatures comprising the group call signatures determined during the training of the neural network(s). FIG. 8 illustrates an extracted input feature vector F1, F2, F3, F4, F5, F6, . . . , F7 702 being loaded into the input layer 804 of an exemplary trained autoencoder neural network 800. The output of the neural nodes L1, L2, L3, L4 of the latent layer 808 which is the bottleneck layer of the autoencoder neural network 800 is used to determine the group call signature identity of the call. In some cases, the output is a set of numerical values which is the group call signature identifier. In some other embodiments, the output is sent to a grouping/clustering component 107 which performs a grouping function, e.g., K-means clustering algorithm, using the outputted values to determine the group call signature identifier for the call. In some other embodiments, the trained autoencoder neural network 700 is used as the neural network and the output is taken from the latent layer 708, the identity of the group call signature being based on the output of the latent layer 708 as previously explained in connection with the autoencoder 800. The output feature vector 714 from output layer 712 is not used to determine the group call signature as it is an approximation of the extracted input feature vector. The decoder portion of the autoencoder 700 is not utilized for the determination of the group call signature but can be used for future training of the neural network. Operation proceeds from step 416 to step 418.

In step 418, return and/or output to the routine or program which called the routine 400, a group call signature identifier for the identified group call signature for the call. For example, the group call signature determination system 102 via its I/O interfaces 158 sends or transmits the determined group call signature identifier for the call to the requesting entity, e.g., the system configuration manager 108. In some embodiments, the group call signature determination system sends with the group call signature identifier or in place of the group call signature identifier the information associated with the group call signature identified which it contains in its memory 156 or more typically retrieves from database 128 using the determined group call signature identifier.

Figure 5:
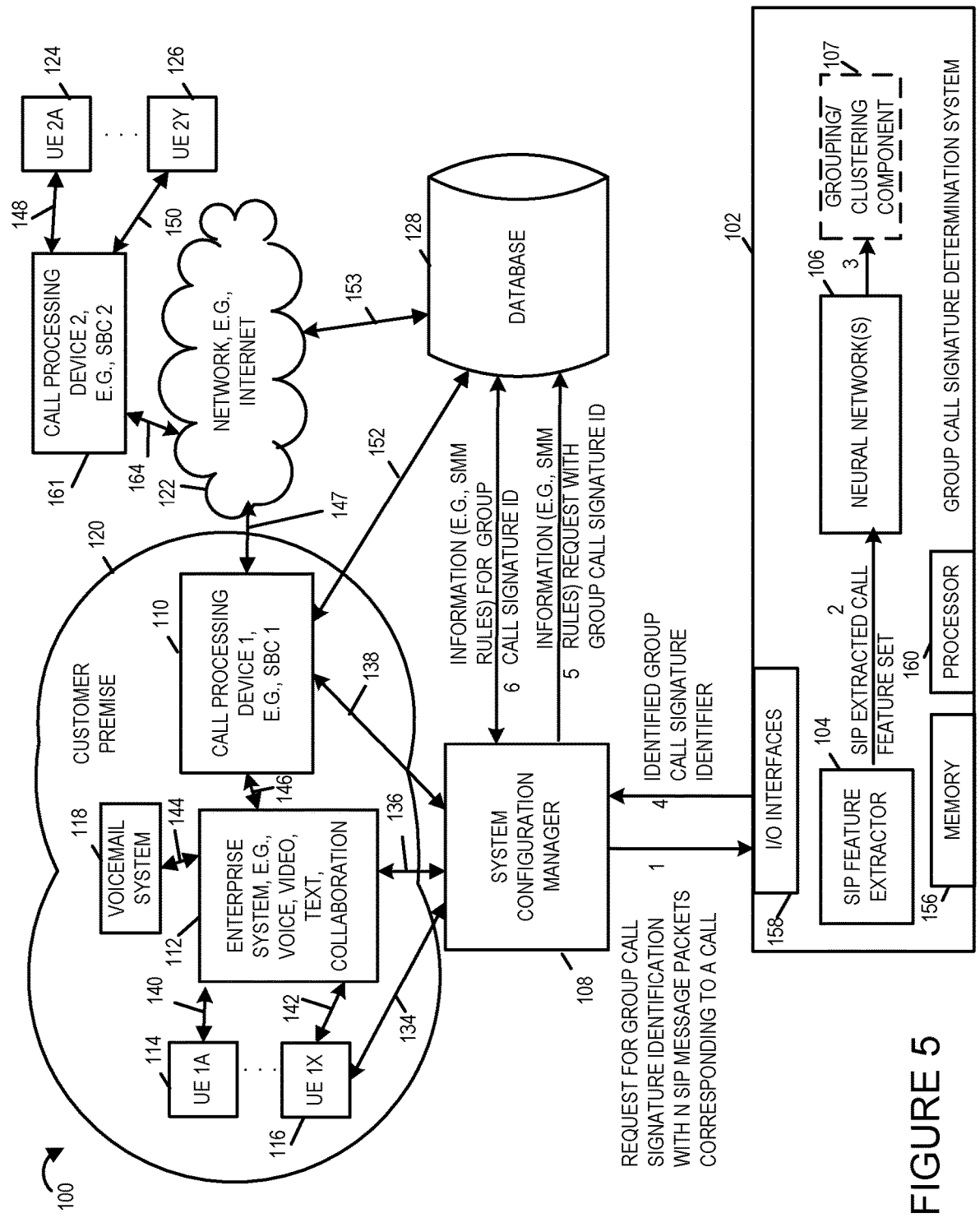
FIG. 5 illustrates steps of an exemplary method of determining a call's group call signature implemented on the system shown in FIG. 1.

FIG. 5 illustrates the steps of an exemplary method embodiment of the present invention using the system 100 illustrated in FIG. 1. It should be noted that not all of the communication links between the various device and within the group call signature determination system 102 are shown so that the steps and transfer of information between elements can be illustrated. In this example, a first call, e.g., VOIP call, has been made from UE 1X 116 to UE 2A 124. The signaling for the first call was initiated by the UE 1X 116 and traversed communications link 142, enterprise system 112, communications link 146, SBC 1 110, communications link 147, network 122, SBC 2 161 and communications link 148. The SBC 1 110 upon receipt of SIP message packets for the call logged the SIP message packets. SIP message packet logging has been initiated/requested by the customer of customer premise 120 in response to call failures or feature(s) incorrectly operating on calls generated from customer premise 120. The System Configuration Manager 108 in some embodiments instructs the SBC 1 110 to perform the SIP message packet logging for calls for example in response to detection of errors or problems with calls emanating from one or more devices of the enterprise system 112 and/or because enterprise system 112 and/or one or more devices of enterprise system 112 are being installed/configured/updated and/or the SBC 1 110 is being installed/configured or updated. N SIP message packets for the call from UE 1X 116 to UE 2A 124 are captured and sent to the System Configuration Manager 108 or to the database 128 with a call identifier and in some embodiments data, e.g., metadata, about the SIP message packets, the call, and/or devices involved in the call. Typically, at least a portion of the SIP message packets of the call are able to be captured and logged by the SBC 1 110. However, it is to be understood that if for example the call fails prior to completion of setup not all SIP message packets of the call will necessarily have passed through the SBC 1 110, e.g., packets from the UE 2A 124 toward the UE 1X 116 may not reach the SBC 1 110.

System configuration manager 108 in step 1 sends a request for group call signature identification with N SIP message packets and optionally information (e.g., metadata) corresponding to the call from UE 1X 116 to UE 2A 124 to SIP feature extractor 104 of the group call signature determination system 102. Operation proceeds from step 1 to step 2.

In step 2, the SIP feature extractor 104 generates a SIP extracted feature set and sends it the one or more neural networks 106. In this example, the SIP extracted feature set is the extracted input feature vector F1, F2, F3, F4, F5, F6, . . . , F7 702 shown in FIG. 8 which is being inputted into input layer 804 of the autoencoder neural network 800. Each of F1, F2, F3, F4, F5, F6, . . . , F7 represents an extracted feature value, the neural network(s) 106 being the trained autoencoder neural network 800. Operation proceeds from step 2 to step 3.

In step 3 the neural network(s) 106 process the extracted input feature vector and provides an output. As the neural network(s) 106 are the autoencoder neural network 800 the output is the output of the latent layer 808. Group call signature identifier may be, and in some embodiments is, the output of the latent layer 808. In some other embodiments including the embodiment shown in FIG. 5, the output of the latent layer 808 is sent to a grouping/clustering component 107 which determines/identifies the group call signature identity (e.g., group call signature identifier) based on the output of the latent layer 808 and an additional clustering or grouping algorithm, e.g., K-means clustering algorithm. Operation proceeds from step 3 to step 4.

In step 4, the group call signature determination system sends the identified group call signature identifier to the requesting entity which was the system configuration manager 108. Operation proceeds from step 4 to step 5.

In step 5, in response to the receipt of the group call signature identifier, the system configuration manager sends a request or query for information, e.g., SMM rules, with the group call signature identifier to the database 128. The database 128 includes a set of records correlating information from known good calls having different group call signature identifiers. Table 1000 shown in FIG. 11 is an exemplary set of records correlating group call signature IDs (GS_1, GS_2, . . . , GS_Y) to information of known good calls. Operation proceeds from step 5 to step 6.

In step 6, the database system 128 returns information for the group call signature identifier provided in the request/query to the system configuration manager 108. In this example, the determined group call signature identifier is GS_1. The returned information includes the information for known good call with call ID_1 from row 1018' of FIG. 11 and known good call with call ID_3 from row 1022'. This includes, among other things, SMM_1 which are the SMM rules corresponding to both call ID_1 and call ID_3, IP Signaling Profile_1 setting which corresponds to both call ID_1 and call_ID3 and System/Device Configuration rules SYS_CONF_1 rules which corresponds to call ID_1 and Sys_CONF_3 rules which corresponds to call ID_3. The database system 128 can send back all of the information included in rows 1018' and 1022' which correspond to the two calls which are included in the group of known good calls having the matching group call signature identifier GS_1.

The system configuration manager 108 receives the information and processes it to determine an action to be taken to attempt to fix the problem with calls originating from the enterprise system 112. For example, the system configuration manager 108 may send the SMM_1 rules to the SBC 1 110 for implementation and use in connection with one or more calls emanating from the enterprise system 112, or from calls originating from UE 1X 116, or calls which originate from UE 1X 116 and are destined for UE 2A 124.

The system configuration manager 108 may also send device configuration settings or instructions to the SBC 1 110, enterprise system 112 and/or UE 1X 116 to be implemented on one or more subsequent calls. In some embodiments, the System Configuration Manager 108 may compare the SMM_1 rules to SMM rules being implemented by the SBC 1 110 to determine any differences and send a notification to the SBC operator of any differences identified so that the SBC operator can make a determination/evaluation as to whether the differences are causing the problem or if implemented would cause additional problems. In some embodiments, the SIP message packets call 1 and SIP message packets call 3 are compared to the SIP message packets of the call between UE 1X 116 and UE 2A to determine differences and determine whether call ID_1 or call ID_3 is a closer match and then implement the system/device configuration rules of which call is a closer match. In some embodiments, the system configuration manager 108 will only automatically implement SMM rules or configuration settings or rules which it determines are an exact match of a portion of the features of the call to one of the calls with the same group call signature. In some embodiments, the System Configuration Manager 108 sends SMM rules and/or configuration rules/settings to SBC 2 161 to be implemented. Such a case may occur where the SBC 2 161 is also owned or operated by the same operator/service provider as SBC 1 110.

In another exemplary embodiment of the present invention device and/or user signatures are generated from one or more SIP messages, e.g., from a call, by a trained neural network and are used for identity management, identity management including for example, the detection of anomalies to protect the network and/or users. Device signatures can be used to identify malicious and/or misbehaving devices (e.g., traffic containing communications system level violations from the device (e.g., an access subscriber attempting to place a call from the device without registering), traffic from the device containing requests inconsistent with a known past state corresponding to the device (e.g., receiving a refresh registration request from a different device than the device that initially created a registration for an address of record (AOR) included in the refresh registration request)). Device signatures can also be used to report new or unknown types of devices being used in the system and/or by a particular user of the system. Verification services for a user identity (e.g., URI) can be provided based on user and device signatures and verifying them against location and device type of the particular user. The generated user and/or device signatures can also be used for detecting and reporting on concurrent user instances. From the security perspective, various security actions can be taken upon the detection of an incident indicative of an anomaly based on the generated device and/or user signatures corresponding to one or more SIP message packets or SIP signaling. For example, enforcement devices in the network, e.g., Session Border Controllers, can be instructed to block malicious devices and/or users from accessing the network or portions of the network. Additional security actions include identifying security vulnerabilities in network devices, providing information regarding incidents indicative of anomalies to fraud applications for detection of fraud, and generating incidents to be provided to a Security Information and Event Management System to provide notifications and take actions in response to reported incidents.

In another exemplary embodiment which will now be discussed, device signatures and/or user signatures are generated by neural networks and are used either alone or in combination for use in performing Identity Management functions such as the detection of incidents indicative of anomalies. In this example, there are two stages of operation. The first stage of operation is a training stage in which a device autoencoder neural network and/or a User autoencoder neural network are trained. The second stage of operation is use of the device autoencoder neural network and/or user autoencoder neural network to generate signatures from a SIP message packet from which incidents indicative of anomalies can be determined.

The training stage includes the following steps:
1. Train Device neural network (Autoencoder) with device attributes feature sets also referred to as device feature input vectors extracted from training data (e.g., known good SIP messages);
2. Train User neural network (Autoencoder) with user attributes feature sets also referred to User feature input vectors extracted from training data (e.g., known good SIP messages);
3. For known good SIP messages:
   a. Extract device and user attributes from SIP message
   b. Encode device signature (device attributes) using trained Device NN
   c. Encode user signature (user attributes) using trained User NN
   d. From SIP message, extract User Identity out of From header URI(user) or out of the P-Asserted-ID which is preferable when present; and
   e. Store—User Identity, user signature, device signature in User Signature database.

Steps of the Second Stage of Operation (New SIP Message Arrives) Include:
1. Extract device and user attributes/features from SIP message;
2. Using trained Device NN (extracted device attributes/features) generate device signature;
3. Using Trained User NN (extracted User attributes/features) generate User signature;
4. Extract User Identity (using same technique as discussed in training step 3d) from SIP message;
5. Lookup all records with a matching User Identity in User Signature database; and
6. Compute distances between new received SIP message and records in User Signature database
   a. With device signature (Step 2) search records (Step 5) for closest matching signature using a distance function,
   b. With user signature (Step 3) search records (Step 5) for closest matching signature using a distance function, and
   c. If individual (device or user) distances or combined (device and user) distances exceed a threshold, generate an incident.

The distance calculation is performed using a distance function such as, for example, one of the following distance functions: Euclidean distance function, cosine distance, Mahalanobis distance, or Minkowski distance. For example, when the latent layer of the neural network from which the output is taken is 3 nodes, a representation of a 3 component signature vector as a point on a 3d graph is possible. The 3d graph can be used to plot all signatures with the User Identity. To determine the distance, e.g., a Euclidean distance function may be used: distance=sqrt($(x1-x2)^2+(y1-y2)^2+(z1-z2)^2$), where x,y,z are values from the signature vector[x,y,z].

When determining or computing combined (device and user) distances, the Signature=(device signature, user signature) each of which are vectors.

The set of stored signatures from the training set=set [URI1: {Signature1}, URI1: {Signature2} . . . URI2: {Signature1} . . . URIx: {Signaturex}]. In one embodiment, the smallest distance between signatures with URI of the received new SIP message and any signature in the set of signatures generated from the training set with the matching URI is identified. If the identified smallest distance is greater than a threshold an incident indicating an anomaly is generated. In one embodiment, the computed L2 distance {closest device distance, closest user distance} is used to determine whether an anomaly condition exists or whether the SIP message packet does not indicate an anomaly conditions exists. The threshold value in one exemplary embodiment is that when the L2 distances>1 an anomaly condition is indicated. However, it should be understood that this threshold value and determination can made in a number of ways and the example provided is only exemplary.

In an alternative or additional step, a clustering function is used to group or cluster the good signatures generated from the training set of good SIP messages which have the same user ID (e.g., URI). A cluster centroid is then determined for the signatures of the cluster with user ID. The distance between the new received SIP message's generated signature and cluster centroid for the cluster of signatures with the user id (URI) matching the received new SIP message's user ID (URI) is computed. If the distance between the signature of the received new SIP message and the centroid of the cluster of good signatures with the matching user ID is greater than a threshold then an anomaly condition is determined to exist; otherwise an anomaly condition is not determined to exist. In one such embodiment, the threshold is a distance value greater than any other signatures distance from the centroid of the cluster for the user ID (URI).

Figure 19A:
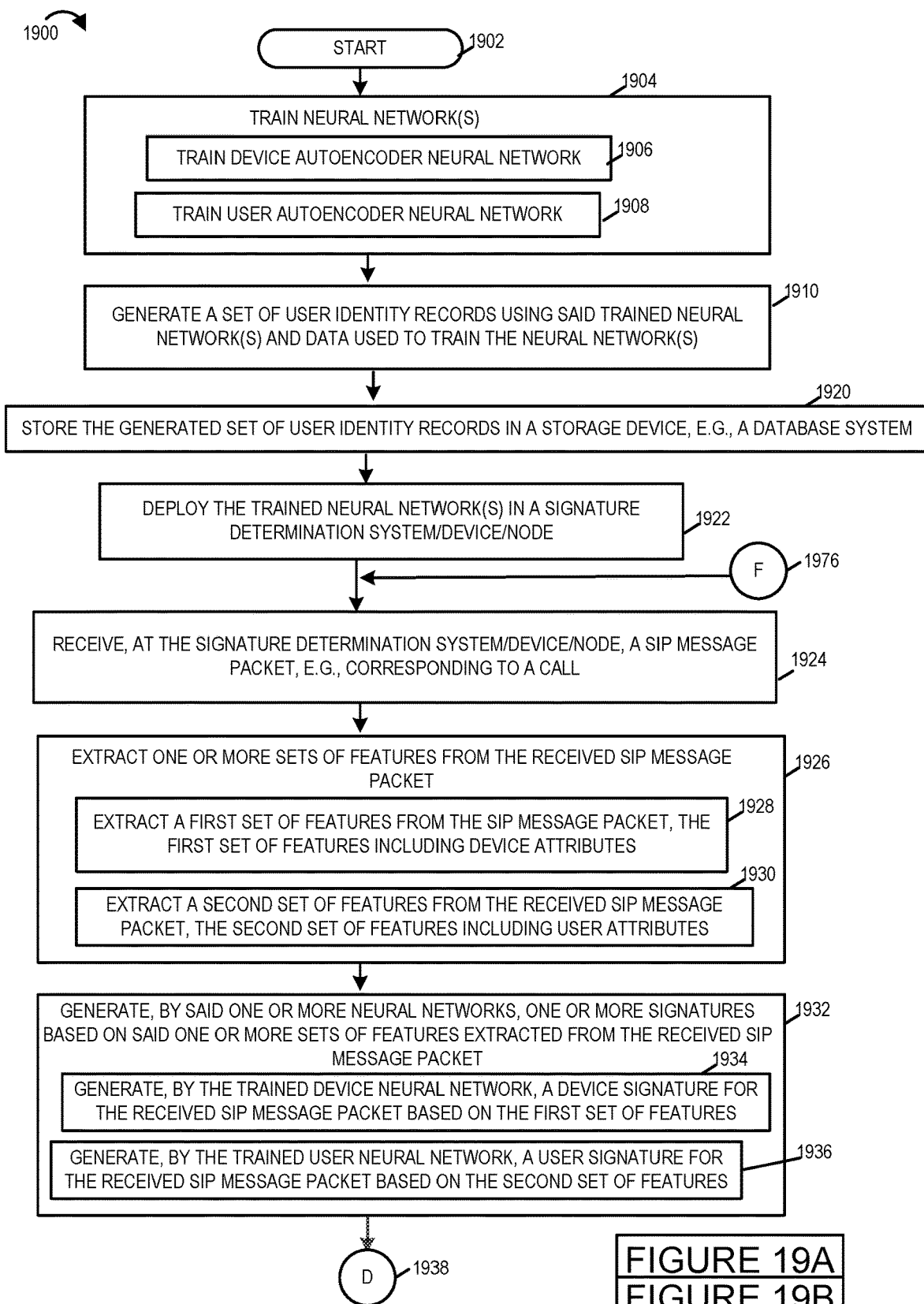
FIG. 19A illustrates a first part of a flowchart illustrating an additional exemplary method in accordance with an embodiment of the present invention.
Figure 19B:
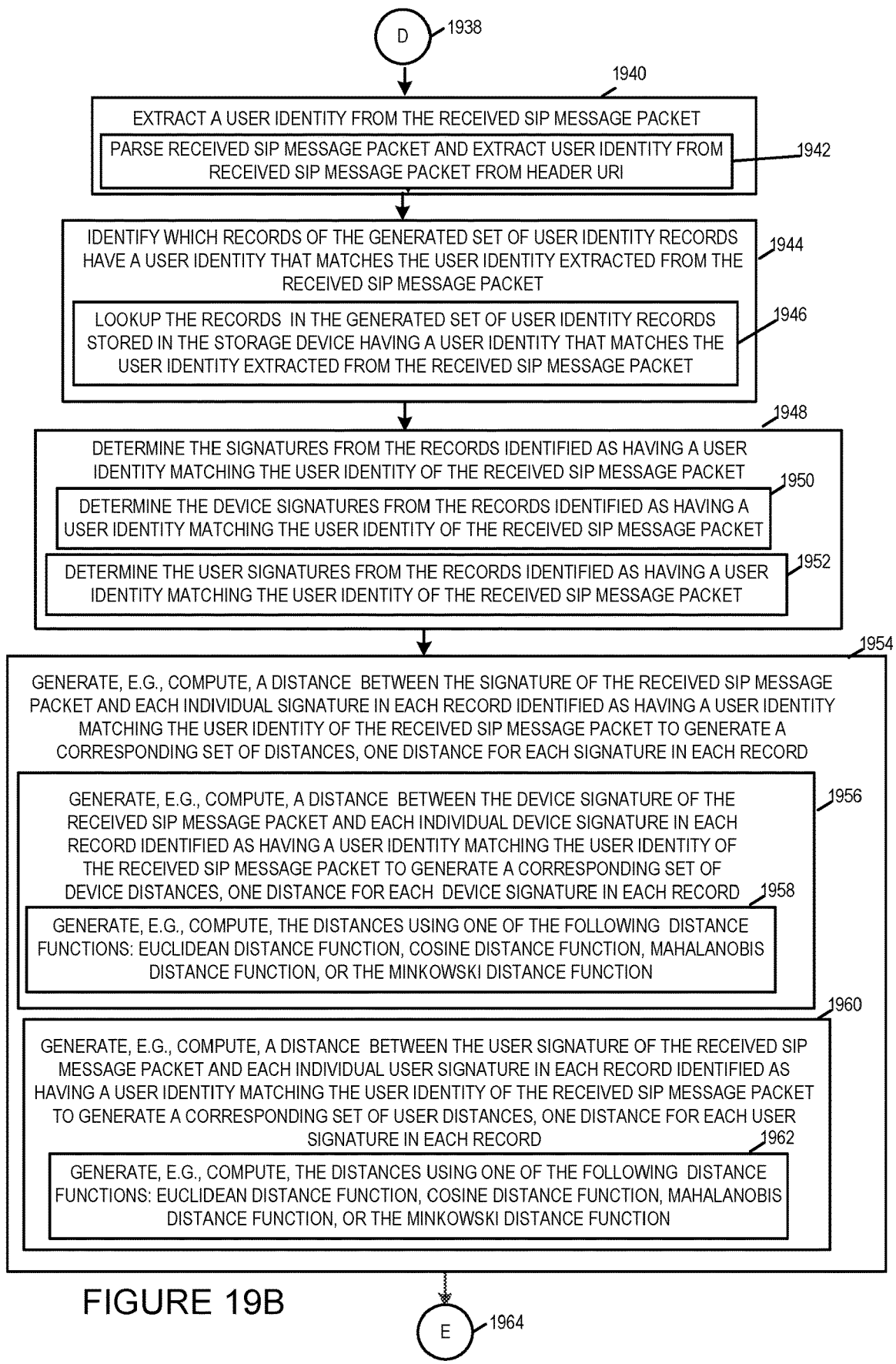
FIG. 19B illustrates a second part of a flowchart illustrating an exemplary method in accordance with an embodiment of the present invention.
Figure 19C:
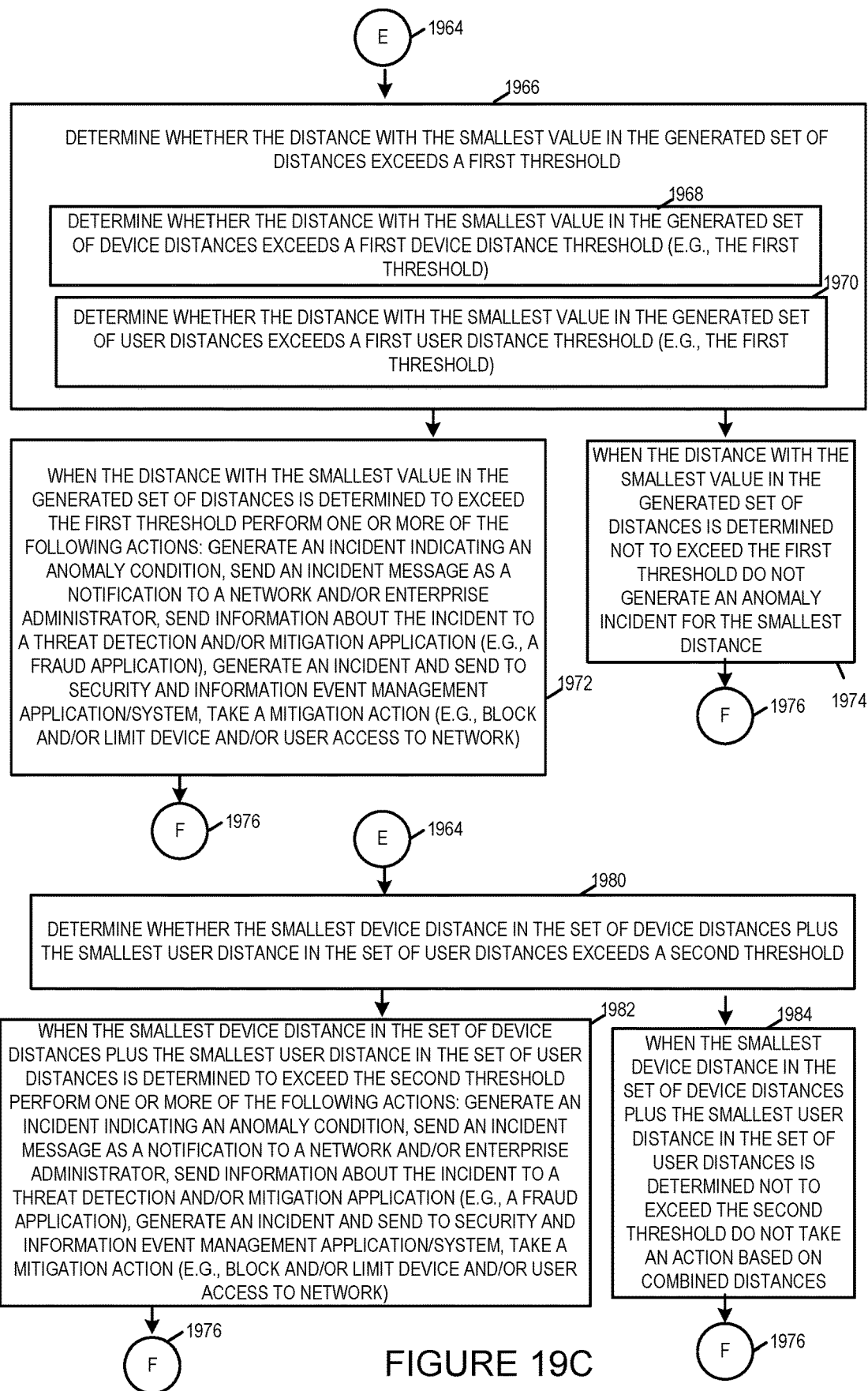
FIG. 19C illustrates a third part of a flowchart illustrating an exemplary method in accordance with an embodiment of the present invention.

FIG. 19 which comprises FIGS. 19A, 19B, and 19C illustrates a flowchart of another exemplary method 1900 in accordance with an embodiment of the present invention. Method 1900 describes the steps of training and using neural network(s) for identity management such as for example detection and mitigation of anomalies and/or threats detected based on Device and/or User signatures generated from a SIP message packet. While the example describes the method as it is applied to a single SIP message packet, the techniques and method described are also applicable to sets of SIP message packets, e.g., a set of SIP message packets belonging to a call and/or corresponding to a User Id, e.g., a URI. The method and techniques are also applicable to a plurality of sets of SIP message packets corresponding to multiple calls. The neural networks used in the method 1900, e.g., device autoencoder neural network and User autoencoder neural network may be, and in some embodiments have, the neural network architecture described in connection with autoencoder neural network 700 in that it includes an input layer, an encoder comprising at least one encoding layer including neural network nodes, a latent layer or a bottleneck layer also sometimes referred to a code layer, a decoder comprising at least one decoding layer including neural network nodes, and an output layer, the latent layer including the fewest neural network nodes of any layer in the autoencoder neural network including neural network nodes. Once the autoencoder neural network(s) of the method 1900 have been trained the output vector from the autoencoder neural network(s) upon which the signatures (e.g., device signature or User signature) are based is taken from the latent or bottleneck layer of the trained autoencoder. In some embodiments, as previously discussed the deployed neural network(s) do not include the decoder or output layers of neural network that was trained but only include the input layer, encoding layer(s) and latent layer as illustrated in the neural network architecture shown in FIG. 8. The method of FIG. 19 may be, and in some embodiments is, implemented on system 2000 illustrated in FIG. 20. Elements with the same numerals in different Figures are same or similar and thus will not be described in detailed again. System 2000 is similar to system 100. System 2000 however includes a signature determination system 2002 replacing the group call signature determination system 102 and the computing node 2008 replaces the system configuration node 108. The signature determination system 2002 can also be a device or node. The signature determination system 2002 includes I/O Interfaces 2058 for sending and receiving messages. The signature determination system 2002 also includes SIP feature extractor 2004 which extracts features from a received SIP message packet and generates one or more feature input sets or vectors. For example, the SIP feature extractor extracts device features (e.g., device attributes that identifies "what" is making the call such as for example SIP packet message Header inclusion/exclusion, format, parameters, header order, syntax) from a received SIP message packet and generates a device input feature set or input feature vector. The SIP feature extractor 2004 also extracts User features (e.g., User attributes such as information from SIP message packet Contact header, SIP message packet FROM header, P-Asserted_ID header that identifies "who" is making the call (e.g., User Identification, User Parameters, Route (Via) and IP information) from a received SIP message packet and generates a User input feature set or input feature vector. The SIP feature extractor also extracts the User Identity from the received SIP message packet in at least some embodiments of the present invention. The signature determination system 2002 also includes a processor 2060, memory 2056, one or more neural networks 2006 (e.g., a device autoencoder neural network and/or a User autoencoder neural network), and a signature distance determinator 2007, the signature distance determinator 2007 using one or more distance functions to generate or compute distances between signatures, e.g., signatures of the same type device signature or user signature and typically corresponding to the same User Identity. The signature vectors are obtained from the trained neural networks latent layer. The memory 2056 includes instructions which when executed by the processor 2060 control the operation of the signature determination system/device/node to perform one or more functions or steps of the various methods described herein and in particular one or more steps of the method 1900 which is described below.

Returning to the exemplary method 1900, operation begins in start step 1902 shown on FIG. 19A. Operation proceeds from start step 1902 to step 1904.

In step 1904, neural network(s), e.g., autoencoder neural networks, are trained using a training set of SIP message packets, e.g., obtained by logging SIP message packets passing through a Session Border Controller for one or more enterprise systems. The training set of SIP message packets typically comprises a set of known good SIP message packets which comply with SIP standards. In some embodiments while a majority of the training set of SIP message packets are known good SIP message packets, a small percentage of the SIP messages, e.g., less than 5%, may be from bad SIP messages, e.g., messages that do not conform with SIP standards. In some embodiments, step 1904 includes one or more sub-steps 1906 and 1908. In sub-step 1906, a device autoencoder neural network is trained with the training set of SIP message packets. Training the device autoencoder neural network includes extracting device attributes from each of the SIP message packets of the training set of SIP message packets to generate a corresponding device input feature set or vector (e.g., a pre-image) corresponding to each of the SIP message packets of the training set of SIP message packets. The device autoencoder neural network is then trained using the generated device input feature sets or vectors to generate corresponding output vectors with a minimized reproduction error using a loss function as previously discussed in connection with the training method 300. In sub-step 1908, a User autoencoder neural network is trained with the training set of SIP message packets in a similar manner to the device autoencoder neural network. First, User attributes are extracted from each of the SIP message packets of the training set of SIP message packets to generate a corresponding User input feature set or vector (e.g., a pre-image) corresponding to each of the SIP message packets of the training set of SIP message packets. The User autoencoder neural network is then trained using the generated User input feature sets or vectors to generate corresponding output vectors with a minimized reproduction error using a loss function as previously discussed in connection with the training method 300. Operation proceeds from step 1904 to step 1910.

In step 1910, a set of User Identity records is generated using the trained neural network(s) (e.g., the device autoencoder neural network and the User autoencoder neural network) and the data (e.g., set of SIP message packets) used to train the neural network(s). This can be, and in some embodiments is, achieved by extracting the device attributes from each of the SIP message packets of the training set to generate a corresponding device feature input set or vector and extracting the User attributes from each of the SIP message packets of the training set to generate a corresponding User feature input set or vector. Alternatively, the device input feature sets and User input feature sets generated during training may be, and in some embodiments are, used. Additionally from each of the SIP messages a User Identity is determined or extracted out of or from the SIP message packet FROM header URI field, the Uniform Resource Identifier (URI) being the User Identity or from the P-Asserted_ID header if present in the SIP message packet. Extracting the User Identity from the P-Asserted-ID header is preferential when available. Each device feature input vector corresponding to a SIP message packet of the training set of SIP message packets is inputted into the input layer of the trained device autoencoder neural network and a corresponding output vector is generated based on the encoded outputs of the latent layer of the trained device autoencoder neural network. The device signature for each individual SIP message packet may be, and in some embodiments is, the output vector from the latent layer which was generated from the device input feature vector extracted from the individual SIP message packet or the signature may be based on the output vector from the latent layer generated from the device input vector extracted from the individual SIP message packet. Each User feature input vector corresponding to a SIP message packet of the training set of SIP message packets is inputted into the input layer of the trained User autoencoder neural network and a corresponding output vector is generated based on the encoded outputs of the latent layer of the trained User autoencoder neural network. The User signature for each individual SIP message packet may be, and in some embodiments is, the output vector generated from the User input feature vector extracted from the individual SIP message packet or the signature may be based on the output vector generated from the User input vector extracted from the individual SIP message packet. Each User Identity record includes the User Identity (e.g., URI) extracted from the SIP message packet, the device signature generated for the SIP message packet and the User signature generated for the SIP message packet. This assumes that in this example both a device and User signature are being generated and used. Operation proceeds from step 1910 to step 1920.

In step 1920, the generated set of User Identity records are then stored in a storage device, e.g., a database system. The set of User Identity records provides a history for each separate User Identity. Operation proceeds from step 1920 to step 1922.

In step 1922, the trained neural network(s) (e.g., trained device autoencoder neural network and the trained User encoder neural network) are deployed in a signature determination system/device/node to generate signatures for received SIP message packets, the generated signatures being the output vector of the latent layer or based on the output vector of the latent layer generated for an extracted input feature vector as will be described below. Operation proceeds from step 1922 to step 1924.

The prior steps of the method dealt with the training stage of operation of the method in which the neural network(s) are trained and a set of User Identity records are generated for use during the deployed stage of operation, which will be discussed next.

In step 1924, a SIP message packet is received at the signature determination system/device/node including the trained neural network(s), e.g., the trained device neural network and the trained User neural network. The SIP message packet may be, for example, a SIP INVITE message corresponding to a call. Exemplary applications, devices and/or systems from which the SIP message packet may be, and in some embodiments is, received include Identity Management Systems, System Configuration Managers, SBCs, and threat and/or anomaly detection applications, devices or systems. Operation proceeds from step 1924 to step 1926.

In step 1926, one or more sets of features (e.g., device input feature set and User input feature set) are extracted from the received SIP message packet in the same manner as previously described. In some embodiments, step 1926 includes one or more sub-steps 1928 and 1930. In sub-step 1928, a first set of features is extracted from the SIP message packet, the first set of features including device attributes. In sub-step 1930, a second set of features is extracted from the SIP message packet, the second set of features including User attributes. Operation proceeds from step 1926 to step 1932. In step 1932, the one or more deployed neural network(s) (e.g., deployed device neural network and deployed User neural network) generate one or more signatures (e.g., device signature and User signature) based on the one or more sets of features extracted from the received SIP message packet. In some embodiments, step 1932 includes one or more sub-steps 1934 and 1936. In sub-step 1934, the trained and deployed device neural network generates a device signature for the received SIP packet based on the first set of features which was extracted from the received SIP message packet. In sub-step 1936, the trained and deployed User neural network generates a User signature for the received SIP message packet based on the second set of the features extracted from the received SIP message packet. The device and User signatures are based on the output of the latent layer of the device and User neural networks respectively as previously described. In some embodiments, the output vector of the latent layer of the neural network is used as the signature. Operation proceeds from step 1932 via connection node D 1938 to step 1940 shown on FIG. 19B.

In step 1940, the user identity is extracted from the received SIP message packet. In some embodiments, step 1940 includes sub-step 1942. In sub-step 1942, the received SIP message packet is parsed and the user identity is extracted or determined from the received SIP message packet FROM header URI. Operation proceeds from step 1940 to step 1944.

In step 1944, the signature determination system identifies the records of the generated set of User Identity records which have a User Identity which matches the User Identity extracted from the received SIP message packet. Step 1944 includes sub-step 1946. In sub-step 1946, the signature determination device/system/node performs a lookup operation and searches and looks up the records in the generated set of User Identity records stored in the storage device, e.g., database, having a User Identity that matches the User Identify extracted from the received SIP message packet. Operation proceeds from step 1944 to step 1948.

In step 1948, the signature determination device/system/ node determines the signatures from the records identified as having a user identity matching the User Identity of the received SIP message packet. In some embodiments, step 1948 includes sub-step 1950 and/or sub-step 1952. In sub-step 1950, the signature determination system/device/node determines the device signatures from the records identified as having a User Identity matching the User Identity of the received SIP message packet. In sub-step 1952, the signature determination system/device/node determines the User signatures from the records identified as having a User Identity matching the User Identity of the received SIP message packet. Operation proceeds from step 1948 to step 1954.

In step 1954, the signature determination system/device/ node generates, e.g., computes, a distance between the signature of the received SIP message packet and each individual signature in each record identified as having a User identity matching the user identity of the received SIP message to generate a corresponding set of distances, one distance for each signature in each record. In some embodiments, step 1954 includes one or more sub-steps 1956 and 1960.

In sub-step 1956, the signature determination system/ device/node generates, e.g., computes, the distances between the device signature of the received SIP message packet and each individual device signature in each record identified as having a User identity matching the User identity of the received SIP message packet to generate a corresponding set of device distances, one distance for each device signature in each record. In some embodiments, step 1956 includes sub-step 1958. In sub-step 1958, the signature determination system/device/node generates, or computes, the distances, e.g., device distances between device signatures, using one of the following distance functions: Euclidean distance function, cosine distance function, Mahalaobis distance function, or the Minkowski distance function.

In sub-step 1960, the signature determination system/ device/node generates, e.g., computes, the distances between the User signature of the received SIP message packet and each individual User signature in each record identified as having a User identity matching the User identity of the received SIP message packet to generate a corresponding set of User distances, one distance for each User signature in each record. In some embodiments, step 1960 includes sub-step 1962. In sub-step 1962, the signature determination system/device/node generates, or computes, the distances, e.g., User distances between User signatures, using one of the following distance functions: Euclidean distance function, cosine distance function, Mahalaobis distance function, or the Minkowski distance function.

Operation proceeds from step 1954 to step 1966 and step 1980 shown on FIG. 19C via connection node E 1964.

In step 1966, the signature determination system/device/ node determines whether the distance with the smallest value in the generated set of distances exceeds a first threshold. In some embodiments, the first threshold is a distance threshold that is greater than the value of the largest distance between any two signatures with a matching User Identity in the generated set of User Identity records. In some embodiments, the first threshold is a distance greater than the distance of any two signatures of the same type (e.g., device signature or User signature) generated from the training set having a common User Identity. Step 1966 includes in some embodiments one or more of sub-step 1968 and 1970.

In sub-step 1968, the signature determination system/ device/node determines whether the distance with the smallest value in the generated set of device distances exceeds a first device distance threshold (e.g., the first threshold). In some embodiments, the first device distance threshold is a distance threshold that is greater than the value of the largest distance between any two device signatures with a matching User Identity in the generated set of User Identity records. In some embodiments, the first device distance threshold is a distance greater than the distance of any two device signatures generated from the training set having a common User Identity.

In sub-step 1970, the signature determination system/ device/node determines whether the distance with the smallest value in the generated set of User distances exceeds a first User distance threshold (e.g., the first threshold). In some embodiments, the first User distance threshold is a distance threshold that is greater than the value of the largest distance between any two User signatures with a matching User Identity in the generated set of User Identity records. In some embodiments, the first User distance threshold is a distance greater than the distance of any two User signatures generated from the training set having a common User Identity.

Operation proceeds from step 1966 to step 1972 when the distance with the smallest value in the generated set of distances is determined to exceed the first threshold; otherwise, operation proceeds to step 1974.

In step 1972, when the distance with the smallest value in the generated set of distances is determined to exceed the first threshold, the signature determination system/device/ node notifies the device that sent the SIP message packet that an anomaly incident has been detected in connection with the SIP message packet. The device which sent the SIP message packet to the signature determination system/device/node (e.g., SBC, Identity Management System, System Configuration Manager, etc.) performs one or more of the following actions in response to being notified by the signature determination system that the generated signature distance exceeds a first threshold: generate an incident indicating an anomaly condition exists, send an incident message as notification to a network and/or enterprise administrator's device(s), send information about the incident to a threat detection and/or mitigation application (e.g., a fraud application), generate an incident and send it to a security and information event management (SIEM) application/system, take a mitigation action or instruct another device (e.g., SBC) to take a mitigation action (e.g., block and/or limit device and/or user access to the network. In some embodiments, the signature determination system/device/node performs the aforementioned one or more actions, e.g., when the signature determination system/device/node is an application of an Identity Management System. Operation proceeds from step 1972 via connection node F 1976 to step 1924 shown on FIG. 19A wherein the next SIP message packet is received at the signature determination system and the method proceeds as previously described.

In step 1974, when the distance with the smallest value in the generated set of distances is determined not to exceed the first threshold the signature determination system/device/node notifies the device that sent the SIP message packet that no anomaly incident has been detected in connection with this SIP message packet and the device that sent the SIP packet message refrains or does not generate an anomaly incident for the smallest distance. Operation proceeds from step 1974 via connection node F 1976 shown on FIG. 19A wherein the next SIP message packet is received at the signature determination system and the method proceeds as previously described.

Returning to step 1980, in step 1980 shown on FIG. 19C the signature determination system/device/node determines whether the smallest device distance in the set of device distances plus the smallest User distance in the set of User distances exceeds a second threshold. Operation proceeds from step 1980 to step 1982 when the smallest device distance in the set of device distances plus smallest User distance in the set of User distances is determined to exceed the second threshold; otherwise, operation proceeds from step 1980 to step 1984.

In step 1982, when the smallest device distance in the set of device distances plus the smallest User distance in the set of User distances is determined to exceed the second threshold, the device which sent the SIP message packet to the signature determination system/device/node (e.g., SBC, Identity Management System, System Configuration Manager, etc.) performs one or more of the following actions in response to being notified by the signature determination system that the generated signature distance exceeds a first threshold: generate an incident indicating an anomaly condition exits, send an incident message as notification to a network and/or enterprise administrator's device(s), send information about the incident to a threat detection and/or mitigation application (e.g., a fraud application), generate an incident and send it to a security and information event management (SIEM) application/system, take a mitigation action or instruct another device (e.g., SBC) to take a mitigation action (e.g., block and/or limit device and/or user access to the network. In some embodiments, the signature determination system/device/node performs the aforementioned one or more actions, e.g., when the signature determination system/device/node is an application of an Identity Management System. Operation proceeds from step 1982 via connection node F 1976 to step 1924 shown on FIG. 19A wherein the next SIP message packet is received at the signature determination system and the method proceeds as previously described.

In step 1984, when the smallest device distance in the set of device distances plus the smallest User distance in the set of User distances is determined not to exceed the second threshold the device which sent the received SIP message packet takes no action or refrains from taking an action based on the combined device and User signature distances.

Operation proceeds from step 1984 via connection node F 1976 to step 1924 shown on FIG. 19A wherein the next SIP message packet is received at the signature determination system and the method proceeds as previously described.

In one embodiment, the latent layer includes 3 neural network nodes the output of which is used as the signature so it is a signature vector. The distance is determined used a Euclidean distance function: distance=sqrt((x1−x2)^2+ (y1−y2)^2+(z1−z2)^2), where x,y,z are values from the signature vector[x,y,z]. (X1, Y1, Z1) being the generated SIP message packet signature (e.g., device signature or User signature) and (X2, Y2, Z2) being a signature (e.g., device signature or User signature) from an Identity record with a User Identity matching the User Identity extracted or determined from the received SIP message packet. The use of signature vectors with three components allows for the representation of the signatures in three dimensional space for example on a 3 dimensional graph which can be plotted and outputted by the signature determination system to the requesting device wherein the signature for the received SIP message packet is identified among the graphed set of signatures of the same type for the same User Identity. The requesting device then makes a determination based on the generated distances between the signatures of the same type for the same User Identity as to whether or not an anomalous condition exists.

FIG. 9 comprising FIGS. 9A and 9B as discussed is a drawing illustrating an assembly of components 900 which may be included in an exemplary computing node or device 600 when implemented as a group call signature determination system or device, e.g., group call signature determination system 102 of FIG. 1 implemented in accordance with exemplary embodiment component 600. Assembly of components 900 can be, and in some embodiments is, used in computing node 600. The components in the assembly of components 900 can, and in some embodiments are, implemented fully in hardware within the processor 606, e.g., as individual circuits. The components in the assembly of components 900 can, and in some embodiments are, implemented fully in hardware within the assembly of components 619, e.g., as individual circuits corresponding to the different components. In other embodiments some of the components are implemented, e.g., as circuits, within the processor 606 with other components being implemented, e.g., as circuits within assembly of components 619, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 610 of the computing node 600, with the components controlling operation of computing node 600 to implement the functions corresponding to the components when the components are executed by a processor, e.g., processor 606. In some such embodiments, the assembly of components 900 is included in the memory 610 as assembly of components 618. In still other embodiments, various components in assembly of components 900 are implemented as a combination of hardware and software, e.g., with another circuit external to the processor providing input to the processor 606 which then under software control operates to perform a portion of a component's function. While shown in the FIG. 6 embodiment as a single processor, e.g., computer, it should be appreciated that the processor 606 may be implemented as one or more processors, e.g., computers.

When implemented in software the components include code, which when executed by the processor 606, configure the processor 606 to implement the function corresponding to the component. In embodiments where the assembly of components 900 is stored in the memory 610, the memory 610 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the computing node or device 600 or elements therein such as the processor 606, to perform the functions of corresponding steps illustrated and/or described in the method of one or more of the flowcharts of FIGS. 2, 3, 4, 5 and 19, and/or described with respect to any of the Figures. Thus the assembly of components 900 includes various components that perform functions of corresponding steps of one or more of FIGS. 2, 3, 4, 5, and 19.

Assembly of components 900 includes components 902, 904, 906, 916, 918, 920, 922, 924, 926, 928, 930, 932, 934, 936, 938, 939, 940, 942, 944, 946, 948, 950, 952, 954, 956, 958, 960, 962, 964.

The control routines component 902 is configured to control the operation of the node or device.

The communications component 904 is configured to provide communications functionality including communications signaling and support for various communications protocols and interfaces.

The neural network components 906 includes at least one neural network, e.g., an autoencoder neural network. In some embodiments, the neural network components 906 includes a set of neural network components 908, the set of neural network components 908 including neural network component 1 910, neural network component 2 912, . . . , neural network component N 914. Each of the neural network component 1, 2, . . . , N can be, and in some embodiments are, an autoencoder neural network with a different number of neural network nodes in the latent bottleneck layer so as to be able to produce different group call signatures when the same input feature set is applied to each of the input layers of the different autoencoder neural network components.

Component 916 is configured to control one or more neural network(s) to generate a SIP group call signature identifier from a set of features extracted from a SIP call, e.g., SIP message packets and optionally data, e.g., metadata, belonging to the SIP call.

Component 918 is configured to provide an output generated by one or more components to another component, e.g., provide extracted SIP feature set to a neural network component.

SIP feature extractor component 920 is configured to perform feature extraction operations across a set of N SIP message packets of a call and optionally data, e.g., metadata belonging to the set of N SIP message packets of the call, the feature extraction operations generating a SIP call feature set.

Component 922 is configured to perform feature extraction operations on N SIP message packets of a call, the feature extraction operations generating N different sets of SIP features, each of the N packets having a corresponding SIP feature set which are provided to a recurrent autoencoder neural network, e.g., a Long Short Term Memory neural network, in the same order/sequence as the SIP message packets of the call.

Component 924 is configured to send a SIP packet data unit or set of packet data units corresponding to a call to a SIP feature extractor.

Grouping/clustering component 926 is configured to group each output from a neural network into one of a plurality of different groups, e.g., using a K-means clustering algorithm.

Component 928 is configured to log and store one, some, or all of the SIP message packets corresponding to a call. Component 928 is typically used in a call processing device such as for example an SBC.

Component 930 is configured to train one or more neural networks, e.g., autoencoder neural network(s) using sets of known good call data.

Loss function component 932 is configured to determine a reproduction loss, error or difference between an input vector (pre-image) and an output vector (post-image) of an autoencoder neural network.

Component 934 is configured to control a transmitter to transmit an identified group call signature identifier to a requesting entity.

Component 936 is configured to determine one or more SMM rules, signaling configuration rules/settings, and/or system/device configuration rules/settings to be implemented.

Distance component 938 is configured to determine distances between signatures.

The comparator component 940 is configured to make various comparisons, e.g., comparisons of scores to threshold values, comparing determined user signatures to user signatures of clusters of user signatures, comparing signatures, The determination component 942 is configured to make various determinations as disclosed in the embodiments discussed herein including for example, but not limited to, determining communications session type corresponding to a communications session, a device type corresponding to an endpoint device which originated or initiated a communications session, or a user identity corresponding to a communications session, determining device identity, user identity, session type corresponding to a communications session, determining anomaly mitigation action(s) to be performed, determining actions to be performed for verification and/or security checks, determining actions to be performed when verification and/or security checks fail, determining actions to be performed for user & traffic profiling checks, determining actions to be performed when user & traffic profiling checks fail, determining operations to be performed for fraud detection and prevention, determining similarity and difference scores, determining user signatures, session signatures, device signatures, determining whether signatures matches, determining when a signature falls within a cluster of signatures or does not fall within a cluster of signatures. The profiling component also sometimes called profiling system component 944 is configured to perform one or more of the following operations: an identity verification/security check, user & traffic profiling check, or fraud detection and prevention operation. The threat detection and security system component is configured to detect threats and anomalous conditions, perform identity verification/security checks, user & traffic profiling checks, or fraud detection and prevention operations, take actions in response to the results of the check and operations, e.g., provide notifications to users and/or operators, take mitigation or preventive actions when a check fails, when fraud is detected, or refrain from taking mitigation actions when checks do not fail. Notification component 948 is configured to send notifications, e.g., to other systems, users and/or operators when an anomaly or threat is detected or a check fails. In some embodiments the notification component is a sub-component of the threat detection and security system 946 or the profiling component 944. The identity verification/security component 948 is sometimes a sub-component of the profiling component 944 or the threat detection and security system component 950. The identity verification/security component 950 is configured to perform identity verification and/or security checks or tests for example based on or using determined device identity, user identity, communications session type, session signature(s), user signature(s), and/or device signature(s). The user & traffic profiling component 952 is sometimes a sub-component of the profiling component 944 or the threat detection and security system component 946. The user & traffic profiling component 952 is configured to perform user & traffic profiling checks or tests for example based on or using determined device identity, user identity, communications session type, session signature(s), user signature(s), and/or device signature(s). The fraud detection and prevention component 954 is sometimes a sub-component of the profiling component 944 or the threat detection and security system component 946. The fraud detection and prevention component 954 is configured to perform fraud detection operations and fraud prevention operations for example based on or using determined device identity, user identity, communications session type, session signature(s), user signature(s), and/or device signature(s). The anomaly condition detection component 956 is sometimes a sub-component of the profiling component 944 or the threat detection and security system component 946. The anomaly condition detection component 956 is configured to perform anomaly detection operations for example based on or using determined device identity, user identity, communications session type, session signature(s), user signature(s), and/or device signature(s). The anomaly mitigation component 958 is configured to perform or take anomaly mitigation actions such as for example blocking future communications sessions, de-registering user(s) or device(s), limiting the services provided or accessible to user(s) or device(s). The scoring component 960 determines or generates scores for example determining a score for the similarity or difference of a signature to a set of signatures of a cluster. For example a score for how similar or different a device signature is to a set of device signatures of a cluster of device signatures. The training component 962 is configured to train a neural network. The feature extractor component 964 is configured to extract features from data, e.g., from one or more session control messages, from data retrieved corresponding to a session, user, device or signature, e.g., such as a feature set extracted from a session control message such as a SIP message or a set of session control messages.

Additional details explaining the functioning of the autoencoder neural network and various ways group call signatures can be obtained from the latent layer output vector of the autoencoder neural network will now be discussed in connection with several exemplary embodiments of the invention discussed below.

In some embodiments, the input vector, latent layer and output vector of the autoencoder neural network are numerical values, typically floating point values normally scaled to −1 to 1 or 0 to 1. The output vector is a computed vector based on the forward propagation of the input values through each layer of the neural network using the current link weights and biases. Starting at the input layer, each node value is computed as the sum of all (input value*weight)+ bias for each input link. The node output is then the result of the activation function applied to the node value. Each node output is then propagated to every node in the subsequent layer. This process repeats until the output layer is reached. During the training of the autoencoder neural network, the output (post-image) is compared with the (pre-image) and the loss is determined by a loss function (e.g., mean square error loss function, binary cross entropy loss function, or log error loss function). This loss value is then used to perform backpropagation through the autoencoder neural network model and adjust the weights and biases in each layer) to minimize the loss between the output (post-image) and the input (pre-image). This is repeated over and over until the loss converges and the autoencoder neural network model is considered trained.

Once the autoencoder neural network is trained, the training data corresponding to each call used to train the autoencoder neural network is once again applied to the trained autoencoder neural network to create group signatures. This is done by taking the latent layer outputs for each call. The vector output from the latent layer provides a signature for the call. In this way a signature (i.e., latent layer output vector) for each call in the training data set is created. The vectors of the training data set are then inputted into a clustering or grouping algorithm, e.g., a k-means based clustering algorithm, to determine the optimal number of discrete clusters (groups). With the clusters defined (including the number of clusters and cluster centers), the signature vectors for each call are processed and labeled with the group id with which it is associated. The end result is a cluster (group) metadata and a database of signatures with their associated groups. The number of neural network nodes in the latent layers of the autoencoder neural network are significantly smaller than the number of inputs to the autoencoder neural network. For example, in some embodiments 1025 extracted feature inputs are used with a latent layer consisting of 2 or 3 neural network nodes from which the call signature vector is obtained.

At a high level, the grouping in the example described above can be explained as follows. For a call the latent layer of the trained autoencoder neural network produces a tensor/vector (e.g., R2 for 2 node), for example, [A, B] where A and B are positive real numbers for a 2 node latent layer. These vectors are then grouped using an additional grouping algorithm (e.g., k-means clustering algorithm), so [A1,B1] and [A2,B2] may be put into call group 1, and [A3,B3] into call group 2 using K-means clustering algorithm.

In another embodiment, instead of using an additional grouping algorithm on the output vector of the latent layer of the autoencoder neural network, the output vector of the latent layer is forced into a form that is directly used as a group signature. For example, if the latent layer is designed to have 2 nodes which holds integers from 0 to 9, each possible value of the latent layer is of the form [A,B], A and B each being an integer value from 0 to 9. In other words, there are 100 different combinations that can be used directly as a call group signature. In this way, when an input feature vector for a call is applied to the trained autoencoder neural network input layer, the autoencoder neural network latent layer vector output provides the call's corresponding group call signature from the plurality of 100 possible group call signatures.

While the determination and grouping of call signatures have been discussed in detail as previously mentioned, the techniques described herein can also be used for other types of signatures based on received SIP signals such as for example user signatures and device signatures as well as the grouping of user signatures and device signatures.

The user and device signatures are determined using the same or a similar process to the one previously described in connection with the determination of group call signatures. While the below discussion refers to the generation of a user signature for a single SIP message packet the process can be extended to all or a portion of the SIP packets belonging to a SIP session, e.g., a call, or even to multiple SIP sessions.

The SIP packet data unit is received by a SIP signaling signature determination device or system which decodes the SIP packet data unit, parses it and extracts features relevant to the device, user, destination and/or call.

User features represent information that would be specific in the identification of a user in a communications environment, such as for example, the URI (universal resource identifier), Internet Protocol (IP) address, and contact information. Additional information regarding the user environment is extracted such as, for example, message parameters, routing information (e.g., route header, via, etc.), configuration information (e.g., allow headers, supported headers). The purpose of the user signature is two-fold. The first purpose is to characterize individual users. The second purpose is to capture the network environment of that user.

In this exemplary embodiment, the User information is separate and distinct from the device information. This allows for a device neural network model that generates and groups SIP packets by devices and user neural network model that generates and groups SIP packets by user. The device neural network as well as the user neural network can be offered as a cloud service, e.g., an (AAS) As A Service offering, the user neural network being trained from the customer's data as it is specific to their network. In some embodiments, however, the user neural network may be deployed at the customer's premise which allows for additional security as it contains customer user information. The device neural network may also be deployed at a customer's premises in some embodiments. The device neural network can be trained on a larger data set and in many instances will use data from a plurality of different customers and customer sites.

During a training period the user signature and device signatures are captured and stored in a database. When in the operational mode and new messages arrive, they are encoded, the user identification (URL) is extracted and the known good signatures are extracted from the database. The known good signatures are compared with the new message signatures and distances from the known good signatures are computed to determine whether there is an anomaly. For example, in one embodiment a determination is made as to whether the determined user signature is within the known good cluster of user signatures and whether the device signature matches or in some cases is similar to a device signature the user has previously used.

These detected anomalies and associated information may then be used as input information to security applications which can make higher level decisions on what the anomaly represents or indicates (e.g., innocuous activity, fraud, hijacked endpoint, etc.) and what if any mitigation action should be taken such as, for example, notification of user, administrator of customer equipment, deactivation of device or device registration, change of user registration or associated permissions, etc.

While in this example, there are separate neural networks for generating device signatures and user signatures each receiving different input feature sets wherein the features extracted are the features relevant to the particular signature determination (user or the device signature), in some embodiments, a single neural network using a single input feature set is implemented. The feature set includes selector inputs (identifying category) which along with the loss function are used to determine signatures by the specific category identified by the selector (e.g., device, user, call, etc.).

Figure 21:
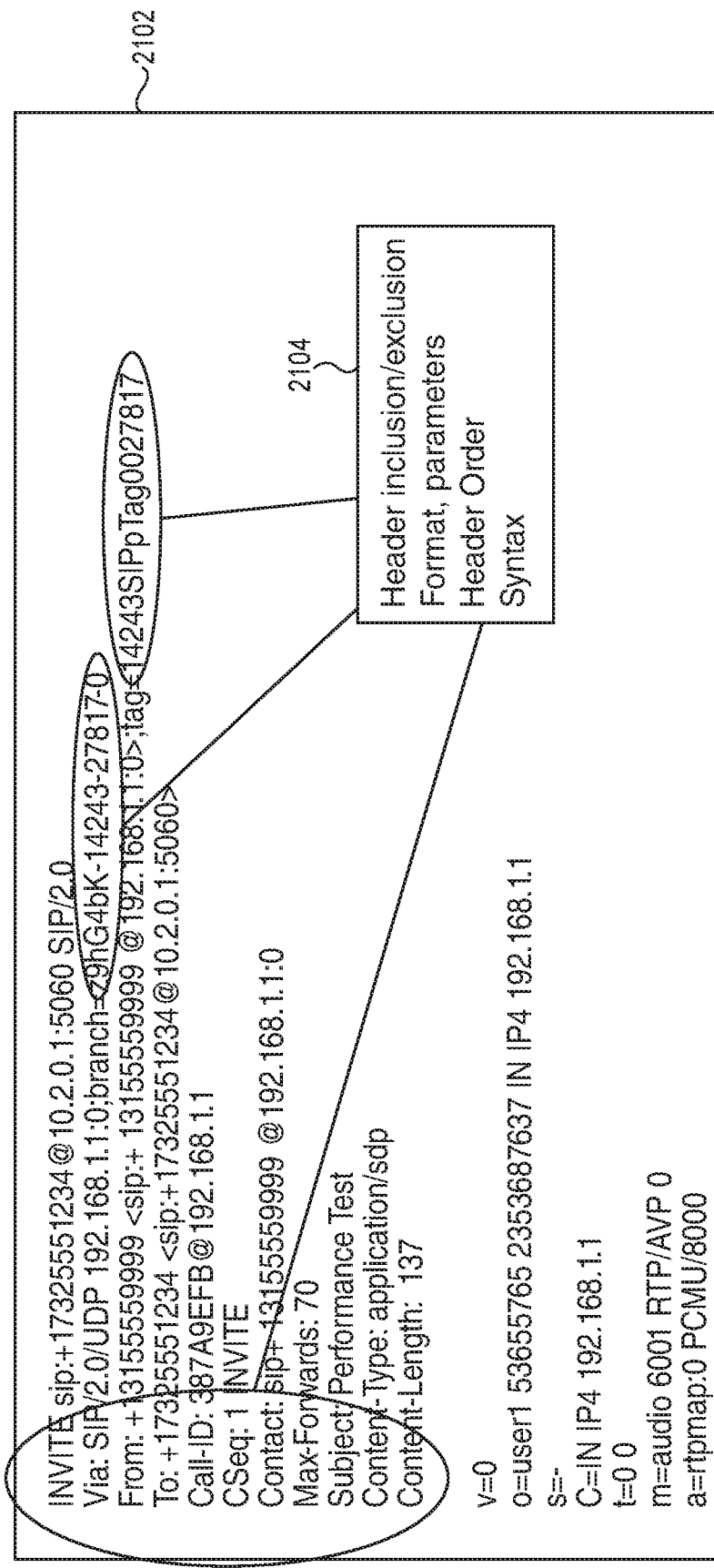
FIG. 21 illustrates exemplary device features of a session control message, e.g., a Session Initiation Protocol message, in accordance with an embodiment of the present invention.

Diagram 2100 of FIG. 21 illustrates exemplary device features of a session control message, e.g., a Session Initiation Protocol message, in accordance with an embodiment of the present invention. The exemplary device features are used to identify "what" is making or initiating a communications session, e.g., a call. Diagram 2102 shows an exemplary SIP Invite message including the parameters of a Session Description Protocol Offer message included in the SIP Invite message. Diagram 2104 illustrates portions of the SIP Invite message and identifies exemplary device features of the SIP message which include the headers included/excluded from the SIP message, the format of information in the SIP message, the parameters of the SIP message, the header order of the SIP message and syntax of the SIP message which is determined from the SIP message. While the full branch and tag will work in some embodiments as device features, it is noted that these elements change per request. Branch prefix and tag prefix are additional exemplary device features which are often common to a device type. Another exemplary device feature is the User-Agent header for those SIP messages that include a User-Agent header.

Figure 22:
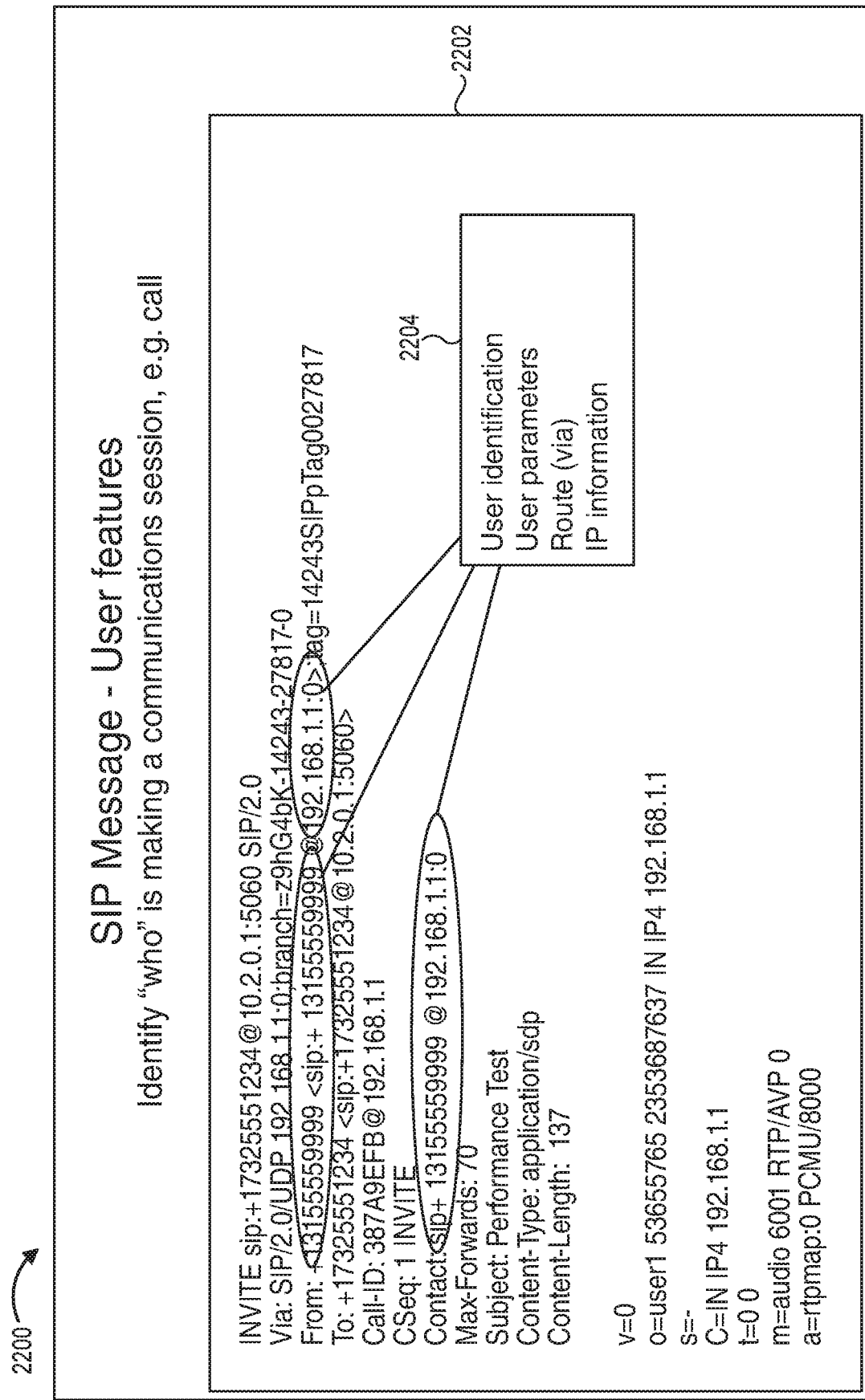
FIG. 22 illustrates exemplary user features of a session control message, e.g., a Session Initiation Protocol message, in accordance with an embodiment of the present invention.

FIG. 22 illustrates exemplary user features of a session control message, e.g., a Session Initiation Protocol message, in accordance with an embodiment of the present invention. The exemplary user features are used to identify "who" is making or initiating a communications session, e.g., a call. Diagram 2202 shows an exemplary SIP Invite message including the parameters of a Session Description Protocol Offer message included in the SIP Invite message. Diagram 2204 illustrates portions of the SIP Invite message and identifies exemplary user features of the SIP message which include the user identity, user parameters, route (via) and Internet Protocol information which is determined from the SIP message. The UDP as transport feature in the SIP message is typically a characteristic or feature of the device but in some instances may be used as a user feature.

Figure 23:
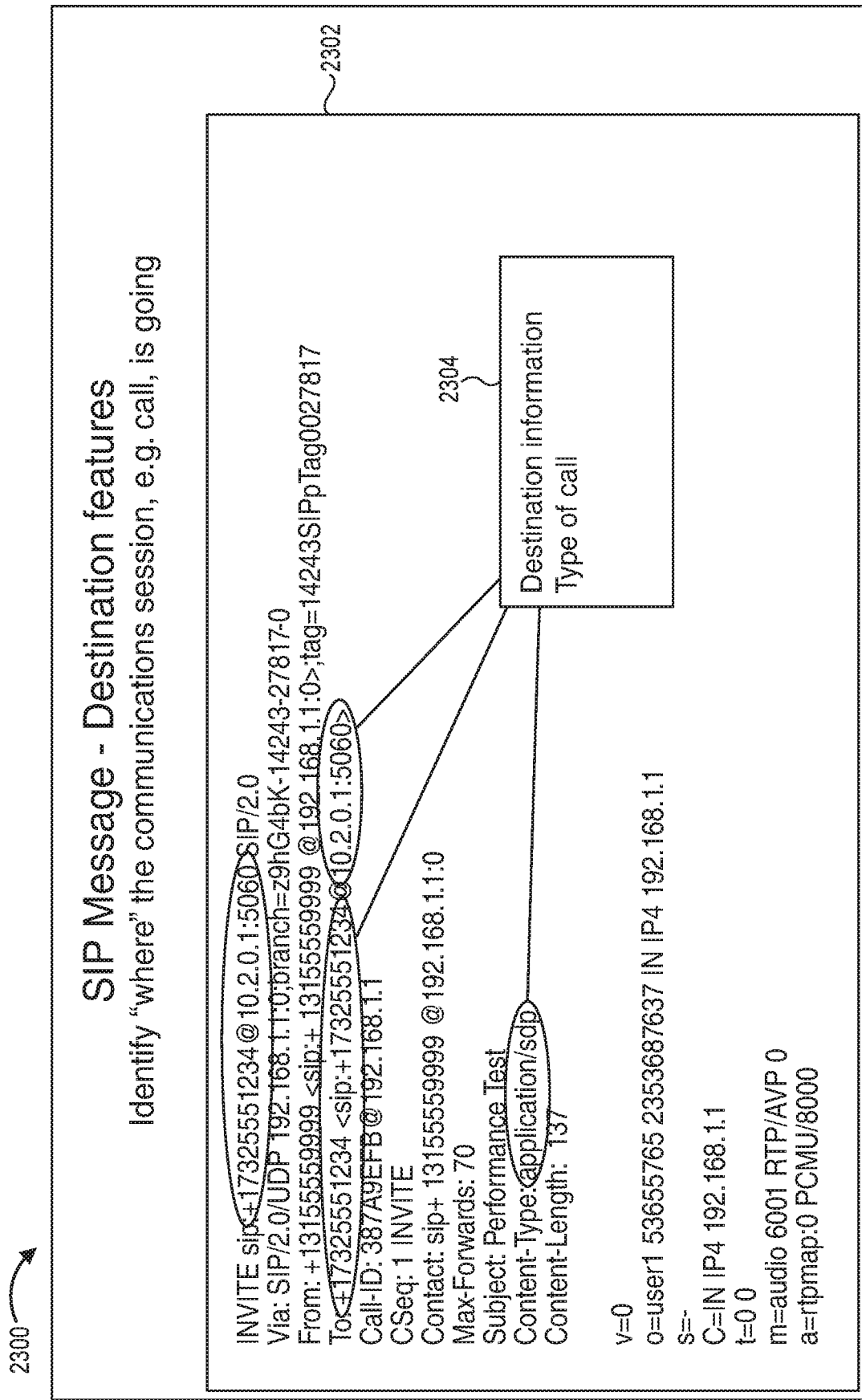
FIG. 23 illustrates exemplary destination features of a session control message, e.g., a Session Initiation Protocol message, in accordance with an embodiment of the present invention.

FIG. 23 illustrates exemplary destination features of a session control message, e.g., a Session Initiation Protocol message, in accordance with an embodiment of the present invention. The exemplary destination features are used to identify "where" the communications session, e.g., a call, is going. Diagram 2302 shows an exemplary SIP Invite message including the parameters of a Session Description Protocol Offer message included in the SIP Invite message. Diagram 2304 illustrates portions of the SIP Invite message and identifies exemplary destination features of the SIP message which include the destination information, type of session, which in the example is a call, and media information about the session which is determined from the SIP message. The media information in the SDP message, e.g., the information in the m and a lines of the SDP message, is useful in verifying whether the type of media identified is authorized to be received from the destination. In some embodiments, it is a feature of the destination as to whether the media type is a type associated with or regularly received from the destination.

Figure 24:
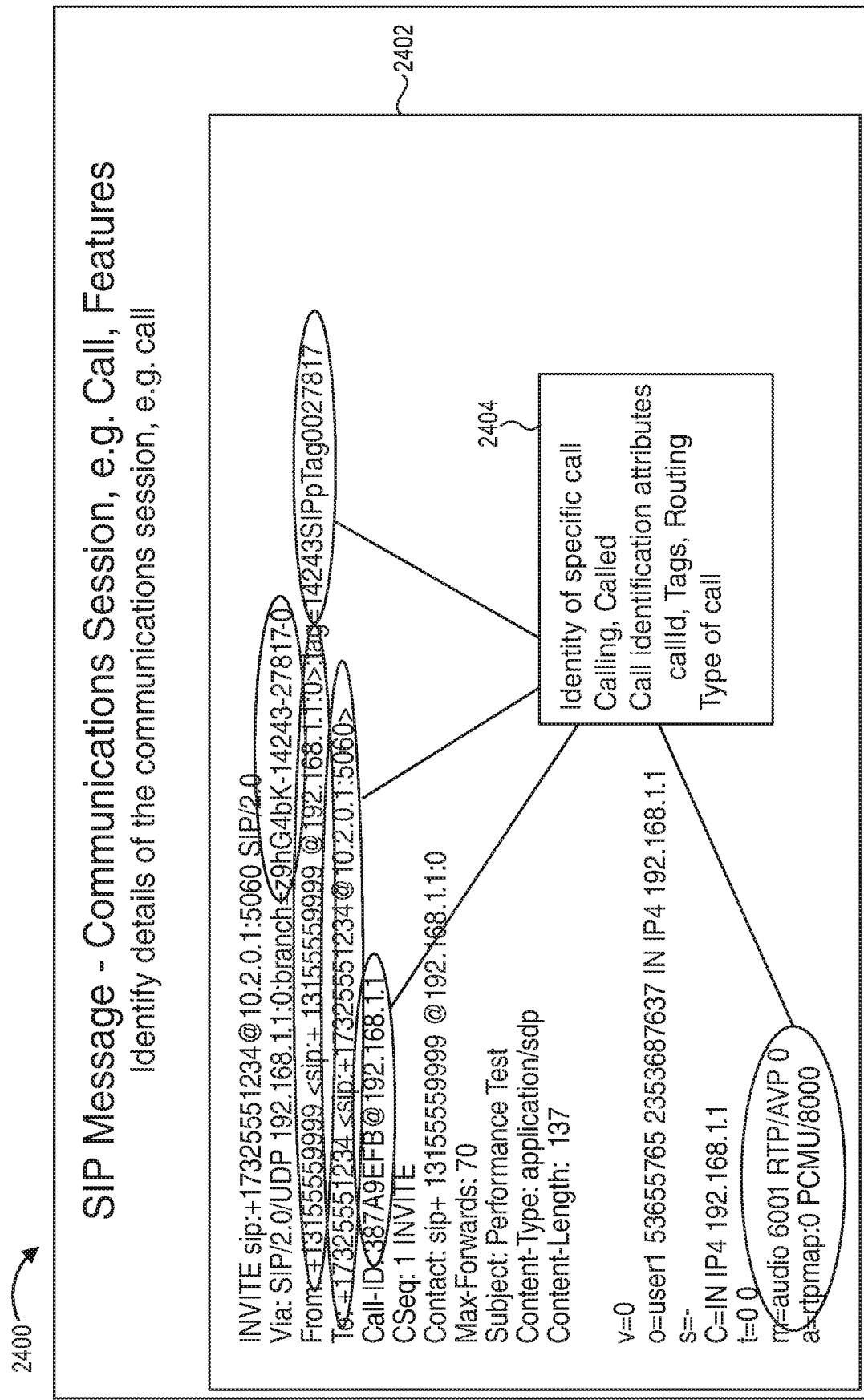
FIG. 24 illustrates exemplary communications session, e.g., media call session, features of a session control message, e.g., a Session Initiation Protocol message, in accordance with an embodiment of the present invention.

FIG. 24 illustrates exemplary communications session, e.g., media call session, features of a session control message, e.g., a Session Initiation Protocol message, in accordance with an embodiment of the present invention. The exemplary communications session features are used to identify details of the communications session which in this example is a call. Diagram 2402 shows an exemplary SIP Invite message including the parameters of a Session Description Protocol Offer message included in the SIP Invite message. Diagram 2404 illustrates portions of the SIP Invite message and identifies exemplary communications session features determined from the SIP message which include the identity of specific communications session, e.g., call session; session initiation and destination information; e.g., calling and called party information; session identification attributes, e.g., call identification attributes including call ID, routing information; information about the session, type of session, e.g., call type.

Figure 25:
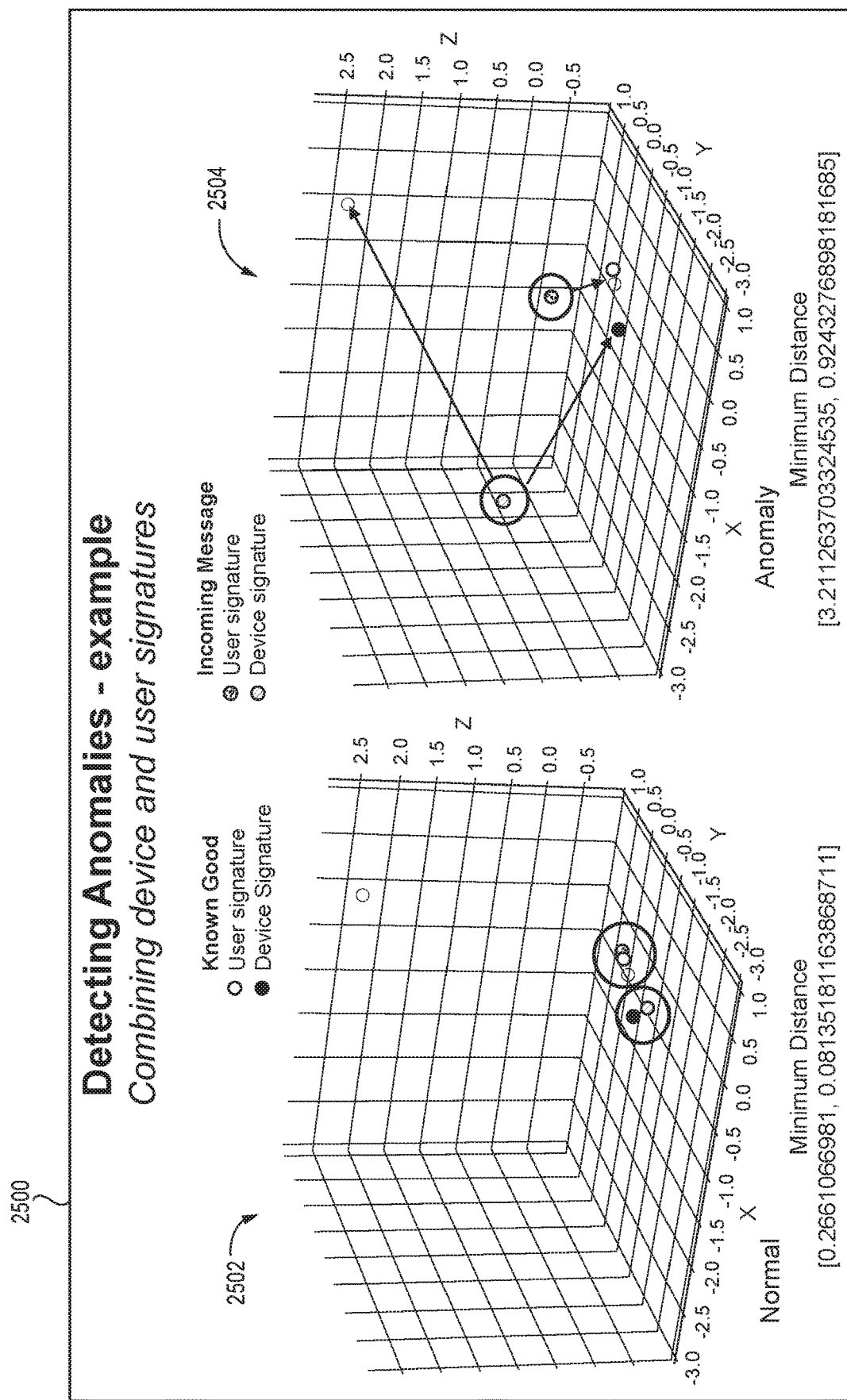
FIG. 25 illustrates an example of anomaly detection by combining device and user signatures.

FIG. 25 illustrates an example of anomaly detection by combining device and user signatures. Diagram 2502 illustrates a three dimensional graph in which incoming message signatures distances, i.e., distances for user signature and device signature for an incoming message, are near known good user and device signatures. In this normal case, the minimum distance between the known good user, device signatures and incoming message user, device signatures is [0.2661066981, 0.0813518116386711]. Diagram 2504 illustrates a three dimensional graph in which incoming message signatures distances, i.e., distances user signature and device signature for an incoming message, are anomalistic from known good user and device signatures. In this anomalous case, the minimum distance between the known good user, device signatures and incoming message user, device signatures is [3.211263703324535, 0.9243276898181685].

Figure 16:
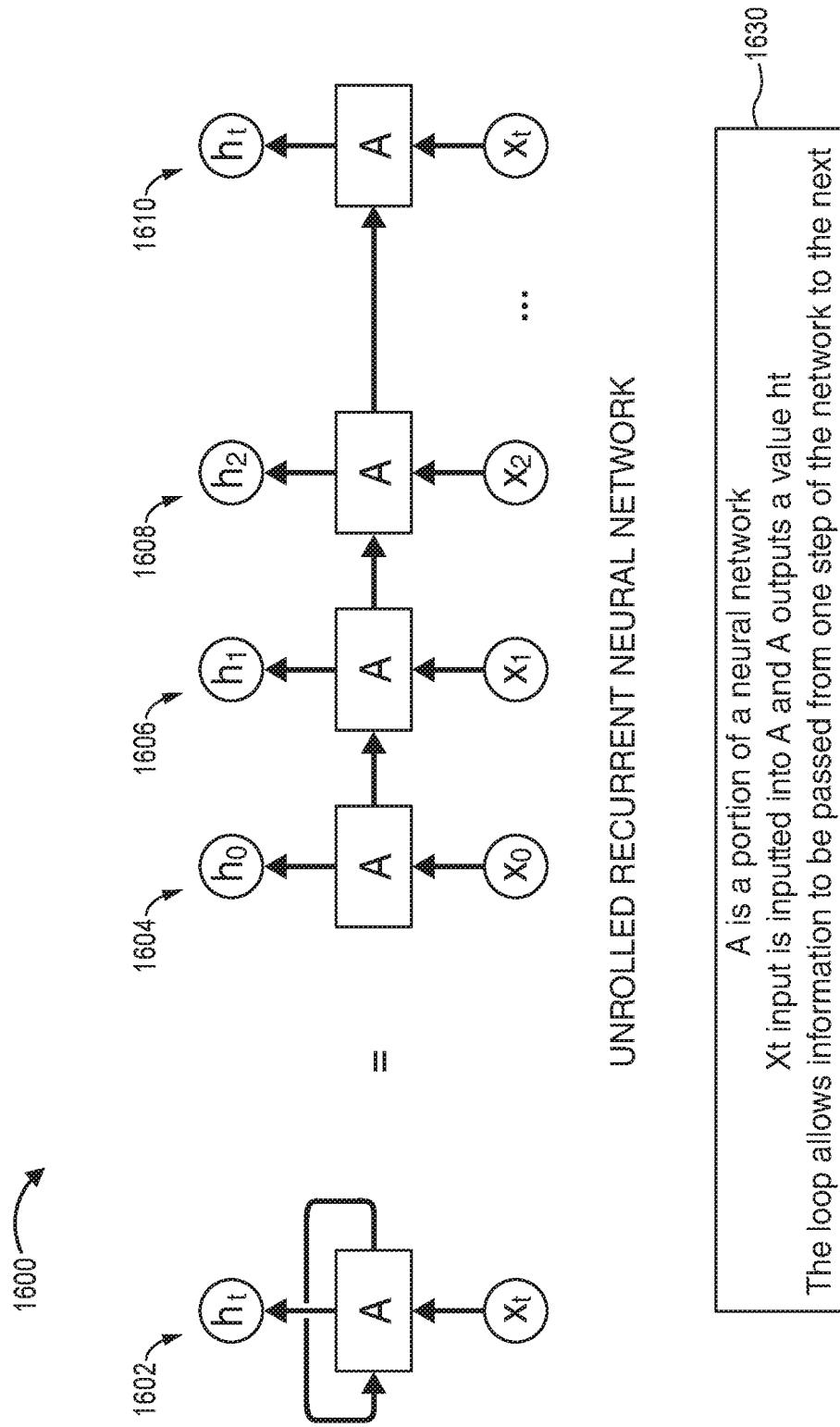
FIG. 16 illustrates a portion of a recurrent neural network, e.g., a long short term memory (LSTM) neural network.

In some embodiments of the invention, the autoencoder neural network is a recurrent autoencoder neural network, e.g., a Long Short Term Memory neural network. Diagram 1600 of FIG. 16 illustrates a portion of a recurrent autoencoder neural network, e.g., a Long Short Term Memory neural network, in which an Xt input is inputted into a portion of the neural network A 1602 which outputs a value ht as explained in the description provided in box 1630. The loop allows the information to be passed from one step of the network to the next. The A portion of the neural network 1602 with its loopback is also illustrated in diagram 1600 as an unrolled recurrent neural network made up of portions 1604, 1606, 1608, . . . , 1610 having inputs X0, X1, X2, . . . , Xt respectively and providing output h0, h1, h2, . . . , ht respectively.

FIG. 26 comprises FIGS. 26A, 26B, 26C, 26D, 26E and 26F. Diagram 2600 of FIG. 26 is a list of SIP features which may be, and in some embodiments is, used for feature extraction. Diagram 2600 includes a first part 2601 shown on FIG. 26A, a second part 2602 shown on FIG. 26B, a third part 2603 shown on FIG. 26C, a fourth part 2604 shown on FIG. 2604, a fifth part 2605, shown on FIG. 26E, and and sixth part 2606 shown on FIG. 26F.

Appendix A of U.S. Provisional Application No. 62/817,548 includes a list of SIP features which may be used for extraction.

Appendix B of U.S. Provisional Application No. 62/817,548 is documentation providing information on exemplary Packet Service Profiles.

Appendix C of U.S. Provisional Application No. 62/817,548 is documentation providing information on exemplary IP Signaling Profiles.

Appendix D of U.S. Provisional Application No. 62/817,548 is documentation providing information on exemplary SIP message manipulation.

Appendix E of U.S. Provisional Application No. 62/817,548 is also documentation providing information on exemplary SIP message manipulation.

The numbered embodiments below illustrate various features of the invention. It should be appreciated that various features discussed in connection with a particular numbered embodiment can be desirable and implemented in connection with other embodiments of the invention.

List of Exemplary Numbered Method Embodiments

Method Embodiment 1. A method of operating a system comprising: receiving a first set of session control messages (e.g., Session Initiation Protocol (SIP) packet messages) belonging to a first communications session (e.g., call), said first set of session control (e.g., SIP) messages including at least one session control message (e.g., SIP packet message); extracting a first set of features from said first set of session control messages (e.g., SIP packet messages); operating one or more neural networks to identify a group session signature to which said first set of session control messages (e.g., SIP packet messages) corresponds based on said first set of features, said identified group session signature (e.g., group communications session signature such as a group call session signature) being one of a plurality of group session signatures (e.g., group communications session signatures such as a group call session signatures).

Method Embodiment 1A. The method of method embodiment 1, wherein the first communications session is one of the following: a call session, a Voice Over Internet Protocol session, a multi-media session, an Unified Communications session, a WebRTC session, an audio session, a video session, a Rich Communications Services session, an instant messaging session, a text messaging session, a real-time communications session, a presence information sharing session, a user registration session, a device registration session, a conferencing session, an interactive collaborative multi-party session, an electronic whiteboard session, a desktop share session, and a Session Initiation Protocol session.

Method Embodiment 2. The method of method embodiment 1 further comprising: identifying one or more session control message manipulation rules (e.g., SIP message manipulation rules) corresponding to said identified group session signature.

Method Embodiment 2A The method of method embodiment 1 further comprising: identifying one or more device configuration rules corresponding to said identified group session signature; modifying the configuration of at least one device using at least one of said identified one or more device configuration rules.

Method Embodiment 2B. The method of method embodiment 1 further comprising: identifying one or more device configuration settings corresponding to said identified group session signature; modifying one or more configuration settings of at least one device using at least one of said one or more device configuration settings.

Method Embodiment 2BB. The method of method embodiment 2B, wherein said device configuration settings are Internet Protocol Signaling Profile configuration settings or Packet Service Profile configuration settings.

Method Embodiment 2BB1. The method of method embodiment 2B, wherein said modifying one or more configuration settings of at least one device includes modifying at least one of the Internet Protocol Signaling Profile configuration settings or Packet Service Profile settings of a Session Border Controller.

Method Embodiment 2C The method of method embodiment 1 further comprising: identifying one or more of the following: device configuration rules or settings, message modification rules, or signaling configuration rules or settings corresponding to said identified group session signature.

Method Embodiment 2C1. The method of method embodiment 1 further comprising: modifying one or more packet messages belonging to a second communications session using at least one of said identified one or more message modification rules corresponding to said identified group session signature; or modifying a configuration setting of at least one device using at least one of said identified one or more device configuration rules or settings corresponding to said identified group session signature; or modifying a signaling configuration setting of at least one device using at least one of said identified one or more device configuration rules or settings corresponding to said identified group session signature.

Method Embodiment 2D. The method of method embodiment 1, wherein the extracted features include features identified and/or listed in diagram 2600 of FIG. 26.

Method Embodiment 2E. The method of method embodiment 1, wherein the extracted set of features are an input vector of floating point values scaled to −1 to 1 or 0 to 1.

Method Embodiment 3. The method of method embodiment 2 further comprising: modifying one or more session control messages (e.g., SIP packet messages) belonging to a second communications session using at least one of said identified one or more session control message manipulation rules (e.g., SIP message manipulation rules) corresponding to said identified group session signature.

Method Embodiment 3A. The method of method embodiment 3, wherein the first communications session and the second communications session are received from a first device.

Method Embodiment 3B. The method of method embodiment 3A further comprising: identifying one or more device configuration rules corresponding to said identified group session signature; modifying the configuration of the first device using at least one of said identified one or more device configuration rules.

Method Embodiment 3C. The method of method embodiment 3, wherein the first call and the second communications session are initiated by a first device.

Method Embodiment 4. The method of method embodiment 3, wherein said modifying one or more session control messages, (e.g., SIP packet messages) belonging to the second communications session corrects a problem with the session control messages (e.g., SIP packet messages) which are modified.

Method Embodiment 4A. The method of method embodiment 6, wherein said problem is the lack of a header parameter in a session control message header (e.g., SIP packet message header) of said session control messages (e.g., SIP packet messages) which are modified; and wherein said modification of said session control message headers (e.g., SIP packet message headers) to include the missing session control message header parameter (e.g., SIP packet message header parameter) allows for proper processing of said session control messages (e.g., SIP packet messages) which have been modified.

Method Embodiment 4AA. The method of method embodiment 6, wherein said problem is the inclusion of a first header parameter in a session control message header (e.g., SIP packet message header) of said session control messages (e.g., SIP packet messages) which are modified; and wherein said modification of said session control message headers (e.g., SIP packet message headers) is the deletion of the first header parameter from said session control message headers (e.g., SIP packet message headers) which allows for proper processing of said session control messages (e.g., SIP packet messages) which have been modified.

Method Embodiment 4B. The method of method embodiment 3, wherein said session control message manipulation rules (e.g., SIP message manipulation rules) include rules to manipulate: (i) every session control message (e.g., every SIP packet message) in the communications session or (ii) session control messages (e.g., SIP packet messages) meeting a specified criteria (e.g., criteria being a SIP message type (all SIP Requests, all SIP Responses, specific identified SIP request types (INVITE, REGISTER, UPDATE, etc.), specific identified SIP response types (400 Bad Request, 401 Unauthorized, 503 Service Unavailable, etc.)), or specified condition (e.g., on matching a specific number included in a header field).

Method Embodiment 4C. The method of method embodiment 4B, wherein said session control message manipulation rules (e.g., SIP message manipulation rules) include rules to add, delete or modify session control message headers (e.g., SIP headers) at the time of ingress or egress from a node or device enforcing one or more of said session control message manipulation rules (e.g., SIP message manipulation rules), or upon detection of a specified criteria of a session control message (e.g., SIP message).

Method Embodiment 5. The method of method embodiment 1 further comprising: prior to receiving the first set of session control messages (e.g., Session Initiation Protocol (SIP) packet messages) belonging to a first communications session, training the one or more neural networks to determine a group session signature from a set of session control messages (e.g., SIP packet messages) using a plurality of sets of session control messages (e.g., SIP packet messages) belonging to a plurality of known good communications sessions; wherein said one or more neural networks is an autoencoder neural network having a latent layer which has the fewest neural nodes of any layer in the autoencoder neural network; and wherein operating one or more neural networks to identify a group session signature to which said first set of session control messages (e.g., SIP packet messages) corresponds based on said first set of features includes operating the trained autoencoder neural network and using the output of the latent layer of the trained autoencoder neural network to determine the group session signature for the first communications session.

Method Embodiment 6. The method of method embodiment 5, wherein said first set of session control messages (e.g., SIP packet messages) belonging to the first communications session includes a single session initiation control message (e.g., SIP INVITE message); wherein said extracting the first set of features from said first set of session control messages (e.g., SIP packet messages) includes determining the number of each type of header in the session initiation control message (e.g., SIP INVITE message).

Method Embodiment 7. The method of method embodiment 1 further comprising: receiving a first set of data (e.g., metadata) containing information about the first set of session control messages (e.g., Session Initiation Protocol (SIP) packet messages) belonging to the first communications session; extracting a first set of data features from said first set of data containing information about the first set of session control messages (e.g., Session Initiation (SIP) packet messages) belonging to the first communications session, said first set of data features being included in said first set of features; wherein the operating one or more neural networks to identify the group session signature to which said first set of session control messages (e.g., SIP packet messages) corresponds is further based on said first set of data features included in said first set of features.

Method Embodiment 8. The method of method embodiment 1, wherein said one or more neural networks includes an autoencoder neural network; wherein a pre-image input to the autoencoder neural network is the first set of features; wherein said identified group session signature is determined from outputs obtained from one or more neural network nodes included in the latent layer of the autoencoder neural network.

Method Embodiment 9. The method of method embodiment 1 further comprising: prior to operating one or more neural networks to identify a group session signature to which said first set of session control messages (e.g., SIP packet messages) corresponds based on said first set of features, training said one or more neural networks.

Method Embodiment 10. The method of method embodiment 9, wherein said one or more neural networks includes an autoencoder neural network configured to use backpropation to determine (i.e., learn) an identity function, said autoencoder neural network having a latent layer (i.e., code layer) having fewer neural network nodes than any other layer in the neural network (i.e., the latent layer or code layer is the bottleneck layer of the neural network); and wherein training said one or more neural networks includes: receiving a plurality of training sets of session control messages (e.g., SIP packet messages), each of said training sets of session control messages (e.g., SIP packet messages) belonging to a different known training communications session, each of said training sets being an unlabelled training set (i.e., there is no apriori knowledge of the identity of the group session signature to which a training set belongs); extracting from each of said training sets of session control messages (e.g., SIP packet messages) a training feature set; using said extracted training feature sets to train the autoencoder to determine an identity function (e.g., a pseudo identity function) which outputs a feature set which is an approximation of said inputted feature set.

Method Embodiment 10A. The method of method embodiment 9 further comprising: prior to training the autoencoder neural network determining:

(i) a number of nodes in the latent layer of the autoencoder neural network (i.e., code size), said latent layer of the autoencoder being a bottleneck layer having the fewest number of nodes of any layer of the neural network; (ii) a number of encoding layers of the neural network and the number of neural network nodes in each of said encoding layers; (iii) a number of decoding layers of the neural network and the number of neural network nodes in each of said decoding layers; (iv) a loss function for the autoencoder neural network.

Method Embodiment 10AA. The method of method embodiment 10, wherein said loss function is one of the following: a mean square error loss function or a log error function (e.g., binary cross entropy loss function used when input values are in range [0,1]).

Method Embodiment 10AA1. The method of method embodiment 10, wherein said loss function is determined based on an activation function of at least one neural network node of the neural network, said activation function defining an output of at least one neural network node given an input or set of inputs to the at least one neural network node.

Method Embodiment 10AA2. The method of method embodiment 10, wherein said loss function is based on an activation function of at least one neural network node of the neural network, said activation function defining an output of at least one neural network node given an input or set of inputs to the at least one neural network node.

Method Embodiment 10AA3. The method of method embodiment 10, wherein said loss function is based on one or more activation functions of the neural network nodes of the neural network, each of the neural network nodes of the neural network having an activation function defining the neural network node's output for a given input to the neural network node.

Method Embodiment 10AA4. The method of method embodiment 10, wherein said loss function is determined based on an activation function of the neural network, said activation function defining an output vector of the neural network for a given an input vector.

Method Embodiment 10AAA. The method of method embodiment 9, wherein each of said extracted training sets being input into said autoencoder neural network is a training input vector and each of said output feature sets generated by the autoencoder neural network in response to training input vector is an output vector; wherein said identity function is an approximation identity function which is learned by the neural network using backpropagation when said autoencoder neural network is trained to reconstruct at the output layer the inputted training feature sets corresponding to the unlabelled training sets with a minimized amount of error using said determined loss function which compares said input vector (or features) to said generated output vector (or features) and determines an error between said input vector (or features) and said output vector (or features), said determined error being used to adjust the weights of links of the autoencoder neural network.

Method Embodiment 10AAAA. The method of method embodiment 9, wherein each of said extracted training sets being input into said autoencoder neural network is a training input vector and each of said output feature sets generated by the autoencoder neural network in response to training input vector is an output vector; wherein said identity function is an approximation identity function which is learned by the neural network when said autoencoder neural network is trained to reconstruct at the output layer the inputted training feature sets corresponding to the unlabelled training sets with a minimized amount of error using said determined loss function which compares said input vector (or features) to said generated output vector (or features) and determines an error between said input vector (or features) and said output vector (or features), said determined error being used to adjust the weights of links of the autoencoder neural network.

Method Embodiment 10B. The method of method embodiment 10A, wherein said autoencoder has a latent layer consisting of N neural network nodes; wherein said autoencoder input layer has P inputs and said autoencoder output layer has P outputs, said P and N being integer values, said P integer value being greater than said N integer value; and wherein each of said encoder and said decoder layers contain more than N neural network nodes and less than P neural network networks.

Method Embodiment 10B1. The method of method embodiment 10B, wherein N is equal to 3 and P is equal to 1025.

Method Embodiment 10B2. The method of method embodiment 10B, wherein the values of N and P are experimentally determined so that a threshold level of similarity between calls having the same group session signature is met or exceeded.

Method Embodiment 10B3. The method of method embodiment 10B2, wherein said threshold level of similarity of communications session within a group being determined based on comparison of the features of communications sessions within the group (e.g., clustering operation).

Method Embodiment 10C. The method of method embodiment 10B, wherein the ratio of P to N is greater than 2.

Method Embodiment 10D. The method of method embodiment 10B, wherein the ratio of P to N is greater than 100.

Method Embodiment 10D1 The method of method embodiment 10B, wherein the ratio of P to N is greater than 300.

Method Embodiment 10E. The method of method embodiment 10B, wherein said autoencoder is a stacked autoencoder, the number of nodes per layer decreasing with each subsequent layer of the encoder and the number of nodes per layer increasing with each subsequent layer of the encoder.

Method Embodiment 10F The method of method embodiment 10E, wherein said encoding and decoding layers of the autoencoder are symmetrical about said latent layer in terms of the number of layers and the number of nodes per layer.

Method Embodiment 11. The method of method embodiment 3, wherein said one or more neural networks includes a recurrent autoencoder neural network; wherein extracting the first set of features from said set of session control messages (e.g., SIP packet messages) includes extracting a separate set of features from each session control message (e.g., SIP packet message) included in said set of session control messages (e.g., SIP packet messages) corresponding to said first communications session, each of said separate set of features extracted from each session control messages (e.g., SIP packet message) being separately inputted into said recurrent autoencoder neural network in the same order in which the session control messages (e.g., SIP packet messages) were received.

Method Embodiment 11A. The method of method embodiment 11, wherein said recurrent autoencoder neural network is a Long Short Term Memory neural network.

Method Embodiment 11B. The method of method embodiment 1, wherein said autoencoder neural network includes an encoder neural network and a decoder neural network, one or more of said encoder and said decoder neural networks being a Long Short Term Memory neural network.

Method Embodiment 11C. The method of method embodiment 11B, wherein extracting the first set of features from said set of session control messages (e.g., SIP packet messages) includes extracting a separate set of features from each session control message (e.g., SIP packet message) included in said set of session control messages (e.g., SIP packet messages) corresponding to said first communications session, each of said separate set of features extracted from each session control message (e.g., SIP packet message) being separately inputted into said recurrent autoencoder neural network in the same order in which the session control messages (e.g., SIP packet messages) were received.

Method Embodiment 11. The method of method embodiment 10 further comprising: after completing training of the autoencoder neural network, inputting each of said extracted training feature sets into the autoencoder to determine a group session signature identifier from a plurality of group session signature identifiers for the communications session corresponding to the inputted extracted training feature set based on the values of the nodes included in the latent layer of the autoencoder neural network, said latent layer of the autoencoder neural network serving as the output layer of the trained autoencoder neural network.

Method Embodiment 12. The method of method embodiment 11 further comprising: storing in a storage device (e.g., memory or database system) information corresponding to each training communications session (e.g., communications session identifier such as a call identifier, SIP Message Manipulation rules for the communications session, device configuration information for the communications session, set of SIP packet messages belonging to the communication session, metadata corresponding to the communications session and/or set of SIP packet messages belonging to the communications session, the extracted training feature set for the communications session) along with the determined group call signature identifier determined for the training call by said trained autoencoder neural network.

Method Embodiment 12A. The method of method embodiment 11 further comprising: storing in a storage device for each particular group session signature of the plurality of group session signatures information corresponding to each training communications session identified as belonging to that particular group session signature.

Method Embodiment 12B. The method of method embodiment 12 or 12A, wherein said information corresponding to each training communications session includes at least one or more of the following: a communications session identifier, one or more session manipulation rules (e.g., SIP message manipulation rules), device configuration information, the set of session control messages (e.g., SIP packet messages) belonging to the communications session, metadata corresponding to the communications session, the extracted training feature set for the communications session.

Method Embodiment 13. A method of operating a system comprising: receiving a first set of session control messages belonging to a first communications session, said first set of session control messages including at least one session control message; extracting a first set of features from said first set of session control messages; operating one or more neural networks to identify a group session signature to which said first set of session control messages corresponds based on said first set of features, said identified group session signature being one of a plurality of group session signatures.

Method Embodiment 13A. The method of method embodiment 13, wherein the first communications session is one of the following: a call session, a Voice Over Internet Protocol session, a multi-media session, an Unified Communications session, a WebRTC session, an audio session, a video session, a Rich Communications Services session, an instant messaging session, a text messaging session, a real-time communications session, a presence information sharing session, a user registration session, a device registration session, a conferencing session, an interactive collaborative multi-party session, an electronic whiteboard session, a desktop share session, and a Session Initiation Protocol session.

Method Embodiment 14. The method of method embodiment 13, wherein said first set of features includes signaling attributes that are native to a device or user behavior (e.g., signaling attributes not modified by network elements).

Method Embodiment 15. The method of method embodiment 13, wherein the identified group session signature is used for determining one or more of the following: a communications session type corresponding to the first communications session, a device type corresponding to an endpoint device which originated or initiated the first communications session, or a user identity corresponding to the first communications session.

Method Embodiment 16. The method of method embodiment 13, wherein the identified group session signature is used to retrieve information corresponding to communications sessions having a matching group session signature.

Method Embodiment 17. The method of method embodiment 16 further comprising: determining a device identity, user identity or communications session type for the first communications session based on said retrieved information corresponding to communications sessions having the same group session signature as the identified group session signature of the first communications session.

Method Embodiment 18. The method of method embodiment 17 further comprising: operating a profiling system or a profiling component of a communications session processing device (e.g., a Session Border Controller, Registrar, Application Server, Threat Detection and Security System) to perform one or more of the following: an identity verification/security check, user & traffic profiling check, or fraud detection and prevention operation (e.g., limiting or blocking service) based on one or more of said determined device identity, user identity, or communications session type.

Method Embodiment 19. The method of method embodiment 18 further comprising: when the identity verification/security check fails performing one or more of the following operations: (i) providing a notification to a user (e.g., owner) and/or operator (e.g., service provider for user) corresponding to the identity which failed the verification/security check, (ii) taking an action to limit or prevent use of one or more network services (e.g., making international calls) corresponding to a user identity or device identity corresponding to the first communications session, (iii) adding the determined device identity, determined user identity, or the determined communications session type to a suspected entity list.

Method Embodiment 19A. The method of method embodiment 19, further comprising: upon receiving a subsequent second communications session with a signature matching the first communications signature performing one or more of the following actions one the second communications session: (i) taking an action to block the second communications session; (ii) taking an action to limit the services provided for the second communications session (e.g., blocking of features provided for the second communications session); or (iii) subjecting the second communications session to additional or more stringent validation checks.

Method Embodiment 19A1. The method of method embodiment 19, wherein said suspected entity list is a locally maintained list stored in a memory of the system or a globally maintained list stored in a database accessible to other systems.

Method Embodiment 20. The method of method embodiment 18 further comprising: when the user & traffic profiling check fails performing one or more of the following operations: (i) providing a notification to a user (e.g., owner) and/or operator (e.g., service provider for user) corresponding to the identity of the user which failed the user & traffic profiling check, (ii) taking an action to limit or prevent use of one or more network services (e.g., making international calls) corresponding to a user identity or device identity corresponding to the first communications session.

Method Embodiment 21. The method of method embodiment 19, wherein the identity verification/security check includes a determination that an unauthorized use of a device has been made in connection with the first communications session, said determination being based at least in part on a determined device signature (or device identifier) and a user signature and a geolocation corresponding to the first communications session.

Method Embodiment 21A. The method of method embodiment 19, wherein the identity verification/security check includes a determination that an unauthorized use of a device has been made in connection with the first communications session, said determination being based at least in part on a determined device signature and a user signature.

Method Embodiment 22. A method of operating a system comprising: receiving a first set of session control messages belonging to a first communications session, said first set of session control messages including at least one session control message; extracting a set of user features from said set of session control messages; operating a first neural network to determine a user signature from the first set of session control messages based on said set of user features.

Method Embodiment 22A. The method of method embodiment 22, wherein the first communications session is one of the following: a call session, a Voice Over Internet Protocol session, a multi-media session, an Unified Communications session, a WebRTC session, an audio session, a video session, a Rich Communications Services session, an instant messaging session, a text messaging session, a real-time communications session, a presence information sharing session, a user registration session, a device registration session, a conferencing session, an interactive collaborative multi-party session, an electronic whiteboard session, a desktop share session, and a Session Initiation Protocol session.

Method Embodiment 23. The method of method embodiment 22 further comprising: comparing the determined user signature to a set of user signatures of a cluster of user signatures having the same user identifier (e.g., URI) as the originator of the first communications session to which the first set of session control messages belong.

Method Embodiment 24. The method of method embodiment 23 further comprising: based on the results of said comparison of the user signature to the user signatures of the cluster determining a score for the similarity of the user signature to the other user signatures in the set of user signatures of the cluster; and when said score is above a first threshold determine that the determined user signature falls within the cluster of user signatures; and when the score is not above the first threshold determine that the determined user signature does not fall within the cluster of user signatures.

Method Embodiment 25. The method of method embodiment 24 further comprising: training the first neural network to compute a user signature using a plurality of sets of session control packets belonging to a plurality of communications sessions including the user identifier, said first neural network being an autoencoder neural network including an encoder layer, a latent layer and a decoding layer, said latent layer having the fewest neural network nodes of any layer in the neural network including neural network nodes; after the first neural network has been trained determining a user signature for each set of session control messages belonging to the plurality of communications sessions including the user identifier used to train the first neural network, each user signature for each set of session control messages being based on an output vector of the latent layer of the autoencoder neural network of the first neural network corresponding to an input feature vector extracted from the corresponding set of session control messages.

Method Embodiment 26. The method of method embodiment 25 further comprising: when the user signature is determined not to fall within the cluster of the user signatures sending a notification to a device of a user registered as having the user identifier (URI) included in the first communications session or take an action to limit or revoke user permissions or registrations for the user identifier (URI) included in the first communications session.

Method Embodiment 27. The method of method embodiment 26 further comprising: extracting a set of device features from said first set of session control messages; operating a second neural network to determine a device signature for the first set of session control messages based on said set of device features; determining whether the determined device signature matches a previously used device signature for the determined user signature.

Method Embodiment 28. The method of method embodiment 27 wherein when said determination is that the determined device signature does not match a previously used device signature for the determined user signature performing one or more of the following operations: sending a notification to a system administrator device indicating that an anomaly has been detected or taking an action to mitigate the anomaly detected (e.g., revoke registration for user with the user id (URI) of the first communications session).

Method Embodiment 29. The method of method embodiment 28 further comprising: extracting a set of communications session features from said set of session control messages; operating a third neural network to determine a communications session signature for the first set of session control messages based on said set of communications session features; comparing the determined communications session signature to a set of communications sessions signatures of a cluster of communications session signatures corresponding to training communications sessions on which the third neural network was trained, the training communications sessions having the same user identifier (e.g., URI) as the originator of the first communications session to which the first set of SIP packet messages belong; and determining a similarity score for the determined communications session signature to communications session signatures in the set of communications session signatures of the cluster based on said comparison; and when said similarity score is above a communications session signature threshold value determining the determined communications session signature is within the cluster of communications session signatures; and when said similarity score is not above a communications session signature threshold value determining the determined communications session signature is not within the cluster of communications session signatures.

Method Embodiment 29A. The method of method embodiment 28 further comprising: extracting a set of communications session features from said set of session control messages; operating a third neural network to determine a communications session signature for the first set of session control messages based on said set of communications session features; comparing the determined communications session signature to a set of communications sessions signatures of a cluster of communications session signatures corresponding to training communications sessions on which the third neural network was trained, the training communications sessions having the same user identifier (e.g., URI) as the originator of the first communications session to which the first set of SIP packet messages belong; and determining a difference score for the determined communications session signature to communications session signatures in the set of communications session signatures of the cluster based on said comparison; and when said difference score is below a communications session signature threshold value determining the determined communications session signature is within the cluster of communications session signatures; and when said difference score is not below a communications session signature threshold value determining the determined communications session signature is not within the cluster of communications session signatures.

Method Embodiment 30. A method of operating a system comprising: receiving a first set of session control messages belonging to a first communications session, said first set of session control messages including at least one session control message; extracting a set of device features from said first set of session control messages, said set of device features including features corresponding to how the device is being used; operating a first neural network to determine a device signature for the first set of session control messages based on said set of device features.

Method Embodiment 30A. The method of method embodiment 30, wherein the first communications session is one of the following: a call session, a Voice Over Internet Protocol session, a multi-media session, an Unified Communications session, a WebRTC session, an audio session, a video session, a Rich Communications Services session, an instant messaging session, a text messaging session, a real-time communications session, a presence information sharing session, a user registration session, a device registration session, a conferencing session, an interactive collaborative multi-party session, an electronic whiteboard session, a desktop share session, and a Session Initiation Protocol session.

Method Embodiment 31. The method of method embodiment 30 further comprising: comparing the determined device signature to a set of device signatures of a cluster of device signatures having the same device identifier (e.g., MAC address, IP address, SN, IMEI, ICCID, MEID, etc.) as the originator of the first communications session to which the first set of session control messages belongs.

Method Embodiment 32. The method of method embodiment 31 further comprising: based on the results of said comparison of the device signature to the device signatures of the cluster determining a score for the similarity of the device signature to the other device signatures in the set of device signatures of the cluster; and when said score is above a first threshold determine that the determined device signature falls within the cluster of device signatures; and when the score is not above the first threshold determine that the determined device signature does not fall within the cluster of device signatures.

Method Embodiment 33. The method of method embodiment 32 further comprising: training the first neural network to compute a device signature using a plurality of sets of session control packets belonging to a plurality of communications sessions including the device identifier, said first neural network being an autoencoder neural network including an encoder layer, a latent layer and a decoding layer, said latent layer having the fewest neural network nodes of any layer in the neural network including neural network nodes; after the first neural network has been trained determining a device signature for each set of session control messages belonging to the plurality of communications sessions including the device identifier used to train the first neural network, each device signature for each set of session control messages being based on an output vector of the latent layer of the autoencoder neural network of the first neural network corresponding to an input feature vector extracted from the corresponding set of session control messages.

Method Embodiment 34. The method of method embodiment 33 further comprising: when the device signature is determined not to fall within the cluster of the device signatures sending a notification to a device of a user registered as having previously used the device identifier included in the first communications session or take an action to limit or revoke device permissions or registrations for the device identifier included in the first communications session.

List of Exemplary Numbered System Embodiments

System Embodiment 1. A system comprising: a group session signature determination device including: one or more neural networks, and a first processor that controls the operation of the group session signature determination device to perform the following operations: receive a first set of session control messages (e.g., Session Initiation Protocol (SIP) packet messages, belonging to a first communications session, said first set of session control messages (e.g., SIP packet messages) including at least one session control message (e.g., SIP packet message); extract a first set of features from said set of session control messages (e.g., SIP packet messages); operate one or more neural networks to identify a group session signature to which said first set of session control messages (e.g., SIP packet messages) corresponds based on said first set of features, said identified group session signature (e.g., group communications session signature such as a group call session signature) being one of a plurality of group session signatures (e.g., group communications session signatures such as group call session signatures).

System Embodiment 1A. The system of system embodiment 1, wherein the first communications session is one of the following: a call session, a Voice Over Internet Protocol session, a multi-media session, an Unified Communications session, a WebRTC session, an audio session, a video session, a Rich Communications Services session, an instant messaging session, a text messaging session, a real-time communications session, a presence information sharing session, a user registration session, a device registration session, a conferencing session, an interactive collaborative multi-party session, an electronic whiteboard session, a desktop share session, and a Session Initiation Protocol session.

System Embodiment 2. The system of system embodiment 1 further comprising: a system configuration manager including a second processor, the second processor controlling the operation of the system configuration manager to perform the following operation: identify one or more session control message manipulation rules (e.g., SIP message manipulation rules) corresponding to said identified group session signature.

System Embodiment 2A The system of system embodiment 1 further comprising: a system configuration manager including a second processor, the second processor controlling the operation of the system configuration manager to perform the following operations: identify one or more device configuration rules corresponding to said identified group session signature; and modify the configuration of at least one device using at least one of said identified one or more device configuration rules.

System Embodiment 2B. The system of system embodiment 1 further comprising: a system configuration manager including a second processor, the second processor controlling the operation of the system configuration manager to perform the following operations: identify one or more device configuration settings corresponding to said identified group session signature; modify one or more configuration setting of at least one device using at least one of said one or more device configuration settings.

System Embodiment 2BB. The system of system embodiment 2B, wherein said device configuration settings are Internet Protocol Signaling Profile configuration settings or Packet Service Profile configuration settings.

System Embodiment 2BB1. The system of system embodiment 2B, wherein said operation to modify one or more configuration settings of at least one device includes modifying at least one of the Internet Protocol Signaling Profile configuration settings or Packet Service Profile settings of a Session Border Controller.

System Embodiment 2C. The system of system embodiment 1 further comprising: a system configuration manager including a second processor, the second processor controlling the operation of the system configuration manager to perform the following operation: identify one or more of the following: device configuration rules or settings, message modification rules, or signaling configuration rules or settings corresponding to said identified group session signature.

System Embodiment 2C1. The system of system embodiment 1 further comprising: a system configuration manager including a second processor, the second processor controlling the operation of the system configuration manager to perform one or more of the following operations: modify one or more packet messages belonging to a second call using at least one of said identified one or more message modification rules corresponding to said identified group session signature; modifying a configuration setting of at least one device using at least one of said identified one or more device configuration rules or settings corresponding to said identified group session signature; modifying a signaling configuration setting of at least one device using at least one of said identified one or more device configuration rules or settings corresponding to said identified group session signature.

System Embodiment 2D. The system of system embodiment 1, wherein the extracted features include features identified and/or listed in diagram 2600 of FIG. 26.

System Embodiment 2E. The system of system embodiment 1, wherein the extracted set of features are an input vector of floating point values scaled to −1 to 1 or 0 to 1.

2E1. The system of system embodiment 1, wherein the extracted set of features are an input vector of numerical values.

System Embodiment 3. The system of system embodiment 2 wherein said second processor further controls the system configuration manager to perform the following operation: modify one or more session control messages (e.g., SIP packet messages) belonging to a second communications session using at least one of said identified one or more session control message manipulation rules (e.g., SIP message manipulation rules) corresponding to said identified group session signature.

System Embodiment 3A. The system of system embodiment 3, wherein the first communications session and the second communications session are received from a first device.

System Embodiment 3B. The system of claim 3A, wherein said second processor further controls the system configuration manager to perform the following operations: identify one or more device configuration rules corresponding to said identified group session signature; modify the configuration of the first device using at least one of said identified one or more device configuration rules.

System Embodiment 3C. The system of system embodiment 3, wherein the first communications session and the second communications session are initiated by a first device.

System Embodiment 4. The system of system embodiment 3, wherein said operation to modify one or more session control messages (e.g., SIP packet messages) belonging to the second communications session corrects a problem with the session control messages (e.g., SIP packet messages) which are modified.

System Embodiment 4A. The system of system embodiment 6, wherein said problem is the lack of a header parameter in a session control message (e.g., SIP packet message header) of said session control messages (e.g., SIP packet messages) which are modified; and wherein said modification of said session control message headers (e.g., SIP packet message headers) to include the missing session control message header parameter (e.g., SIP packet message header parameter) allows for proper processing of said session control messages (e.g., SIP packet messages) which have been modified.

System Embodiment 4AA. The method of system embodiment 6, wherein said problem is the inclusion of a first header parameter in a session control message header (e.g., a SIP packet message header) of said session control messages (e.g., SIP packet messages) which are modified; and wherein said modification of said session control message headers (e.g., SIP packet message headers) is the deletion of the first header parameter from said session control message headers (e.g., SIP packet message headers) which allows for proper processing of said session control messages (e.g., SIP packet messages) which have been modified.

System Embodiment 4B. The system of system embodiment 3, wherein said session control message manipulation rules (e.g., SIP message manipulation rules) include rules to manipulate: (i) every session control message in the communications session (e.g., SIP packet message in the call) or (ii) session control messages (e.g., SIP packet messages) meeting a specified criteria (e.g., criteria being a SIP message type (all SIP Requests, all SIP Responses, specific identified SIP request types (INVITE, REGISTER, UPDATE, etc.), specific identified SIP response types (400 Bad Request, 401 Unauthorized, 503 Service Unavailable, etc.)), or specified condition (e.g., on matching a specific number included in a header field).

System Embodiment 4C. The system of system embodiment 4B, wherein said session manipulation rules (e.g., SIP message manipulation rules) include rules to add, delete or modify session message control headers (e.g., SIP headers) at the time of ingress or egress from a node or device enforcing one or more of said session control message manipulation rules (e.g., SIP message manipulation rules), or upon detection of a specified criteria of a session control message (e.g., SIP message).

System Embodiment 5. The system of system embodiment 1 wherein said first processor further controls the group session signature determination device to train the one or more neural networks to determine a group session signature from a set of session control messages (e.g., SIP packet messages) using a plurality of sets of session control messages (e.g., SIP packet messages) belonging to a plurality of known good communications sessions prior to receiving the first set of session control messages (e.g., Session Initiation Protocol (SIP) packet messages) belonging to a first communications session; wherein said one or more networks neural networks is an autoencoder neural network having a latent layer which has the fewest neural nodes of any layer in the autoencoder neural network; and wherein said operate one or more neural networks to identify a group session signature to which said first set of session control messages (e.g., SIP packet messages) corresponds based on said first set of features includes operating the trained autoencoder neural network and using the output of the latent layer of the trained autoencoder neural network to determine the group session signature for the first communications session.

System Embodiment 6. The system of system embodiment 5, wherein said first set of session control messages (e.g., SIP packet messages) belonging to the first communications session includes a single session initiation message (e.g., SIP INVITE message); wherein said operation to extract the first set of features from said first set of session control messages (e.g., SIP packet messages) includes determining the number of each type of header in the session initiation control message (e.g., SIP INVITE message).

System Embodiment 7. The system of system embodiment 1 wherein said first processor further controls the group session signature determination device to: receive a first set of data (e.g., metadata) containing information about the first set of session control messages (e.g., Session Initiation Protocol (SIP) packet messages) belonging to the first communications session; extract a first set of data features from said first set of data containing information about the first set of session control messages (e.g., Session Initiation (SIP) packet messages) belonging to the first communications session, said first set of data features being included in said first set of features; and wherein said operate one or more neural networks to identify the group session signature to which said first set of session control messages (e.g., SIP packet messages) corresponds is further based on said first set of data features included in said first set of features.

System Embodiment 8. The system of system embodiment 1, wherein said one or more neural networks includes an autoencoder neural network; wherein a pre-image input to the autoencoder neural network is the first set of features; wherein said identified group session signature is determined from outputs obtained from one or more neural network nodes included in the latent layer of the autoencoder neural network.

System Embodiment 9. The system of system embodiment 1, wherein said first processor controls the group session signature determination device to train said one or more neural networks prior to operating one or more neural networks to identify a group session signature to which said first set of session control messages (e.g., SIP packet messages) corresponds based on said first set of features.

System Embodiment 9A. The system of system embodiment 9, wherein said one or more neural networks includes an autoencoder neural network configured to determine (i.e., learn) an identity function, said autoencoder neural network having a latent layer (i.e., code layer) having fewer neural network nodes than any other layer in the neural network (i.e., the latent layer or code layer is the bottleneck layer of the neural network); and wherein said train said one or more neural networks includes performing the operations of: receiving a plurality of training sets of session control messages (e.g., SIP packet messages), each of said training sets of session control messages (e.g., SIP packet messages) belonging to a different known training communications session, each of said training sets being an unlabelled training set (i.e., there is no apriori knowledge of the identity of the group session signature to which a training set belongs); extracting from said training sets of session control messages (e.g., SIP packet messages) a training feature set; and using said extracted training feature sets to train the autoencoder to determine an identity function (e.g., a pseudo identity function) which outputs a feature set which is an approximation of said inputted feature set.

System Embodiment 10. The system of system embodiment 9, wherein said one or more neural networks includes an autoencoder neural network configured to use backpropation to determine (i.e., learn) an identity function, said autoencoder neural network having a latent layer (i.e., code layer) having fewer neural network nodes than any other layer in the neural network (i.e., the latent layer or code layer is the bottleneck layer of the neural network); and wherein said train said one or more neural networks includes performing the operations of: receiving a plurality of training sets of session control messages (e.g., SIP packet messages), each of said training sets of session control messages (e.g., SIP packet messages) belonging to a different known training communications session, each of said training sets being an unlabelled training set (i.e., there is no apriori knowledge of the identity of the group session signature to which a training set belongs); extracting from each of said training sets of session control messages (e.g., SIP packet messages) a training feature set; and using said extracted training feature sets to train the autoencoder to determine an identity function (e.g., a pseudo identity function) which outputs a feature set which is an approximation of said inputted feature set.

System Embodiment 10A. The system of system embodiment 9 wherein said first processor further controls the group signature determination system to determine prior to training the autoencoder neural network: (i) a number of nodes in the latent layer of the autoencoder neural network (i.e., code size), said latent layer of the autoencoder being a bottleneck layer having the fewest number of nodes of any layer of the neural network; (ii) a number of encoding layers of the neural network and the number of neural network nodes in each of said encoding layers; (iii) a number of decoding layers of the neural network and the number of neural network nodes in each of said decoding layers; (iv) a loss function for the autoencoder neural network.

System Embodiment 10AA. The system of system embodiment 10, wherein said loss function is one of the following: a mean square error loss function or a log error function (e.g., binary cross entropy loss function used when input values are in range [0,1]).

System Embodiment 10AA1. The system of system embodiment 10, wherein said loss function is determined based on an activation function of at least one neural network node of the neural network, said activation function defining an output of at least one neural network node given an input or set of inputs to the at least one neural network node.

System Embodiment 10AA2. The system of system embodiment 10, wherein said loss function is based on an activation function of at least one neural network node of the neural network, said activation function defining an output of at least one neural network node given an input or set of inputs to the at least one neural network node.

System Embodiment 10AA3. The system of system embodiment 10, wherein said loss function is based on one or more activation functions of the neural network nodes of the neural network, each of the neural network nodes of the neural network having an activation function defining the neural network node's output for a given input to the neural network node.

System Embodiment 10AA4. The system of system embodiment 10, wherein said loss function is determined based on an activation function of the neural network, said activation function defining an output vector of the neural network for a given an input vector.

System Embodiment System Embodiment 10AAA. The system of system embodiment 9, wherein each of said extracted training sets being input into said autoencoder neural network is a training input vector and each of said output feature sets generated by the autoencoder neural network in response to training input vector is an output vector; wherein said identity function is an approximation identity function which is learned by the neural network using backpropagation when said autoencoder neural network is trained to reconstruct at the output layer the inputted training feature sets corresponding to the unlabelled training sets with a minimized amount of error using said determined loss function which compares said input vector (or features) to said generated output vector (or features) and determines an error between said input vector (or features) and said output vector (or features), said determined error being used to adjust the weights of links of the autoencoder neural network.

System Embodiment 10AAAA. The system of system embodiment 9, wherein each of said extracted training sets being input into said autoencoder neural network is a training input vector and each of said output feature sets generated by the autoencoder neural network in response to training input vector is an output vector; wherein said identity function is an approximation identity function which is learned by the neural network when said autoencoder neural network is trained to reconstruct at the output layer the inputted training feature sets corresponding to the unlabelled training sets with a minimized amount of error using said determined loss function which compares said input vector (or features) to said generated output vector (or features) and determines an error between said input vector (or features) and said output vector (or features), said determined error being used to adjust the weights of links of the autoencoder neural network.

System Embodiment 10B. The system of system embodiment 10A, wherein said autoencoder has a latent layer consisting of N neural network nodes; wherein said autoencoder input layer has P inputs and said autoencoder output layer has P outputs, said P and N being integer values, said P integer value being greater than said N integer value; and wherein each of said encoder and said decoder layers contain more than N neural network nodes and less than P neural network networks.

System Embodiment 10B1. The system of system embodiment 10B, wherein N is equal to 3 and P is equal to 1025.

System Embodiment 10B2. The system of system embodiment 10B, wherein the values of N and P are experimentally determined so that a threshold level of similarity between calls having the same group session signature is met or exceeded.

System Embodiment 10B3. The system of system embodiment 10B2, wherein said threshold level of similarity of sessions within a group being determined based on comparison of the features of sessions within the group (e.g., clustering operation).

System Embodiment 10C. The system of system embodiment 10B, wherein the ratio of P to N is greater than 2.

System Embodiment 10D. The system of system embodiment 10B, wherein the ratio of P to N is greater than 100.

System Embodiment 10D1 The system of system embodiment 10B, wherein the ratio of P to N is greater than 300.

System Embodiment 10E. The system of system embodiment 10B, wherein said autoencoder is a stacked autoencoder, the number of nodes per layer decreasing with each subsequent layer of the encoder and the number of nodes per layer increasing with each subsequent layer of the encoder.

System Embodiment 10F The system of system embodiment 10E, wherein said encoding and decoding layers of the autoencoder are symmetrical about said latent layer in terms of the number of layers and the number of nodes per layer.

System Embodiment 11. The system of system embodiment 3, wherein said one or more neural networks includes a recurrent autoencoder neural network; wherein said operation to extract the first set of features from said first set of session control messages (e.g., SIP packet messages) includes extracting a separate set of features from each session control message (e.g., SIP packet message) included in said first set of session control messages (e.g., SIP packet messages) corresponding to said first communications session, each of said separate set of features extracted from each session control message (e.g., SIP packet message) being separately inputted into said recurrent autoencoder neural network in the same order in which the session control messages (e.g., SIP packet messages) were received.

System Embodiment 11A. The system of system embodiment 11, wherein said recurrent autoencoder neural network is a Long Short Term Memory neural network.

System Embodiment 11B. The system of system embodiment 1, wherein said autoencoder neural network includes an encoder neural network and a decoder neural network, one or more of said encoder and said decoder neural networks being a Long Short Term Memory neural network.

System Embodiment 11C. The system of system embodiment 11B, wherein said operation to extract the first set of features from said first set of session control messages (e.g., SIP packet messages) includes extracting a separate set of features from each session control message (e.g., SIP packet message) included in said first set of session control messages (e.g., SIP packet messages) corresponding to said first communications session, each of said separate set of features extracted from each session control message (e.g., SIP packet message) being separately inputted into said recurrent autoencoder neural network in the same order in which the session control messages (e.g., SIP packet messages) were received.

System Embodiment 11. The system of system embodiment 10 wherein said first processor further controls the group session signature determination system to input each of said extracted training feature sets into the autoencoder after completing training of the autoencoder neural network to determine a group session signature identifier from a plurality of group session signature identifiers for the communications session corresponding to the inputted extracted training feature set based on the values of the nodes included in the latent layer of the autoencoder neural network, said latent layer of the autoencoder neural network serving as the output layer of the trained autoencoder neural network.

System Embodiment 12. The system of system embodiment 11 further comprising: a storage device (e.g., memory or database system) in which information corresponding to each training communications session (e.g., communications session identifier, such as for example a call identifier, session control message manipulation rules (e.g., SIP Message Manipulation rules) for the communications session, device configuration information for the communications session, set of session control messages (e.g., SIP packet messages) belonging to the communications session, metadata corresponding to the communications session and/or set of session control messages (e.g., SIP packet messages) belonging to the communications session, the extracted training feature set for the communications session) along with the determined group session signature identifier determined for the training communications session by said trained autoencoder neural network is stored.

System Embodiment 12A. The system of system embodiment 11 further comprising: a storage device in a storage for each particular group call signature of the plurality of group call signatures information corresponding to each training call identified as belonging to that particular group call signature.

System Embodiment 12B. The system of system embodiment 12 or 12A, wherein said information corresponding to each training communications session includes one or more of the following: a session identifier, one or more session control message manipulation rules (e.g., SIP message manipulation rules), device configuration information, the set of session control messages (e.g., SIP packet messages) belonging to the communications session, metadata corresponding to the communications session, the extracted training feature set for the communications session.

System Embodiment 13. A system comprising: a first device, said first device including: a receiver that receives a first set of session control messages (e.g., Session Initiation Protocol (SIP) packet messages) belonging to a first communications session, said first set of session control messages (e.g., SIP packet messages) including at least one session control message (e.g., SIP packet message); a feature extractor that extracts a first set of features from said first set of session control messages (e.g., SIP packet messages); and one or more neural networks that identify a group session signature to which said first set of session control messages (e.g., SIP packet messages) corresponds based on said first set of features, said identified group session signature being one of a plurality of group session signatures.

System Embodiment 13A. The system of system embodiment 13, wherein the first communications session is one of the following: a call session, a Voice Over Internet Protocol session, a multi-media session, an Unified Communications session, a WebRTC session, an audio session, a video session, a Rich Communications Services session, an instant messaging session, a text messaging session, a real-time communications session, a presence information sharing session, a user registration session, a device registration session, a conferencing session, an interactive collaborative multi-party session, an electronic whiteboard session, a desktop share session, and a Session Initiation Protocol session.

System Embodiment 14. The system of system embodiment 13, wherein said first set of features includes signaling attributes that are native to a device or user behavior (e.g., signaling attributes not modified by network elements).

System Embodiment 15. The system of system embodiment 13, wherein the identified group session signature is used for determining one or more of the following: a communications session type corresponding to the communications session, a device type corresponding to an endpoint device which originated or initiated the first communications session, or a user identity corresponding to the communications session.

System Embodiment 16. The system of system embodiment 13, wherein the identified group session signature is used to retrieve information corresponding to communications session having a matching group session signature.

System Embodiment 17. The system of system embodiment 16 wherein said first device includes a processor that controls the operation of the first device to determine a device identity, user identity or communications session type for the communications session based on said retrieved information corresponding to communications sessions having the same group signature as the identified group session signature of the first communications session.

System Embodiment 18. The system of system embodiment 17 further comprising: a profiling device that performs one or more of the following operations: an identity verification/security check, user & traffic profiling check, or fraud detection and prevention operation (e.g., limiting or blocking service) based on one or more of said determined device identity, user identity, or communications session type.

System Embodiment 19. The system of system embodiment 18 further comprising: when the identity verification/security check fails said profiling device performs one or more of the following operations: (i) providing a notification to a user (e.g., owner) and/or operator (e.g., service provider for user) corresponding to the identity which failed the verification/security check, (ii) taking an action to limit or prevent use of one or more network services (e.g., making international calls) corresponding to a user identity or device identity corresponding to the first communications session.

System Embodiment 20. The system of system embodiment 18 further comprising: when the user & traffic profiling check fails the profiling device performs one or more of the following operations: (i) providing a notification to a user (e.g., owner) and/or operator (e.g., service provider for user) corresponding to the identity of the user which failed the user & traffic profiling check, (ii) taking an action to limit or prevent use of one or more network services (e.g., making international calls) corresponding to a user identity or device identity corresponding to the first communications session.

System Embodiment 21. The system of system embodiment 19, wherein the identity verification/security check includes a determination that an unauthorized use of a device has been made in connection with the first communications session, said determination being based at least in part on a determined device signature (or device identifier) and a user signature and a geolocation corresponding to the first communications session.

System Embodiment 21A. The method of system embodiment 19, wherein the identity verification/security check includes a determination that an unauthorized use of a device has been made in connection with the first communications session, said determination being based at least in part on a determined device signature and a user signature.

System Embodiment 22. A system comprising: a first device, said first device including: a receiver that receives a first set of session control messages (e.g., Session Initiation Protocol (SIP) packet messages) belonging to a first communications session, said first set of session control messages, e.g., said first set of SIP packet messages, including at least one session control message (e.g., SIP packet message); a feature extractor that extracts a first set of user features from said first set of session control messages (e.g., SIP packet messages); and a first neural network that determines a user signature from the first set of session control messages (e.g., SIP packet messages) based on said first set of user features.

System Embodiment 22A. The system of system embodiment 22, wherein the first communications session is one of the following: a call session, a Voice Over Internet Protocol session, a multi-media session, an Unified Communications session, a WebRTC session, an audio session, a video session, a Rich Communications Services session, an instant messaging session, a text messaging session, a real-time communications session, a presence information sharing session, a user registration session, a device registration session, a conferencing session, an interactive collaborative multi-party session, an electronic whiteboard session, a desktop share session, and a Session Initiation Protocol session.

System Embodiment 23. The system of system embodiment 22 wherein said first device includes a processor that controls the operation of the first device to perform the following operation: compare the determined user signature to a set of user signatures of a cluster of user signatures having the same user identifier (e.g., URI) as the originator of the first communications session to which the first set of session control messages (e.g., SIP packet messages) belong.

System Embodiment 24. The system of system embodiment 23 wherein the processor further controls the operation of the first device based on the results of said comparison of the user signature to the user signatures of the cluster to determine a score for the similarity of the user signature to the other user signatures in the set of user signatures of the cluster; and when said score is above a first threshold determine that the determined user signature falls within the cluster of user signatures; and when the score is not above the first threshold determine that the determined user signature does not fall within the cluster of user signatures.

System Embodiment 25. The system of system embodiment 24, wherein the first neural network is trained to compute a user signature using a plurality of sets of session control messages (e.g., SIP message packets) belonging to a plurality of communications sessions including the user identifier, said first neural network being an autoencoder neural network including an encoder layer, a latent layer and a decoding layer, said latent layer having the fewest neural network nodes of any layer in the neural network including neural network nodes; and wherein after the first neural network has been trained determining a user signature for each set of session control messages (e.g., SIP packet messages) belonging to the plurality of communications session including the user identifier used to train the first neural network, each user signature for each set of session control messages (e.g., SIP packet messages) being based on an output vector of the latent layer of the autoencoder neural network of the first neural network corresponding to an input feature vector extracted from the corresponding set of session control messages (e.g., SIP packet messages).

System Embodiment 26. The system of system embodiment 25, wherein when the user signature is determined not to fall within the cluster of the user signatures sending a notification to a device of a user registered as having the user identifier (URI) included in the first communications session or take an action to limit or revoke user permissions or registrations for the user identifier (URI) included in the first communications session.

System Embodiment 27. The system of system embodiment 26, wherein said feature extractor extracts a set of device features from said first set of session control messages (e.g., SIP packet messages); wherein said first device includes a second neural network that is operated to determine a device signature for the first set of session control messages (e.g., SIP packet messages) based on said set of device features; and wherein said processor further controls the first device to determine whether the determined device signature matches a previously used device signature for the determined user signature.

System Embodiment 28. The system of system embodiment 27, wherein when said determination is that the determined device signature does not match a previously used device signature for the determined user signature performing one or more of the following operations: sending a notification to a system administrator device indicating that an anomaly has been detected or taking an action to mitigate the anomaly detected (e.g., revoke registration for user with the user id (URI) of the first communications session).

System Embodiment 29. The system of system embodiment 28, wherein said feature extractor extracts a set of communications session features from said set of session control messages (e.g., SIP packet messages); wherein said first device further includes a third neural network operated to determine a communications session signature for the first set of session control messages (e.g., SIP packet messages) based on said set of communications session features; wherein said processor further controls the first device to: compare the determined communications session signature to a set of communications session signatures of a cluster of communications session signatures corresponding to training communications session on which the third neural network was trained, the training communications sessions having the same user identifier (e.g., URI) as the originator of the first communications session to which the first set of session control messages (e.g., SIP packet messages) belong; and determine a similarity score for the determined communications session signature to communications session signatures in the set of communications session signatures of the cluster based on said comparison; and when said similarity score is above a communications session signature threshold value determine the determined communications session signature is within the cluster of communications session signatures; and when said similarity score is not above a communications session signature threshold value determine the determined communications session signature is not within the cluster of communications session signatures.

System Embodiment 30. A system comprising: a first device, said first device including: a receiver that receives a first set of session control messages (e.g., Session Initiation Protocol (SIP) packet messages) belonging to a first communications session, said first set of session control messages (e.g., SIP packet messages) including at least one session control message (e.g., SIP packet message); a feature extractor that extracts a first set of device features from said first set of session control messages (e.g., SIP packet messages); and a first neural network that determines a device signature from the first set of session control messages (e.g., SIP packet messages) based on said set of device features.

System Embodiment 30A. The system of system embodiment 30, wherein the first communications session is one of the following: a call session, a Voice Over Internet Protocol session, a multi-media session, an Unified Communications session, a WebRTC session, an audio session, a video session, a Rich Communications Services session, an instant messaging session, a text messaging session, a real-time communications session, a presence information sharing session, a user registration session, a device registration session, a conferencing session, an interactive collaborative multi-party session, an electronic whiteboard session, a desktop share session, and a Session Initiation Protocol session.

System Embodiment 31. The system of system embodiment 30 wherein said first device includes a processor that controls the operation of the first device to perform the following operation: compare the determined device signature to a set of device signatures of a cluster of device signatures having the same device identifier (e.g., MAC address, IP address, SN, IMEI, ICCID, MEID, etc.) as the originator of the first communications session to which the first set of session control messages belongs.

System Embodiment 32. The system of system embodiment claim 31 wherein the processor further controls the operation of the first device based on the results of said comparison of the device signature to the devices signatures of the cluster to determine a score for the similarity of the device signature to the other device signatures in the set of device signatures of the cluster; and when said score is above a first threshold determine that the determined device signature falls within the cluster of device signatures; and when the score is not above the first threshold determine that the determined device signature does not fall within the cluster of device signatures.

System Embodiment 33. The system of system embodiment 32 wherein the first neural network is trained to compute a device signature using a plurality of sets of session control messages (e.g., SIP message packets) belonging to a plurality of communications sessions including the device identifier, said first neural network being an autoencoder neural network including an encoder layer, a latent layer and a decoding layer, said latent layer having the fewest neural network nodes of any layer in the neural network including neural network nodes; and wherein after the first neural network has been trained determining a device signature for each set of session control messages (e.g., SIP packet messages) belonging to the plurality of communications sessions including the device identifier used to train the first neural network, each device signature for each set of session control messages (e.g., SIP packet messages) being based on an output vector of the latent layer of the autoencoder neural network of the first neural network corresponding to an input feature vector extracted from the corresponding set of session control messages (e.g., SIP packet messages).

System Embodiment 34. The system of system embodiment 33, wherein when the device signature is determined not to fall within the cluster of the device signatures sending a notification to a device of a user registered as having previously used the device identifier included in the first communications session or take an action to limit or revoke device permissions or registrations for the device identifier included in the first communications session.

List of Exemplary Numbered Non-Transitory
Computer Readable Medium Embodiments

Non-transitory Computer Readable Medium Embodiment 1. A non-transitory computer readable medium including a first set of computer executable instructions which when executed by a processor of a group session signature determination device cause the group session signature determination device to: perform the following operations: receive a first set of session control messages (e.g., Session Initiation Protocol (SIP) packet messages, belonging to a first communications session, said first set of session control messages (e.g., SIP packet messages) including at least one session control message (e.g., SIP packet message); extract a first set of features from said set of session control messages (e.g., SIP packet messages); operate one or more neural networks to identify a group session signature to which said first set of session control messages (e.g., SIP packet messages) corresponds based on said first set of features, said identified group session signature (e.g., group communications session signature such as a group call session signature) being one of a plurality of group session signatures (e.g., group communications session signatures such as group call session signatures).

Non-transitory Computer Readable Medium Embodiment 2. A non-transitory computer readable medium including a first set of computer executable instructions which when executed by a processor of a system or device cause the system or device to: receive a first set of session control messages (e.g., Session Initiation Protocol (SIP) packet messages) belonging to a first communications session, said first set of session control messages, e.g., said first set of SIP packet messages, including at least one session control message (e.g., SIP packet message); extract a first set of user features from said first set of session control messages (e.g., SIP packet messages); and use a first neural network to determine a user signature from the first set of session control messages (e.g., SIP packet messages) based on said first set of user features.

Non-transitory Computer Readable Medium Embodiment 3. A non-transitory computer readable medium including a first set of computer executable instructions which when executed by a processor of a system or device cause the system or device to: receive a first set of session control messages (e.g., Session Initiation Protocol (SIP) packet messages) belonging to a first communications session, said first set of session control messages (e.g., SIP packet messages) including at least one session control message (e.g., SIP packet message); extract a first set of device features from said first set of session control messages (e.g., SIP packet messages); and operate a first neural network to determine a device signature from the first set of session control messages (e.g., SIP packet messages) based on said set of device features.

While various embodiments have been discussed above and in the claims below, it should be appreciated that not necessarily all embodiments include the same features and some of the features described herein are not necessary but can be desirable in some embodiments.

The techniques of various embodiments may be implemented using software, hardware and/or a combination of software and hardware. Various embodiments are directed to apparatus, e.g., group session signature determination systems/devices, user signature determination systems/devices, device signature determination systems/devices, system configuration manager, database systems, call processing devices, session border controllers, communications devices, network nodes and/or network equipment devices. Various embodiments are also directed to methods, e.g., method of controlling and/or operating devices such as group call signature determination systems/devices, system configuration manager, database systems, call processing devices, session border controllers, communications devices, network nodes and/or network equipment devices. Various embodiments are also directed to machine, e.g., computer readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or, in some embodiments, logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., sensors, call processing devices, gateways, session border, network nodes and/or network equipment devices, including a processor configured to implement one, multiple or all of the steps of one or more methods of the invention.

In some embodiments, the processor or processors, e.g., CPUs, of one or more devices, e.g., computing nodes such as group session signature determination systems/devices, user signature determination systems/devices, device signature determination systems/devices, system configuration manager, database systems, call processing devices, session border controllers, communications devices, network nodes and/or network equipment devices are configured to perform the steps of the methods described as being performed by the computing nodes, e.g., group call signature determination systems/devices, system configuration manager, database systems, call processing devices, session border controllers, communications devices, network nodes and/or network equipment devices. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node such as group session signature determination systems/devices, user signature determination systems/devices, device signature determination systems/devices, system configuration manager, database systems, call processing devices, session border controllers, communications devices, network nodes and/or network equipment devices with a processor which includes a component corresponding to each of the steps of the various described methods performed by the device in which the processor is included. In some but not all embodiments a device, e.g., computing node such group session signature determination systems/devices, user signature determination systems/devices, device signature determination systems/devices, system configuration manager, database systems, call processing devices, session border controllers, communications devices, network nodes and/or network equipment devices, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a group session signature determination systems/devices, user signature determination systems/devices, device signature determination systems/devices, system configuration manager, database systems, call processing devices, session border controllers, communications devices, network nodes and/or network equipment devices described in the present application.

Numerous additional variations on the methods and apparatus of the various embodiments described above will be apparent to those skilled in the art in view of the above description. Numerous additional embodiments, within the scope of the present invention, will be apparent to those of ordinary skill in the art in view of the above description and the claims which follow. Such variations and embodiments are to be considered within the scope of the invention.

What is claimed is:

1. A method of operating a system comprising:
receiving a first set of session control messages belonging to a first communications session, said first set of session control messages including at least one session control message;
extracting a first set of features from said first set of session control messages; and
operating one or more neural networks to identify a group session signature to which said first set of session control messages corresponds based on said first set of features, said identified group session signature being one of a plurality of group session signatures.

2. The method of claim 1 further comprising:
identifying one or more session control message manipulation rules corresponding to said identified group session signature.

3. The method of claim 2 further comprising:
modifying one or more session control messages belonging to a second communications session using at least one of said identified one or more session control message manipulation rules corresponding to said identified group session signature.

4. The method of claim 3, wherein said modifying one or more session control messages belonging to the second communications session corrects a problem with the session control messages which are modified.

5. The method of claim 1 further comprising:
prior to receiving the first set of session control messages belonging to a first communications session, training the one or more neural networks to determine a group session signature from a set of session control messages using a plurality of sets of session control messages belonging to a plurality of known good communications sessions;
wherein said one or more neural networks is an autoencoder neural network having a latent layer which has the fewest neural nodes of any layer in the autoencoder neural network; and
wherein operating one or more neural networks to identify a group session signature to which said first set of session control messages corresponds based on said first set of features includes operating the trained autoencoder neural network and using the output of the latent layer of the trained autoencoder neural network to determine the group session signature for the first communications session.

6. The method of claim 5,
wherein said first set of session control messages belonging to the first communications session includes a single session initiation control message; and
wherein said extracting the first set of features from said first set of session control messages includes determining the number of each type of header in the session initiation control message.

7. The method of claim 1 further comprising:
receiving a first set of data containing information about the first set of session control messages belonging to the first communications session;
extracting a first set of data features from said first set of data containing information about the first set of session control messages belonging to the first communications session, said first set of data features being included in said first set of features;
wherein the operating one or more neural networks to identify the group session signature to which said first set of session control messages corresponds is further based on said first set of data features included in said first set of features.

8. The method of claim 1,
wherein said one or more neural networks includes an autoencoder neural network;
wherein a pre-image input to the autoencoder neural network is the first set of features;
wherein said identified group session signature is determined from outputs obtained from one or more neural network nodes included in the latent layer of the autoencoder neural network.

9. The method of claim 1 further comprising:
prior to operating one or more neural networks to identify a group session signature to which said first set of session control messages corresponds based on said first set of features, training said one or more neural networks.

10. The method of claim 9,
wherein said one or more neural networks includes an autoencoder neural network configured to use backpropagation to determine an identity function, said autoencoder neural network having a latent layer having fewer neural network nodes than any other layer in the neural network; and
wherein training said one or more neural networks includes:
receiving a plurality of training sets of session control messages, each of said training sets of session control messages belonging to a different known training communications session, each of said training sets being an unlabelled training set;
extracting from said each of the training sets of session control messages a training feature set; and
using said extracted training feature sets to train the autoencoder to determine an identity function which outputs a feature set which is an approximation of said inputted feature set.

11. The method of claim 10 further comprising:
after completing training of the autoencoder neural network, inputting each of said extracted training feature sets into the autoencoder to determine a group session signature identifier from a plurality of group session signature identifiers for the communications session corresponding to the inputted extracted training feature set based on the values of the nodes included in the latent layer of the autoencoder neural network, said latent layer of the autoencoder neural network serving as the output layer of the trained autoencoder neural network.

12. A system comprising:
a group session signature determination device including:
one or more neural networks, and
a first processor that controls the operation of the group session signature determination device to perform the following operations:
receive a first set of session control messages, belonging to a first communications session, said first set of session control messages including at least one session control message;
extract a first set of features from said first set of session control messages;
operate one or more neural networks to identify a group session signature to which said first set of session control messages corresponds based on said first set of features, said identified group session signature being one of a plurality of group session signatures.

13. The system of claim 12, further comprising:
a system configuration manager including a second processor, the second processor controlling the operation of the system configuration manager to perform the following operation: identify one or more session control message manipulation rules corresponding to said identified group session signature.

14. The system of claim 13, wherein said second processor further controls the system configuration manager to perform the following operation:
modify one or more session control messages belonging to a second communications session using at least one of said identified one or more session control message manipulation rules corresponding to said identified group session signature.

15. The system of claim 14, wherein said operation to modify one or more session control messages belonging to the second communications session corrects a problem with the session control messages which are modified.

16. The system of claim 12 wherein said first processor further controls the group session signature determination device to train the one or more neural networks to determine a group session signature from a set of session control messages using a plurality of sets of session control messages belonging to a plurality of known good communications sessions prior to receiving the first set of session control messages belonging to a first communications session;
wherein said one or more networks neural networks is an autoencoder neural network having a latent layer which has the fewest neural nodes of any layer in the autoencoder neural network; and
wherein said operate one or more neural networks to identify a group session signature to which said first set of session control messages corresponds based on said first set of features includes operating the trained autoencoder neural network and using the output of the latent layer of the trained autoencoder neural network to determine the group session signature for the first communications session.

17. The system of claim 16,
wherein said first set of session control messages belonging to the first communications session includes a single session initiation message; and
wherein said operation to extract the first set of features from said set of session control messages includes determining the number of each type of header in the session initiation control message.

18. The system of claim 12 wherein said first processor further controls the group session signature determination device to:
receive a first set of data containing information about the first set of session control messages belonging to the first communications session;
extract a first set of data features from said first set of data containing information about the first set of session control messages belonging to the first communications session, said first set of data features being included in said first set of features; and
wherein said operate one or more neural networks to identify the group session signature to which said first set of session control messages corresponds is further based on said first set of data features included in said first set of features.

19. The system of claim 12,
wherein said one or more neural networks includes an autoencoder neural network;
wherein a pre-image input to the autoencoder neural network is the first set of features; and
wherein said identified group session signature is determined from outputs obtained from one or more neural network nodes included in the latent layer of the autoencoder neural network.

20. A non-transitory computer readable medium including a first set of computer executable instructions which when executed by a processor of a system controls the system to perform the following operations:
receive a first set of session control messages, belonging to a first communications session, said first set of session control messages including at least one session control message;
extract a first set of features from said first set of session control messages; and
operate one or more neural networks to identify a group session signature to which said first set of session control messages corresponds based on said first set of features, said identified group session signature being one of a plurality of group session signatures.

\* \* \* \* \*